(12) United States Patent
Abe

(10) Patent No.: US 11,224,003 B2
(45) Date of Patent: Jan. 11, 2022

(54) APPARATUS AND CONTROL METHOD

(71) Applicant: CANON KABUSHIKI KAISHA, Tokyo (JP)

(72) Inventor: Koichi Abe, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/883,453

(22) Filed: May 26, 2020

(65) Prior Publication Data

US 2020/0383036 A1 Dec. 3, 2020

(51) Int. Cl.
*H04W 48/10* (2009.01)
*H04W 4/80* (2018.01)
*H04W 76/14* (2018.01)

(52) U.S. Cl.
CPC ............. *H04W 48/10* (2013.01); *H04W 4/80* (2018.02); *H04W 76/14* (2018.02)

(58) Field of Classification Search
CPC ....... H04W 48/10; H04W 4/80; H04W 76/14; H04B 5/02
See application file for complete search history.

(56) References Cited

U.S. PATENT DOCUMENTS

| 7,656,822 | B1* | 2/2010 | AbdelAziz | H04L 67/16 370/255 |
| 2012/0265913 | A1* | 10/2012 | Suumaki | H04W 4/80 710/303 |
| 2016/0278121 | A1* | 9/2016 | Agiwal | H04W 8/005 |
| 2017/0085694 | A1* | 3/2017 | Shibao | H04W 8/005 |
| 2018/0152589 | A1* | 5/2018 | Matsuda | G06F 3/12 |
| 2020/0015030 | A1* | 1/2020 | Hashisho | H04W 4/80 |
| 2020/0097227 | A1* | 3/2020 | Yasui | G06F 3/1208 |

FOREIGN PATENT DOCUMENTS

| JP | 2015-195467 A | 11/2015 |
| JP | 2016-145836 A | 8/2016 |
| JP | 2017-037427 A | 2/2017 |
| JP | 2017-135650 A | 8/2017 |
| JP | 2017-229054 A | 12/2017 |
| JP | 2018-004302 A | 1/2018 |

* cited by examiner

*Primary Examiner* — Nguyen T Vo
(74) *Attorney, Agent, or Firm* — Canon U.S.A., Inc. I.P. Division

(57) ABSTRACT

An apparatus configured to perform communication includes a communication unit configured to transmit advertising information, and an obtaining unit configured to obtain information about a usage type of the apparatus. The communication unit is configured to transmit advertising information including the obtained information about the usage type.

15 Claims, 32 Drawing Sheets

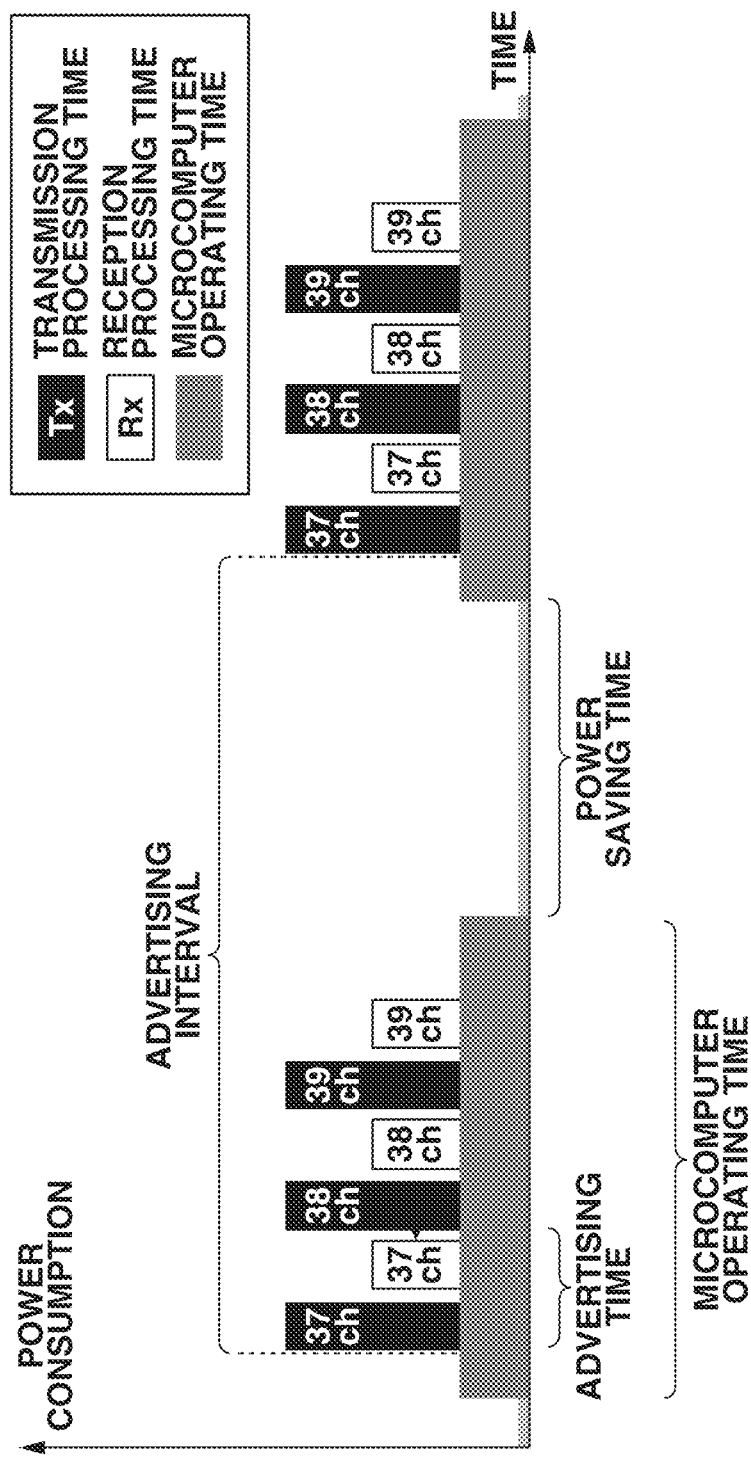

FIG.10

SERVICE
00000000-0000-1000-1000-00405f9b34fb

CHARACTERISTIC
00000000-0000-2000-1000-00405f9b34fb

DESCRIPTOR
00000000-0000-2000-1000-00405f9b3400

FIG.11

| Service UUID | Service Name | Characteristic UUID | Characteristic Name | Service Readable | Service Writable | Characteristic Readable | Characteristic Writable | Characteristic Indicatable | Value | Pairing Required |
|---|---|---|---|---|---|---|---|---|---|---|
| 0 x 1801 | GATT Service | 0 x 2A05 | Service Changed | | | | | ✓ | 0 | |
| | | 0 x 2B2A | Database Hash | ✓ | | ✓ | | | F0 CA<br>2D 48<br>EC F5<br>8B AC<br>8A AA<br>30 BB<br>B9 FB<br>A9 90 | |
| 0 x 180A | Device Information | 0 x 2A29 | Manufacturer Name String | | | ✓ | | | Printer Device | |
| | | 0 x 2A24 | Hardware Revision String | ✓ | | ✓ | | | 1010_AAA | |
| | | 0 x 2A25 | Firmware Revision String | | | ✓ | | | 2030000 | |
| | | 0 x 2A26 | Software Revision String | ✓ | | ✓ | | | 0001 | |
| 00000000-0000-1000-1000-00405f9b34fb | IJ Original | 00000000-0000-2000-1000-00405f9b34fb | SSID | | | ✓ | | | Printer SSID | ✓ |
| | | 00000000-0000-2000-1000-00405f9b34fc | Password | | | ✓ | | | aaaabbbb | ✓ |

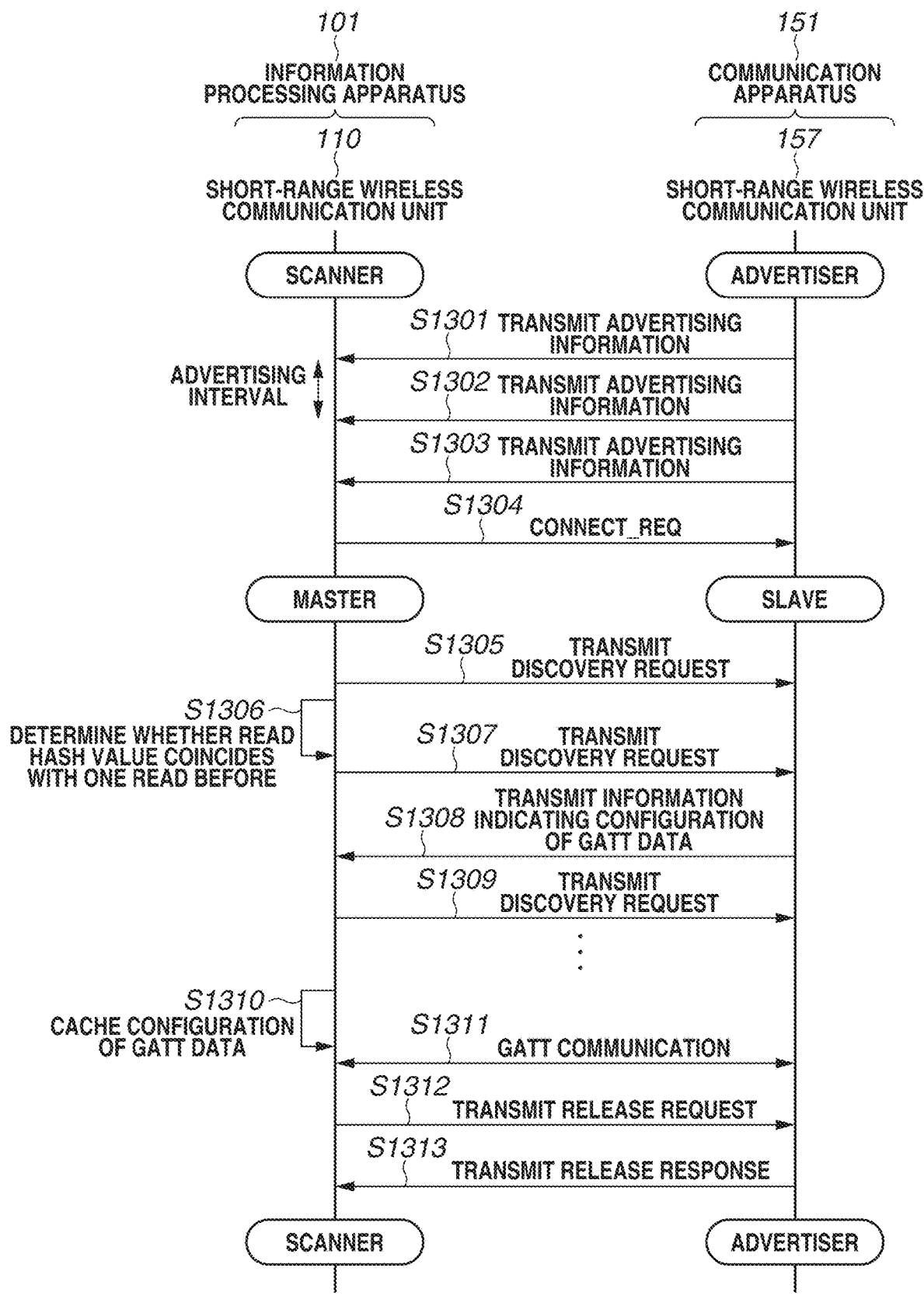

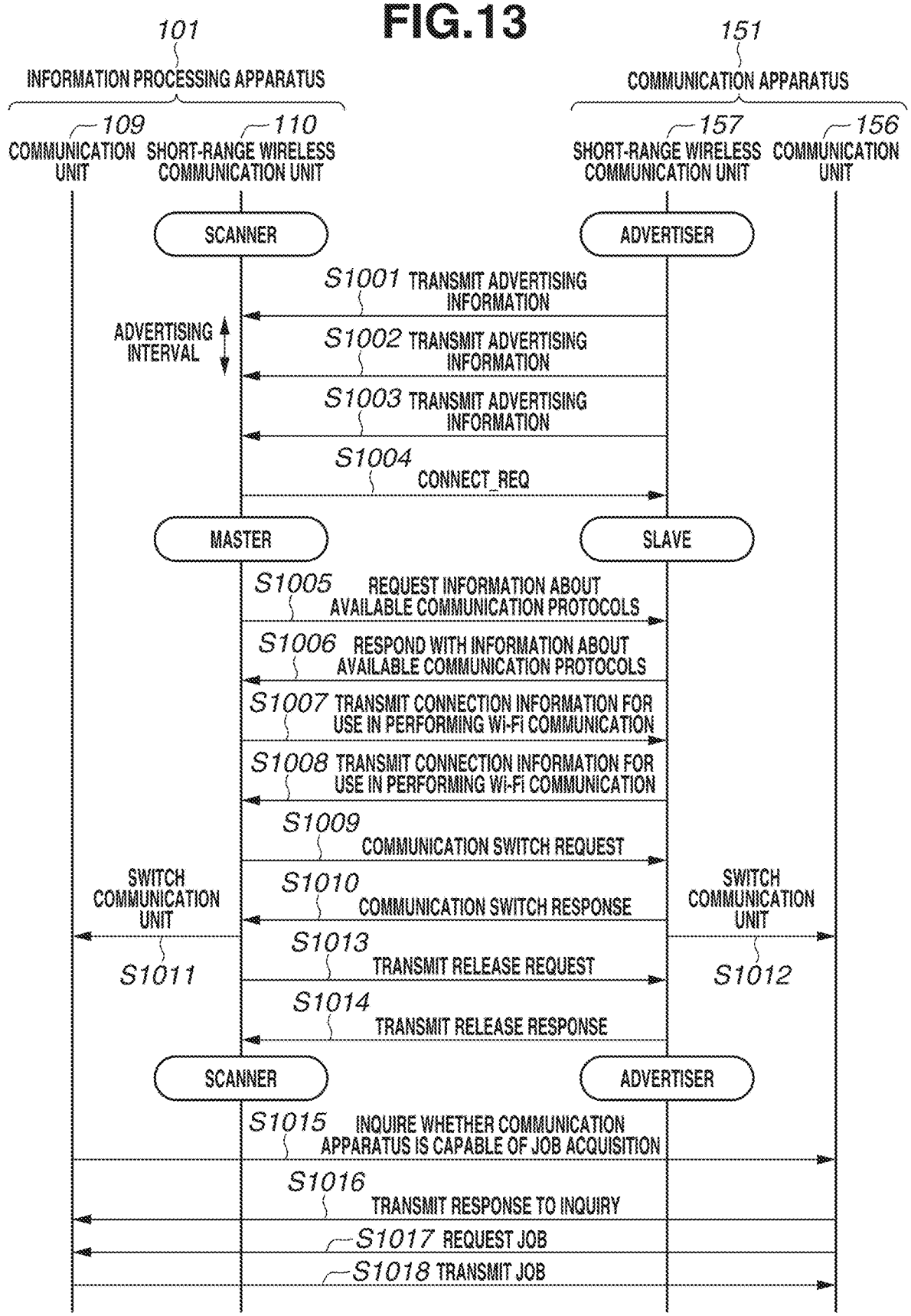

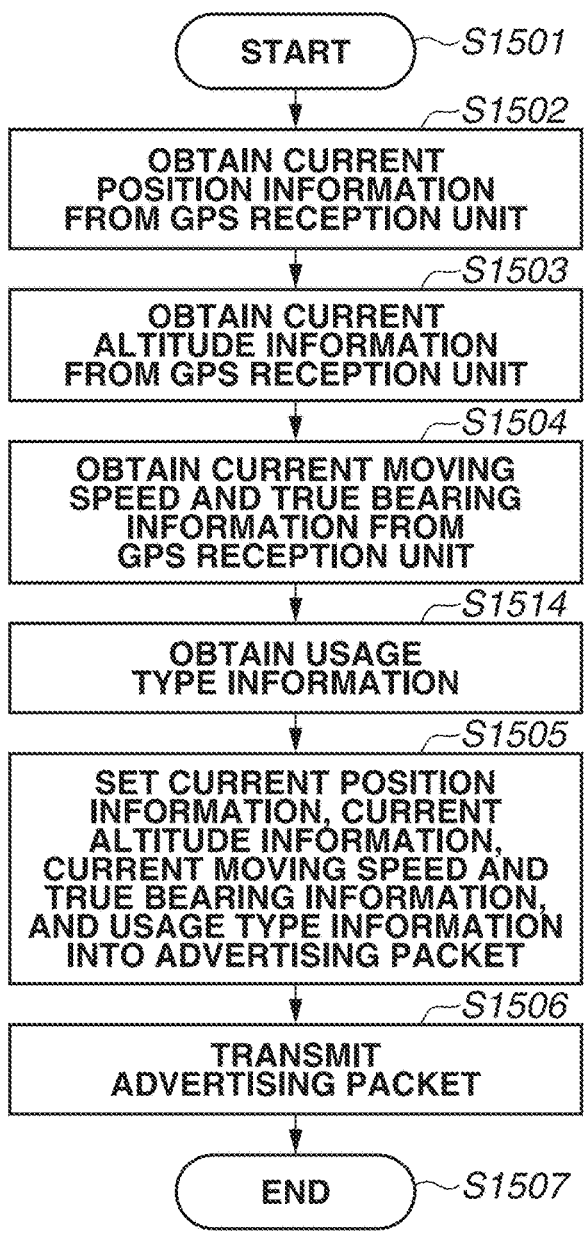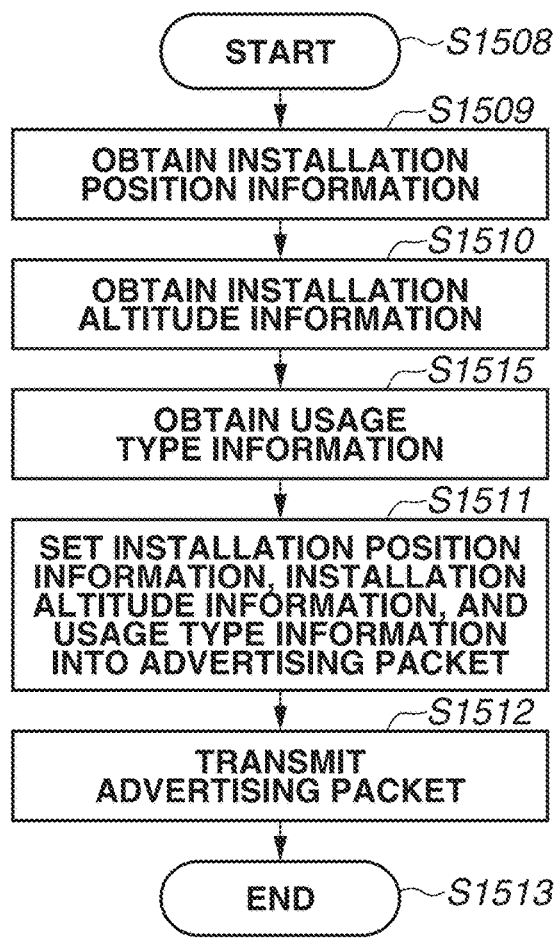

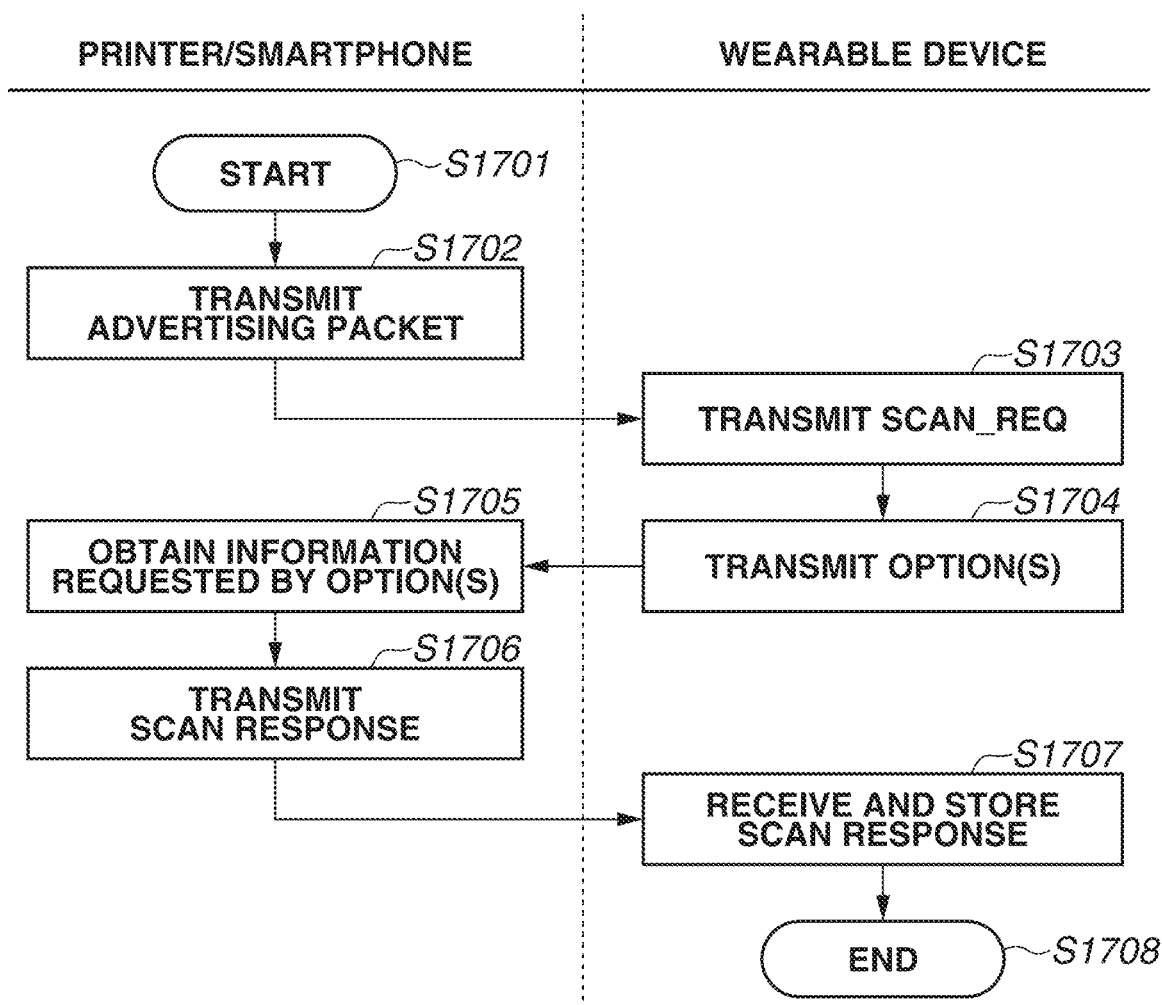

FIG.19

REGISTER INSTALLATION INFORMATION

INSTALLATION LOCATION (°) (DEG FORMAT): 35.51

INSTALLATION ALTITUDE (m): 633

USAGE TYPE: STATIONARY

FIG.21

| FIELD INTENSITY (dBm) | FIELD INTENSITY LEVEL (IN 5 GRADES) | ESTIMATED DISTANCE |
|---|---|---|
| -50 OR MORE | 5 | LESS THAN 1 m |
| -55 OR MORE AND LESS THAN -50 | 4 | 1 m OR MORE AND LESS THAN 2 m |
| -60 OR MORE AND LESS THAN -55 | 3 | 2 m OR MORE AND LESS THAN 4 m |
| -65 OR MORE AND LESS THAN -60 | 2 | 4 m OR MORE AND LESS THAN 8 m |
| LESS THAN -65 | 1 | 8 m OR MORE |

FIG.22

| NAME | SYMBOL | VALUE | UNIT (DESCRIPTION) |
|---|---|---|---|
| POSITION | place | 35.51 | ° (DEG FORMAT, DECIMAL REPRESENTATION) |
| ALTITUDE | elevation | 333 | m |
| MOVING SPEED | speed | 2.5 | knot |
| TRUE BEARING | direction | 120.8 | ° |
| USAGE TYPE | type | fixed | — |

FIG.23A

< EXAMPLE OF SCAN REQUEST >
SCAN_REQ

FIG.23B

< EXAMPLE OF SCAN RESPONSE (RETURN POSITION AND ALTITUDE) >
SCAN_RSP
place: 35.51, elevation: 333

FIG.23C

< EXAMPLE OF SCAN RESPONSE (RETURN POSITION, ALTITUDE, MOVING SPEED, AND TRUE BEARING) >
SCAN_RSP
place: 35.51, elevation: 333, speed: 2.5, direction: 120.8

FIG.25A

< EXAMPLE OF SCAN REQUEST (WITH OPTIONS REQUESTING POSITION AND ALTITUDE) >
SCAN_REQ
opt: place, elevation

FIG.25B

< EXAMPLE OF SCAN REQUEST (WITH OPTIONS REQUESTING POSITION, ALTITUDE, MOVING SPEED, AND TRUE BEARING) >
SCAN_REQ
opt: place, elevation, speed, direction

FIG.25C

< EXAMPLE OF SCAN REQUEST (WITH OPTION REQUESTING USAGE TYPE) >
SCAN_REQ
opt: type

FIG.25D

< EXAMPLE OF SCAN REQUEST (WITH OPTIONS REQUESTING POSITION, ALTITUDE, AND USAGE TYPE) >
SCAN_REQ
opt: place, elevation, type

FIG.25E

< EXAMPLE OF SCAN RESPONSE (RETURN POSITION AND ALTITUDE) >
SCAN_RSP
place: 35.51, elevation: 333

FIG.25F

< EXAMPLE OF SCAN RESPONSE (RETURN POSITION, ALTITUDE, MOVING SPEED, AND TRUE BEARING) >
SCAN_RSP
place: 35.51, elevation: 333, speed: 2.5, direction: 120.8

FIG.25G

< EXAMPLE OF SCAN RESPONSE (RETURN USAGE TYPE) >
SCAN_RSP
type: fixed

FIG.25H

< EXAMPLE OF SCAN RESPONSE (RETURN POSITION, ALTITUDE, AND USAGE TYPE) >
SCAN_RSP
place: 35.51, elevation: 333, type: mobile

FIG.27A

< EXAMPLE OF SETTING INFORMATION (POSITION AND EXPIRATION TIME) >
place, time: 600

FIG.27B

< EXAMPLE OF SETTING INFORMATION (ALTITUDE AND EXPIRATION TIME) >
elevation, time: 360

FIG.27C

< EXAMPLE OF SETTING INFORMATION (MOVING SPEED, TRUE BEARING, AND EXPIRATION TIME) >
speed, direction, time: 300

FIG.27D

< EXAMPLE OF SETTING INFORMATION (USAGE TYPE AND EXPIRATION TIME) >
type, time: 9999

FIG.29A

< EXAMPLE OF SCAN REQUEST >
SCAN_REQ

FIG.29B

< EXAMPLE OF SCAN RESPONSE (RETURN USAGE TYPE) >
SCAN_RSP
type: fixed

FIG.29C

< EXAMPLE OF SCAN RESPONSE (RETURN POSITION, ALTITUDE, MOVING SPEED, TRUE BEARING, AND USAGE TYPE) >
SCAN_RSP
place: 35.51, elevation: 333, speed: 2.5, direction: 120.8, type: mobile

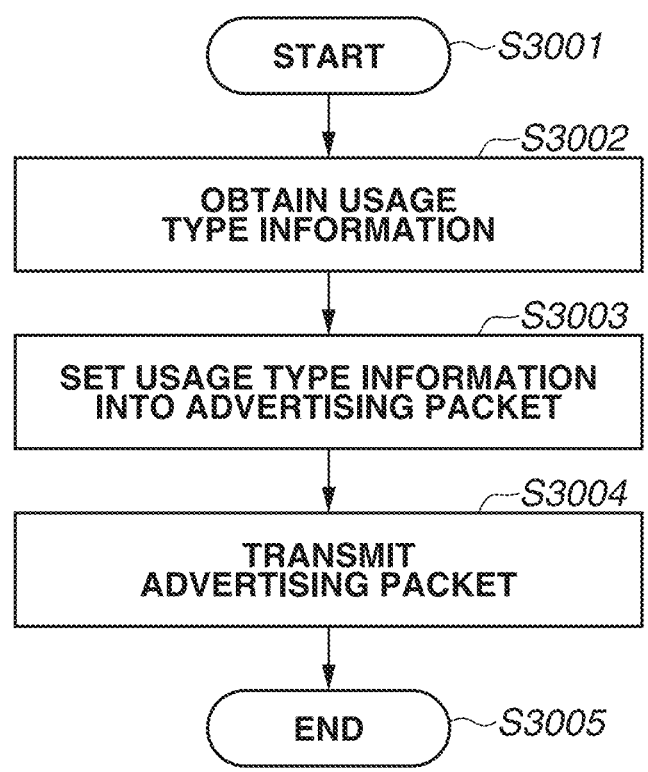

APPARATUS AND CONTROL METHOD

BACKGROUND OF THE INVENTION

Field of the Invention

The present invention relates to an apparatus and a control method.

Description of the Related Art

There is a technique for identifying a distance from an apparatus by using a field intensity of communication. Japanese Patent Application Laid-Open No. 2017-037427 discusses identifying a distance between an information processing apparatus and a communication apparatus by using the intensity of advertising information based on a Bluetooth® standard.

SUMMARY OF THE INVENTION

The present invention is directed to providing a technique for determining a position with higher accuracy.

According to an aspect of the present invention, an apparatus configured to perform communication includes a communication unit configured to transmit advertising information, and an obtaining unit configured to obtain information about a usage type of the apparatus, wherein the communication unit is configured to transmit advertising information including the obtained information about the usage type.

Further features of the present invention will become apparent from the following description of exemplary embodiments with reference to the attached drawings.

BRIEF DESCRIPTION OF THE DRAWINGS

FIG. 3 is a chart for describing advertising in Bluetooth® Low Energy.

FIG. 10 is a diagram illustrating a Generic Attribute Profile (GATT) data format.

FIG. 11 is a table illustrating examples of GATT data stored in a short-range wireless communication unit.

FIG. 12 is a sequence diagram illustrating processing where the information processing apparatus and the communication apparatus are connected by using a Bluetooth® Low Energy communication method.

FIG. 13 is a sequence diagram illustrating processing where the information processing apparatus and the communication apparatus establish a network connection by using the Bluetooth® Low Energy communication method.

FIGS. 15A and 15B are flowcharts each illustrating an example of processing where a Bluetooth® Low Energy advertiser device transmits an advertising packet (scan response).

FIG. 17 is a flowchart illustrating an example of processing where a Bluetooth® Low Energy advertiser device adds options in transmitting an advertising packet (scan response).

FIG. 19 is a schematic diagram illustrating an example of an installation information registration screen.

FIG. 21 is a chart illustrating an example of a table of field intensities, field intensity levels, and estimated distances.

FIG. 22 is a chart illustrating an example of information set in an advertising packet (scan response).

FIG. 23A is a diagram illustrating an example of a scan request. FIGS. 23B and 23C are diagrams each illustrating an example of a scan response.

FIGS. 25A, 25B, 25C, and 25D are diagrams illustrating examples of a scan request. FIGS. 25E, 25F, 25G, and 25H are diagrams illustrating examples of a scan response.

FIGS. 27A, 27B, 27C, and 27D are diagrams each illustrating an example of setting information in setting an option or options to be included in an advertising packet.

FIG. 29A is a diagram illustrating an example of a scan request. FIGS. 29B and 29C are diagrams illustrating examples of a scan response.

FIG. 30 is a flowchart illustrating an example of processing where a Bluetooth® Low Energy advertiser device transmits an advertising packet (scan response).

DESCRIPTION OF THE EMBODIMENTS

Figure 1:
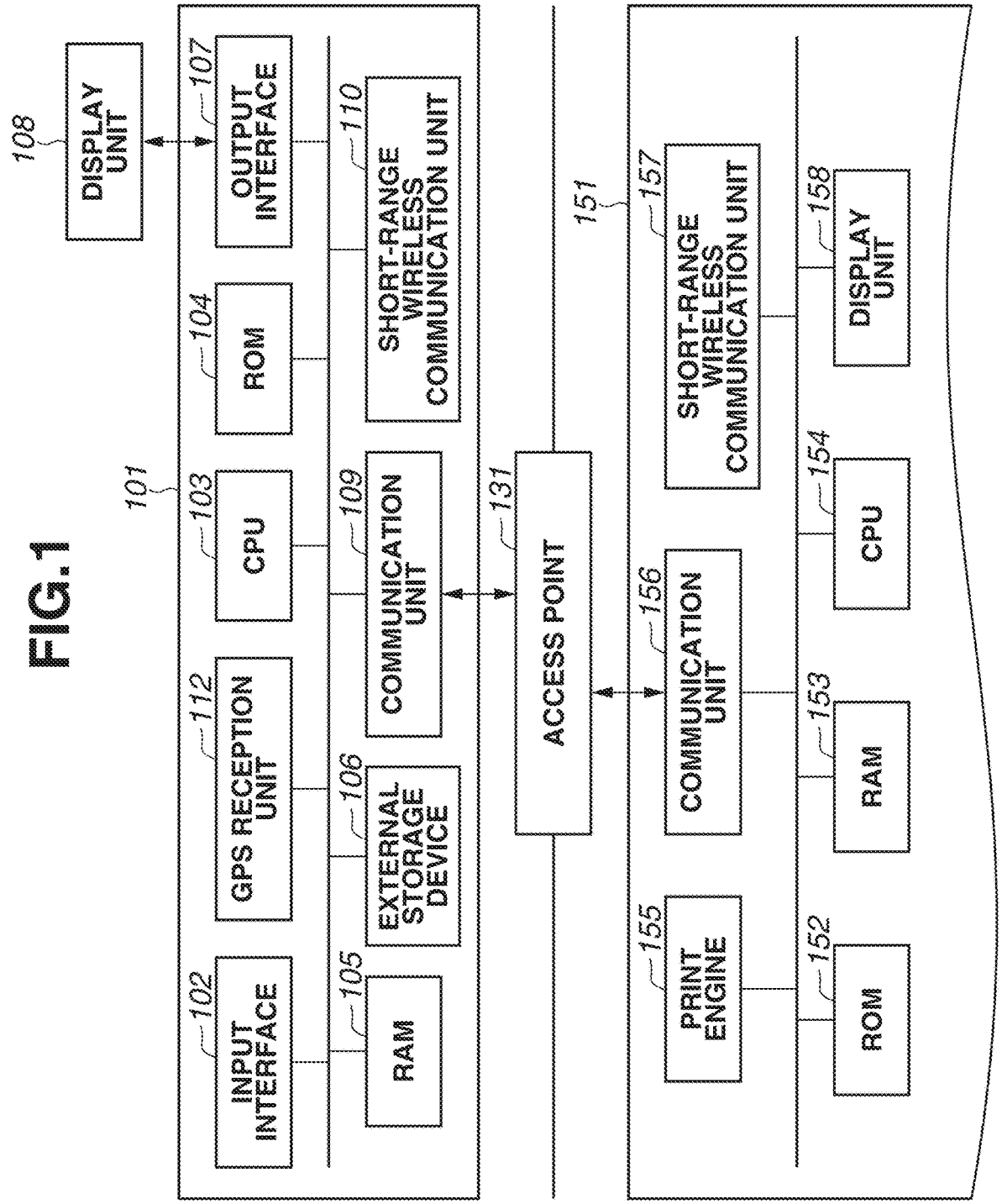
FIG. 1 is a block diagram illustrating a configuration of an information processing apparatus and a communication apparatus according to an exemplary embodiment of the present invention.

Exemplary embodiments of the present invention will be described below with reference to the drawings. It should be understood that the following exemplary embodiments to which appropriate modifications and improvements are made based on common knowledge of those skilled in the art without departing of the gist of the present invention also fall within the scope of the present invention.

An information processing apparatus and a communication apparatus included in a communication system according to a first exemplary embodiment will be described. In the following description, a smartphone will be described as an example of the information processing apparatus. However, this is not restrictive. Various processing apparatuses such as a wearable device, a mobile terminal, a notebook personal computer (PC), a tablet terminal, a personal digital assistant (PDA), and a digital camera can be applied. A music playback device and a television set are also applicable, and various processing apparatus capable of wireless communication can further be applied. In the following description, a printer will be described as an example of the communication apparatus. However, this is not restrictive. Various processing apparatuses capable of wireless communication can be applied. Examples include printers such as an inkjet printer, a full color laser beam printer, and a monochrome printer. Aside from printers, copying machines and facsimile apparatuses are also applicable. Examples of applicable processing apparatuses further include a smartphone, a mobile terminal, a notebook PC, a tablet terminal, a PDA, a digital camera, a music playback device, and a television set. A multifunction peripheral having a plurality of functions such as a copying function, a facsimile (FAX) function, and a print function is also applicable.

Initially, a configuration of the information processing apparatus according to the present exemplary embodiment and the communication apparatus that can communicate with the information processing apparatus according to the present exemplary embodiment will be described with reference to the block diagram of FIG. 1.

(Information Processing Apparatus)

An information processing apparatus 101 is the information processing apparatus according to the present exemplary embodiment. The information processing apparatus 101 is a processing apparatus including an input interface 102, a central processing unit (CPU) 103, a read-only memory (ROM) 104, a random access memory (RAM) 105, an external storage device 106, an output interface 107, a display unit 108, a communication unit 109, a short-range wireless communication unit 110, and a Global Positioning System (GPS) reception unit 112.

The input interface 102 is an interface for accepting data input and operation instructions from a user, and includes a physical keyboard, a button, and a touch panel. The output interface 107 to be described below and the input interface 102 may be integrally configured so that a screen output and the acceptance of operations from the user are performed by the same configuration.

The CPU 103 is a system control unit and controls the entire information processing apparatus 101.

The ROM 104 stores fixed data, such as control programs to be executed by the CPU 103, data tables, and a built-in operating system (OS) program. In the present exemplary embodiment, the control programs stored in the ROM 104 perform software execution controls, such as scheduling, task switching, and interrupt processing under management of the built-in OS stored in the ROM 104.

The RAM 105 includes a static random access memory (SRAM) that uses a backup power supply. Since the RAM 105 retains data by using a not-illustrated primary battery for data backup, the RAM 105 can store important data, such as program control variables without volatilization. A memory area for storing setting information about the information processing apparatus 101 and management data on the information processing apparatus 101 is also located in the RAM 105. The RAM 105 is also used as a main memory and a work memory of the CPU 103.

The external storage device 106 includes a flash memory, and stores an application for providing a print execution function and a print information generation program for generating print information interpretable by a communication apparatus 151. The external storage device 106 also includes various programs such as an information transmission and reception control program for performing transmission and reception with the communication apparatus 151 connected via the communication unit 109, and various types of information used by such programs. The external storage device 106 can be implemented as a built-in flash memory in the information processing apparatus 101, or by inserting a micro-Secure Digital (microSD) card via an external slot (not-illustrated).

The output interface 107 is an interface for controlling the display unit 108 to display data and issue a notification of a state of the information processing apparatus 101.

The display unit 108 includes a light-emitting diode (LED) and a liquid crystal display (LCD), and displays data and issues a notification of the state of the information processing apparatus 101. A software keyboard including keys, such as numeral input keys, a mode setting key, a determination key, a cancel key, and a power key, may be provided on the display unit 108 to accept the user's inputs via the display unit 108. In the present exemplary embodiment, a smartphone having a configuration of the information processing apparatus 101 in which the display unit 108 is included will be described as an example of the information processing apparatus 101.

The communication unit 109 is a component for connecting to an apparatus, such as the communication apparatus 151, and performing data communication. For example, the communication unit 109 can connect to an external access point 131, such as a wireless local area network (LAN) router. The communication apparatus 151 is also connected to the external access point 131, and the information processing apparatus 101 and the communication apparatus 151 can communicate via the external access point 131. Such a connection method will be referred to as infrastructure connection. In addition, the communication unit 109 can connect to an access point (not-illustrated) inside the communication apparatus 151. The connection of the communication unit 109 to the access point inside the communication apparatus 151 enables mutual communication between the information processing apparatus 101 and the communication apparatus 151. Such a connection method will be referred to as direct connection. Wi-Fi Direct® may be used as a method of direct connection. Whether the communication unit 109 connects to the communication apparatus 151 by infrastructure connection or direct connection can be selected by the user.

Examples of the wireless communication methods include Wireless Fidelity (Wi-Fi)® that is a communication method compliant with the Institute of Electrical and Electronics Engineers (IEEE) 802.11 series (such as IEEE 802.11a, IEEE 802.11n (Wi-Fi 4), IEEE 802.11ac (Wi-Fi 5), and IEEE 802.11ax (Wi-Fi 6)). Bluetooth® communication may also be used.

The short-range wireless communication unit 110 is a component for wirelessly connecting to an apparatus, such as the communication apparatus 151, at a short distance and performing data communication. The short-range wireless communication unit 110 uses a communication method different from that of the communication unit 109. The short-range wireless communication unit 110 can connect to a short-range wireless communication unit 157 in the communication apparatus 151. The short-range wireless communication unit 110 can obtain a field intensity. In the present exemplary embodiment, the Bluetooth® 5.1 standard is used as the communication method of the short-range wireless communication unit 110. Bluetooth® 5.1 includes both Classic Bluetooth® and Bluetooth® Low Energy standards. In the present exemplary embodiment, the Bluetooth® Low Energy standard of Bluetooth® 5.1 is used as the communication method of the short-range wireless communication unit 157. However, the present exemplary embodiment is not limited to this standard. Standards having a position detection function equivalent to or more sophisticated than that of Bluetooth® 5.1, like Bluetooth® 5.1 and later versions of Bluetooth® standards, can be applied.

The GPS reception unit 112 includes a GPS receiver that serves a part of the GPS. The GPS reception unit 112 receives a signal from a GPS satellite 1401 illustrated in FIG. 14A to be described below. Based on the signal, the information processing apparatus 101 can obtain current position information about at least any one of the following: latitude, longitude, information about whether the latitude is north or south, and information about whether the longitude is east or west. Current altitude information such as height (above sea level), speed information about the speed of movement at the surface of the earth, and true bearing information about the movement at the surface of the earth can also be obtained. If the information processing apparatus 101 is a simplified device such as a wearable device, the GPS reception unit 112 may not be included.

(Communication Apparatus)

The communication apparatus 151 is the communication apparatus according to the present exemplary embodiment. The communication apparatus 151 is a processing apparatus including a ROM 152, a RAM 153, a CPU 154, a print engine 155, a communication unit 156, the short-range wireless communication unit 157, and a display unit 158.

As an access point inside the communication apparatus 151, the communication unit 156 includes an access point for connecting to an apparatus, such as the information processing apparatus 101. Using this access point, the communication apparatus 151 can operate as a master station. The communication unit 109 of the information processing apparatus 101 can connect to the access point. In other words, the communication unit 156 can establish a direct connection with the information processing apparatus 101 by wireless communication using the internal access point. The communication unit 156 may include hardware functioning as an access point, or may operate as an access point by using software for causing the communication unit 156 to function as an access point. The communication unit 156 may function as a Group Owner that is a master station according to Wi-Fi Direct®. The communication apparatus 151 may communicate with the information processing apparatus 101 by infrastructure connection via the external access point 131. Whether the communication unit 156 connects to the information processing apparatus 101 by infrastructure connection or direct connection can be selected by the user.

Examples of the communication methods include Wi-Fi® that is a communication method compliant with the IEEE 802.11 series (such as IEEE 802.11a, IEEE 802.11n (Wi-Fi 4), IEEE 802.11ac (Wi-Fi 5), and IEEE 802.11ax (Wi-Fi 6)). Bluetooth® communication may also be used.

The short-range wireless communication unit 157 is a component for wirelessly connecting to an apparatus such as the information processing apparatus 101 at a short distance. In the present exemplary embodiment, the Bluetooth® 5.1 standard is used as the communication method of the short-range wireless communication unit 157. More specifically, in the present exemplary embodiment, the Bluetooth® Low Energy standard of Bluetooth® 5.1 is used as the communication method of short-range wireless communication unit 157. However, the present exemplary embodiment is not limited to this standard. Standards having a position detection function equivalent to or more sophisticated than that of Bluetooth® 5.1, like Bluetooth® 5.1 and later Bluetooth® standards, can be applied.

The RAM 153 includes an SRAM using a backup power supply. Since the RAM 153 retains data by using a not-illustrated primary battery for data backup, the RAM 153 can store important data, such as program control variables, and installation position information and installation altitude information illustrated in FIG. 19 without volatilization. A memory area for storing setting information about the communication apparatus 151 and management data on the communication apparatus 151 is also located in the RAM 153. The RAM 153 is also used as a main memory and a work memory of the CPU 154. The RAM 153 further serves as a reception buffer for temporarily storing print information received from the information processing apparatus 101, and stores various types of information.

The ROM 152 stores fixed data such as control programs to be executed by the CPU 154, data tables, and a built-in OS program. In the present exemplary embodiment, the control programs stored in the ROM 152 perform software execution controls such as scheduling, task switching, and interrupt processing under management of the built-in OS stored in the ROM 152.

The CPU 154 is a system control unit and controls the entire communication apparatus 151.

The print engine 155 forms an image on a recording medium, such as paper, by using a recording agent, such as ink, based on information stored in the RAM 153 and/or a print job received from the information processing apparatus 101, and outputs the print result. Since a print job transmitted from the information processing apparatus 101 includes a large amount of transmission data and high-speed communication may be desirable, the print engine 155 receives the print job via the communication unit 156 that can communicate at higher speed than that of the short-range wireless communication unit 157. If the communication apparatus 151 is not a printer, the print engine 155 is not included.

In a case where the communication apparatus 151 is a terminal device such as a smartphone, a mobile terminal, a note PC, and a tablet terminal, the communication apparatus 151 can include a GPS reception unit 112 like the information processing apparatus 101. The communication apparatus 151 can receive a signal from the GPS satellite 1401 illustrated in FIG. 14A to be described below, and obtain current position information about at least any one of the following: latitude, longitude, information about whether the latitude is north or south, and information about whether the longitude is east or west. Current altitude information such as height (above sea level), speed information about the speed of movement at the surface of the earth, and true bearing information about the movement at the surface of the earth can also be obtained.

The display unit 158 includes an LCD equipped with a touch panel, and has a software keyboard function (not illustrated). The user can input characters and numerals and performs button operations within the display unit 158.

A memory such as an external hard disk drive (HDD) and an SD card may be attached to the communication apparatus 151 as an optional device. Information stored in the communication apparatus 151 may be stored in the memory.

A connection mode of the communication apparatus 151 according to the present exemplary embodiment is set by connection setting processing. The communication apparatus 151 communicates with the information processing apparatus 101 in a connection configuration based on the set connection mode. In a case where the communication apparatus 151 according to the present exemplary embodiment performs infrastructure connection-based communication, an infrastructure connection mode is set as the connection mode. In a case where the communication apparatus 151 performs direct connection-based communication, a direct connection mode is set as the connection mode. Furthermore, both the infrastructure connection mode and the direct connection mode may be enabled to implement a mode where both connections are operable in parallel.

In the foregoing description, a case where the communication apparatus 151 function as a master station (functions as an access point (AP), or functions as a Group Owner of Wi-Fi Direct®) and the information processing apparatus 101 as a slave station is described as an example of direct connection. However, the present exemplary embodiment is not limited to such sharing of roles in particular, and other configurations may be used. Specifically, the information processing apparatus 101 may operate as a master station and the communication apparatus 151 as a slave station during direct connection.

In the present exemplary embodiment, the information processing apparatus 101 stores a predetermined application in the ROM 104 or the external storage device 106. For example, in a case where the communication apparatus 151 is a printer, the predetermined application refers to an application program for transmitting a print job for printing image data in the information processing apparatus 101 to the communication apparatus 151. An application having such a function will hereinafter be referred to as a print application. The print application may also have functions other than the print function. For example, in a case where the communication apparatus 151 has a scan function, the print application may have a function of causing the communication apparatus 151 to scan a set document, a function of performing other settings on the communication apparatus 151, and a function of checking the state of the communication apparatus 151. In other words, the print application may have a function of transmitting a scan job and a setting job to the communication apparatus 151 aside from a print job. The predetermined application is not limited to the print application, and may be an application program having a function other than the print function.

(Advertising According to Bluetooth® Low Energy Standard)

In the present exemplary embodiment, the short-distance wireless communication unit 110 of the information processing apparatus 101 and the short-range wireless communication unit 157 of the communication apparatus 151 are described to communicate by using Bluetooth® Low Energy. In the present exemplary embodiment, the short-range wireless communication unit 157 of the communication apparatus 151 functions as an advertiser (or slave) that broadcasts advertising information (advertising packet) to be described below. The short-distance wireless communication unit 110 of the information processing apparatus 101 functions as a scanner (or master) that receives the advertising information. The communication units 109 and 156 will be described to communicate via a wireless LAN (Wi-Fi).

Processing for transmitting advertising information and receiving a Bluetooth® Low Energy connection request according to the Bluetooth® Low Energy standard will now be described. In the present exemplary embodiment, the short-range wireless communication unit 157 transmits advertising information and receives a Bluetooth® Low Energy connection request since the short-range wireless communication unit 157 operates as a slave device as described above. The short-range wireless communication unit 157 performs communication by dividing a 2.4-GHZ frequency band into 40 channels (0th to 39th channels (hereinafter, may be referred to as 0ch to 39ch, respectively)). Of these, the short-range wireless communication unit 157 uses the 37th to 39th channels to transmit advertising information and receive a Bluetooth® Low Energy connection request, and uses the 0th to 36th channels for data communication after Bluetooth® Low Energy connection.

Figure 2:
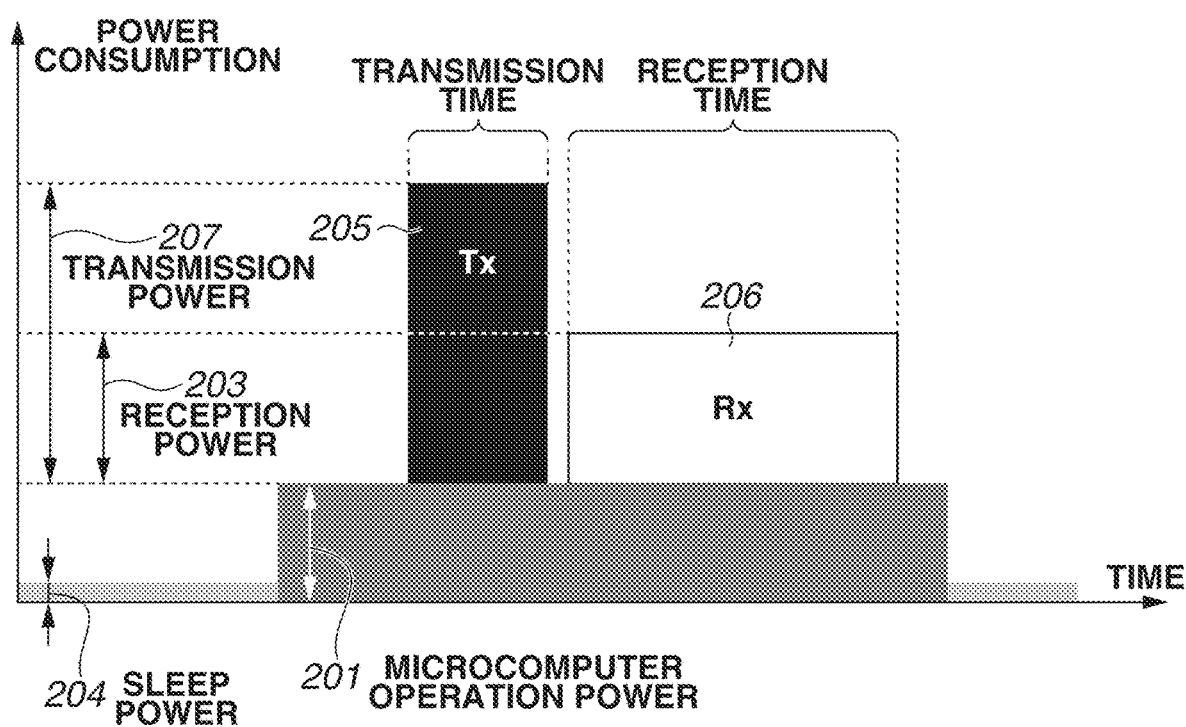
FIG. 2 is a chart for describing power consumption in transmitting advertising information.

FIG. 2 is a chart for describing power consumption in transmitting advertising information. In FIG. 2, the vertical axis indicates the power consumption of the short-range wireless communication unit 157, and the horizontal axis indicates time. Power consumption in transmitting advertising information by using a channel is illustrated for each type of processing. Total power consumption Tx 205 indicates total power consumption in transmission processing for broadcasting the advertising information. Total power consumption Rx 206 indicates total power consumption in reception processing where a receiver for receiving a Bluetooth® Low Energy connection request is kept activated. Transmission power 207 indicates the instantaneous power consumption by the transmission processing. Reception power 203 indicates the instantaneous power consumption by the reception processing. Microcomputer operation power 201 indicates the instantaneous power consumption in a case where a microcomputer in the short-range wireless communication unit 157 is operating. The reason why the microcomputer is operating before, after, and between transmission time (Tx 205) and reception time (Rx 206) is that the microcomputer is activated in advance to execute and stop the transmission processing and the reception processing. In a case where the advertising information is transmitted via a plurality of channels, the power consumption increases as much as the number of channels to transmit the advertising information. Sleep power 204 is the instantaneous power consumption of the short-range wireless communication unit 157 when the microcomputer is not operating and the short-range wireless communication unit 157 is in a power saving state. The short-range wireless communication unit 157 thus performs the transmission processing by using a predetermined channel, and then waits for transmission of a Bluetooth® Low Energy connection request from the information processing apparatus 101 by performing the reception processing for a certain time, using the same channel.

FIG. 3 is a diagram for describing details of advertising. As illustrated in FIG. 3, the short-range wireless communication unit 157 repeats the transmission and reception processing of advertising information channel by channel three times, and then stops the operation of the microcomputer to enter the power saving state for a certain time. Hereinafter, the combination of the transmission processing and the reception processing of advertising information on a predetermined channel will be referred to as advertising. A time interval at which advertising information is transmitted via a predetermined channel will be referred to as an advertising interval. The number of times of advertising repeated from the first advertising to the power saving state can be freely changed to not exceed three. In FIG. 3, the 37th, 38th, and 39th channels are successively used in this order as advertising channels. However, the order may be random. The order may differ between the first advertising, the second advertising, and the third advertising.

Figure 5:
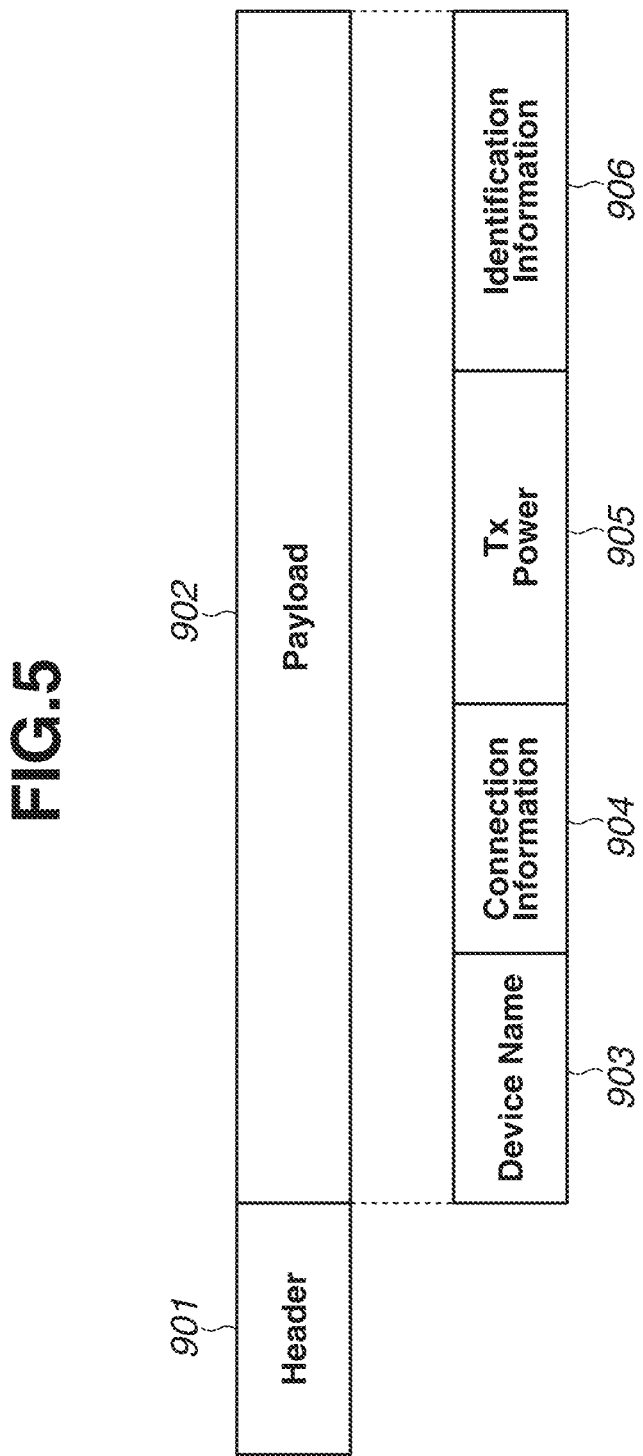
FIG. 5 is a diagram illustrating a structure of advertising information.

FIG. 5 illustrates an example of a structure of advertising information that the short-range wireless communication unit 157 broadcasts around the communication apparatus 151. When the short-range wireless communication unit 157 starts to be powered, the short-range wireless communication unit 157 performs initialization processing to enter an advertising state. Entering the advertising state, the short-range wireless communication unit 157 regularly broadcasts the advertising information around based on the advertising interval. The advertising information includes a header 901 and a payload 902. The information processing apparatus 101 can recognize the presence of the communication apparatus 151 by receiving the advertising information. The information processing apparatus 101 transmits a Bluetooth® Low Energy connection request to the communication apparatus 151, and therefore, can further establish a Bluetooth® Low Energy connection with the communication apparatus 151. The header 901 is an area where information about the type of advertising information and the size of the payload 902 is stored. The payload 902 stores information such as a device name 903 (device information) serving as identification information, supported profile information, connection information 904 for establishing a Bluetooth® Low Energy connection with the communication apparatus 151, and transmission power (Tx Power) 905 of the advertising information. Identification Information 906 about the communication apparatus 151 and information about a status (such as error and power supply states) of the communication apparatus 151 may also be included in the payload 902 of the advertising information. Examples of the identification information 906 about the communication apparatus 151 include a Media Access Control (MAC) address of the communication apparatus 151, service information about the communication apparatus 151, and a service set identifier (SSID) and a password of the AP in the communication apparatus 151. The pieces of information illustrated in FIG. 22 to be described below can also be included in the payload 902.

In the present exemplary embodiment, the short-range wireless communication unit 157 enters the advertising state and starts to transmit the advertising information when the communication apparatus 151 is powered on. However, the timing at which the short-range wireless communication unit 157 starts to transmit the advertising information is not limited to the foregoing. For example, the short-range wireless communication unit 157 may start to transmit the advertising information at timing when a predetermined operation for activating a Bluetooth® Low Energy function is performed. Even if a power button of the communication apparatus 151 is pressed and the communication apparatus 151 enters a power-off state or if the communication apparatus 151 is brought into a sleep mode by a power saving function, the short-range wireless communication unit 157 may be supplied with power and transmit the advertising information.

For example, the short-range wireless communication unit 157 may be configured to initially transmit first advertising information. In a case where a scan request in response to the first advertising information is received from the information processing apparatus 101, the short-range wireless communication unit 157 may then transmit second advertising information having internal information contents different from those of the first advertising information as a scan response. For example, the first advertising information includes information about the transmission power of the advertising information and the identification information about the short-range wireless communication unit 157. The second advertising information includes the identification information about the communication apparatus 151 and information about the functions and hardware of the communication apparatus 151. In a case where a connection request (CONNECT_REQ) is received from the information processing apparatus 101 receiving the second advertising information as the scan response, the communication apparatus 151 and the information processing apparatus 101 establish a connection therebetween. In such a configuration, for example, the print application is designed to handle the second advertising information. In the following description, the advertising information for the print application to handle is thus the second advertising information. The pieces of information illustrated in FIG. 22 to be described below can be included in the first advertising information, but is desirably included in the second advertising information.

In the foregoing description, the short-range wireless communication unit 157 of the communication apparatus 151 is described to function as an advertiser or slave, and the short-range wireless communication unit 110 of the information processing apparatus 101 is described to function as a scanner or master. However, in the present exemplary embodiment, the relationship may be reversed. Specifically, the short-range wireless communication unit 110 of the information processing apparatus 101 may function as an advertiser or slave that broadcasts advertising information, and the short-range wireless communication unit 157 of the communication apparatus 151 may function as a scanner or master that receives the advertising information.

(Bluetooth® 5.1)

Bluetooth® 5.1 is capable of direction finding using an Angle of Arrival (AoA) or Angle of Departure (AoD). Thus, a relative positional relationship between apparatuses can be found out. For example, the relative positions of two adjacent apparatuses having a Bluetooth® function can be identified with an error of several centimeters.

Figure 6:
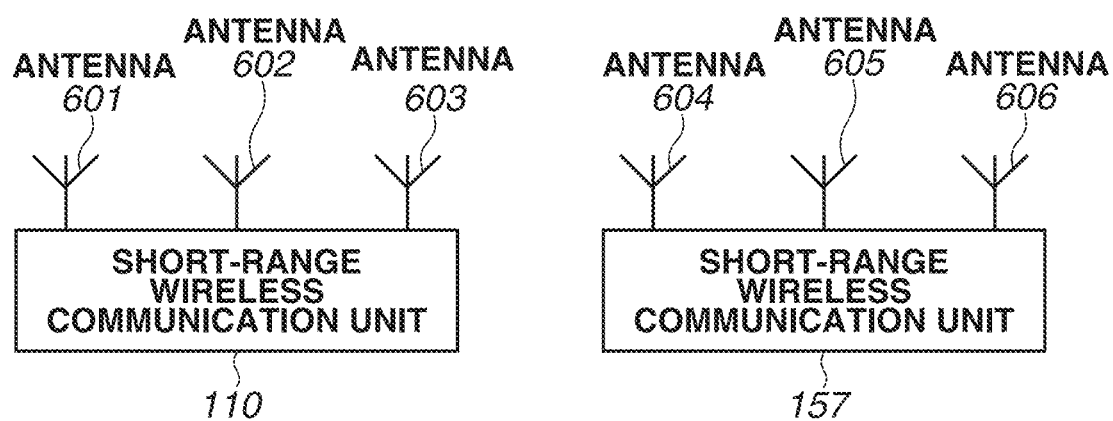
FIG. 6 is a schematic diagram illustrating a configuration of short-range wireless communication units.

FIG. 6 is a block diagram for describing a function by which the information processing apparatus 101 detects the direction of the communication apparatus 151 by using advertising information transmitted from the short-range wireless communication unit 157 in the communication apparatus 151. The short-range wireless communication unit 110 in the information processing apparatus 101 includes an antenna 601, an antenna 602, and an antenna 603. The short-range wireless communication unit 157 in the communication apparatus 151 includes an antenna 604, an antenna 605, and an antenna 606. The number of antennas included in each of the short-range wireless communication units 110 and 157 is not limited thereto. The number of antennas may be one, two, or three or more. The numbers of antennas included in the respective short-range wireless communication units 110 and 157 may be different. In FIG. 6, the antennas included in the short-range wireless communication units 110 and 157 are illustrated as arranged in a line, the layout of the antennas is not limited thereto. Three or more antennas may be two-dimensionally arranged.

Figure 7:
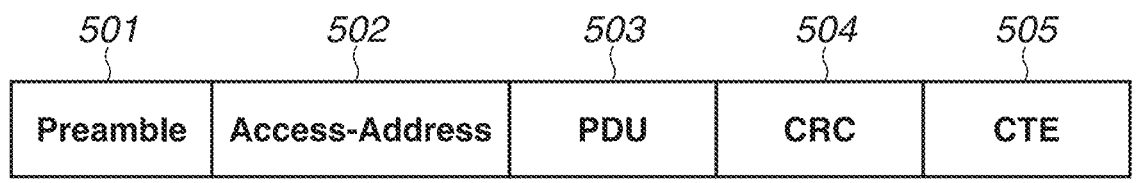
FIG. 7 is a diagram illustrating a structure of advertising information during direction finding according to Bluetooth® Low Energy.

FIG. 7 illustrates an example of a structure of advertising information that the short-range wireless communication unit 157 in the communication apparatus 151 transmits to cause the information processing apparatus 101 to detect the distance from the communication apparatus 151 and the direction where the communication apparatus 151 is. A Constant Tone Extension (CTE) 505 is data that is used to detect the direction of the communication apparatus 151 with respect to the information processing apparatus 101. A Preamble 501 is data intended for clock synchronization when the information processing apparatus 101 receives the advertising information from the communication apparatus 151. An Access-Address 502 is data intended for frame synchronization when the information processing apparatus 101 receives the advertising information from the communication apparatus 151. A Protocol Data Unit (PDU) 503 is an actual data portion of the advertising information transmitted from the communication apparatus 151. The header 901 and the payload 902 that are the advertising information described in FIG. 5 are information included in the PDU 503. A Cyclic Redundancy Check (CRC) 504 is an error detection code value in communicating the PDU 503.

There are two methods by which the information processing apparatus 101 detects the direction of the communication apparatus 151. One is implemented by a configuration in which the short-range wireless communication unit 110 is provided with a plurality of antennas (method using the AoA). The other is implemented by a configuration in which the short-range wireless communication unit 157 is provided with a plurality of antennas (method using the AoD). Details of the methods will be described below.

(Method Using AoA)

Figure 8:
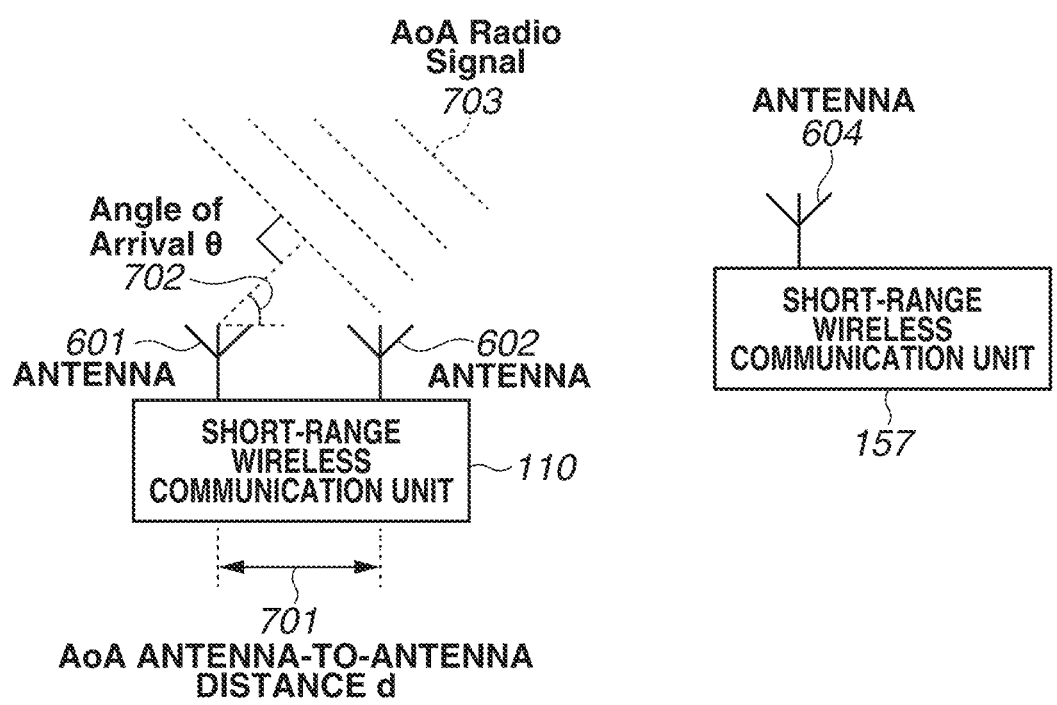
FIG. 8 is a schematic diagram illustrating a configuration during direction finding according to Bluetooth® Low Energy, where an advertising information receiver includes a plurality of antennas.

With reference to FIG. 8, the method by which the information processing apparatus 101 detects the direction of the communication apparatus 151, implemented by the configuration in which the short-range wireless communication unit 110 is provided with a plurality of antennas will be described. The short-range wireless communication unit 157 transmits an AoA Radio Signal 703 that is advertising information including the CTE 505 from the antenna 604. The short-range wireless communication unit 110 receives the AoA Radio Signal 703 with a plurality of antennas (both antennas 601 and 602). Suppose that % is a phase difference between the AoA Radio Signals 703 received at the antennas 601 and 602 (i.e., a phase difference between the received pieces of advertising information), and X is the wavelength of the AoA Radio Signal 703. Using an AoA antenna-to-antenna distance d 701 that is the distance between the antennas 601 and 602, an AoA θ 702 that is the direction of the communication apparatus 151 with respect to the information processing apparatus 101 is calculated by the following Eq. (1):

$$\theta = \arccos((\psi\lambda)/(2\pi d)) \quad \text{Eq. (1)}.$$

The AoA antenna-to-antenna distance d 701 may be obtained from the advertising information if included in the advertising information. The AoA antenna-to-antenna distance d 701 may also be obtained by Generic Attribute Profile (GATT) communication.

The information processing apparatus 101 thus receiving the advertising information from the communication apparatus 151 can detect the direction of the communication apparatus 151 by calculating the AoA θ 702.

(Method Using AoD)

Figure 9:
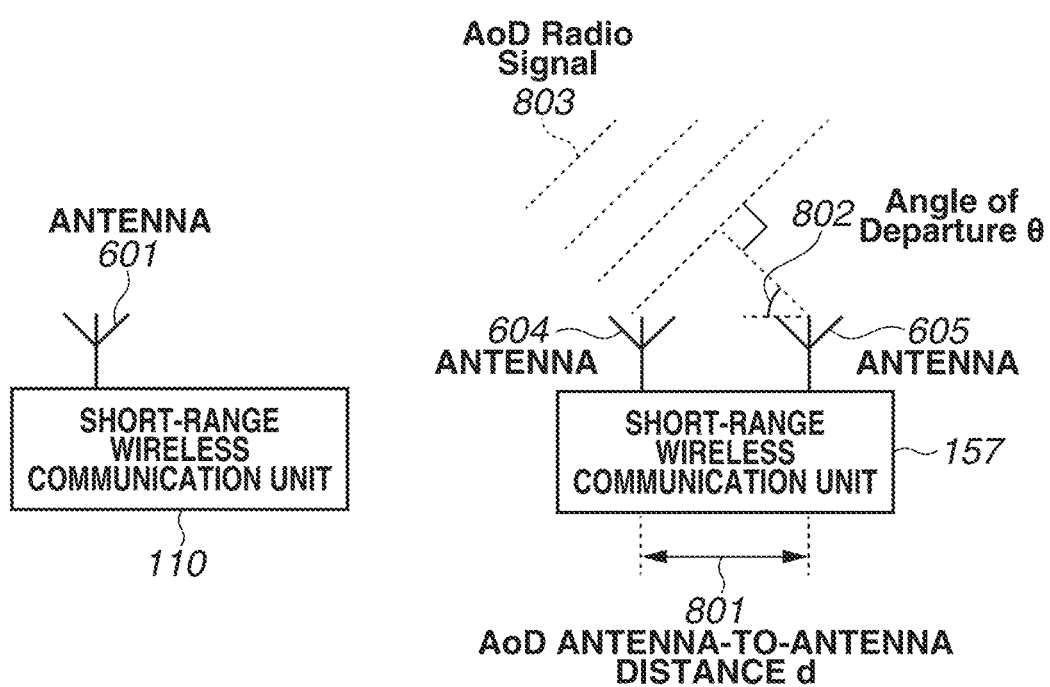
FIG. 9 is a schematic diagram illustrating a configuration during direction finding according to Bluetooth® Low Energy, where an advertising information transmitter includes a plurality of antennas.

Next, the method by which the information processing apparatus 101 detects the direction of the communication apparatus 151, implemented by the configuration in which the short-range wireless communication unit 157 is provided with a plurality of antennas, will be described with reference to FIG. 9. The short-range wireless communication unit 157 transmits an AoD Radio Signal 803 that is advertising information including the CTE 505 from a plurality of antennas (both antennas 604 and 605). The short-range wireless communication unit 110 receives the AoD Radio Signal 803 with the antenna 601. Suppose here that the communication apparatus 151 transmits the advertising information from the antenna 604 at a predetermined period and then transmits the advertising information from the antenna 605 at the same period without an interval. Since the antennas 604 and 605 continuously transmit the advertising information at the same period, a phase difference depending on the distance between the antennas 604 and 605 is detected in the advertising information received at the antenna 601.

Suppose that ψ is a phase difference between the AoD Radio Signals 803 from the antennas 604 and 605, and λ is the wavelength of the AoD Radio Signals 803. Using an AoD antenna-to-antenna distance d 801 that is the distance between the antennas 604 and 605, an AoD θ 802 that is the direction of the communication apparatus 151 with respect to the information processing apparatus 101 is calculated by the following Eq. (2):

$$\theta = \arccos((\psi\lambda)/(2\pi d)) \quad \text{Eq. (2)}.$$

In the above described manner, the information processing apparatus 101 receiving the advertising information from the communication apparatus 151 can detect the direction of the communication apparatus 151 by calculating the AoD θ 802.

While in the above described case of the method implemented by the configuration in which the short-range wireless communication unit 110 is provided with a plurality of antennas, the two antennas 601 and 602 are used as the plurality of antennas, the number of antennas to be used is not limited thereto. For example, the information processing apparatus 101 may use three or more antennas, and obtain the AoA θ 702 by averaging AoAs θ determined from respective pairs of antennas. Similarly, in the method implemented by the configuration in which the short-range wireless communication unit 157 is provided with a plurality of antennas, the number of antennas used as the plurality of antennas is not limited to the foregoing, either. For example, the communication apparatus 151 may use three or more antennas, and obtain the AoD θ 802 by averaging AoDs θ determined from the respective antennas.

The foregoing description has dealt with an exemplary embodiment where either the information processing apparatus 101 or the communication apparatus 151 uses a plurality of antennas. However, this is not restrictive. Both the apparatuses may use a plurality of antennas.

In the foregoing description, the information processing apparatus 101 is described to detect the direction of the communication apparatus 151. However, this is not restrictive. The information processing apparatus 101 may detect the directions of two or more of the communication apparatuses 151. By detecting the directions of two or more of the communication apparatuses 151 and referring to the respective pieces of detection data, the information processing apparatus 101 can detect the distances between the apparatuses and the directions and positions of the apparatuses with high accuracy, compared to where the information processing apparatus 101 detects the direction of the communication apparatus 151.

The foregoing description has dealt with an example where the communication apparatus 151 transmits advertising information and the information processing apparatus 101 receives the advertising information and detects the direction of the communication apparatus 151. However, in the present exemplary embodiment, the relationship may be reversed. Specifically, the information processing apparatus 101 may transmit advertising information and the communication apparatus 151 may receive the advertising information and detect the direction of the information processing apparatus 101.

(GATT Communication According to Bluetooth® Low Energy Standard)

Now, the GATT communication according to the Bluetooth® Low Energy standard will be outlined. The GATT is a profile controlling reading and writing (transmission and reception) of information in the Bluetooth® Low Energy standard. GATT communication is communication performed by establishing a Bluetooth® Low Energy connection after advertising. For GATT communication, two roles, namely, a GATT client and a GATT server are defined based on the source and destination of data transfer.

A GATT client transmits a request to a GATT server and receives a response from the GATT server. In the present exemplary embodiment, the information processing apparatus 101 serves as a GATT client. The GATT client can read information stored in a storage area in the short-range wireless communication unit of the GATT server, and write information to the storage area.

A GATT server receives a request from a GATT client and returns a response to the GATT client. In the present exemplary embodiment, the communication apparatus 151 serves as a GATT server. The GATT server operates as a device for storing information such as state information about the GATT server.

FIG. 10 is a diagram for describing a GATT data format. GATT data has a hierarchical structure illustrated in FIG. 10, and includes three elements that are called a service, a characteristic, and a descriptor. The descriptor is dispensable. In the present exemplary embodiment, GATT data constructed by the short-range wireless communication unit 157 includes no descriptor.

A service, a characteristic, and a descriptor can be identified by universally unique identifiers (UUIDs) each expressed in 32 digits. A UUID is used as an identifier for uniquely identifying an object on software. A UUID is a 128-bit numerical value and typically represented in hexadecimal notation, like 550e8400-e29b-41d4-a716-446655440000.

There are standard services, characteristics, and descriptors defined by the Bluetooth® Special Interest Group (SIG), as well as vendor-specific ones. Vendor-specific services, characteristics, and descriptors have UUIDs expressed in 32 digits as described above. Standard services, characteristics, and descriptors defined by the Bluetooth® SIG have UUIDs expressed in four digits. For example, the UUID of a standard service, characteristic, or descriptor defined by the Bluetooth® SIG is expressed like 2A49.

Services are sections into which common attributes of GATT data are grouped. Each service includes one or more characteristics. A unique value is set in each characteristic. In a descriptor, an attribute value to be used in a case where a characteristic includes additional information is set. In each service, characteristic, and descriptor, Read and Write attributes that are setting values indicating whether to permit the GATT client a read and a write can be set.

By specifying the UUIDs of a service and a characteristic, the GATT client can perform a read or write on the value set in the specified characteristic. Whether a read and a write can be performed depends on the read and write attributes set in each service and characteristic.

FIG. 11 illustrates examples of GATT data constructed by the short-range wireless communication unit 157. In the GATT data illustrated in FIG. 11, "Service UUID" indicates the UUID assigned to each service. "Service Name" indicates the name of each service. "Characteristic UUID" indicates the UUID assigned to each characteristic. As described above, UUIDs are written in 4 or 32 digits. "Characteristic Name" indicates the name of each characteristic. "Service Readable" indicates whether the value(s) related to each service can be read by the information processing apparatus 101. "Service Writable" indicates whether the value(s) related to each service can be written by the information processing apparatus 101. "Characteristic Readable" indicates whether the value related to each characteristic can be read by the information processing apparatus 101. "Characteristic Writable" indicates whether the value related to each characteristic can be written by the information processing apparatus 101. "Characteristic Indicatable" indicates whether the value related to each characteristic can be indicated (notified) to the information processing apparatus 101 when updated by the communication apparatus 151. "Pairing Required" indicates whether to permit the information processing apparatus 101 to read or write the value related to each characteristic only after pairing.

In a case where "Service Readable" indicates that the value(s) is/are readable (check-marked) and "Characteristic Readable" indicates that the value is/are readable (check-marked), the information processing apparatus 101 can read the value related to the corresponding characteristic. In a case where "Service Readable" indicates that the value(s) is/are readable (check-marked) and "Characteristic Readable" indicates that the value is not readable (blank), the information processing apparatus 101 is unable to read the value related to the corresponding characteristic. "Value" indicates the value set in each characteristic. In a case where "Pairing Required" indicates that pairing is not required (blank), the information processing apparatus 101 can read or write the value related to the corresponding characteristic even in a state where the information processing apparatus 101 is not paired with the communication apparatus 151. On the other hand, in a case where "Pairing Required" indicates that pairing is required (check-marked), the information processing apparatus 101 is unable to read or write the value related to the corresponding characteristic unless the information processing apparatus 101 is paired with the communication apparatus 151.

In the present exemplary embodiment, the information processing apparatus 101 and the communication apparatus 151 perform authentication therebetween, and perform pairing processing for reading and writing data therebetween by GATT communication. The communication apparatus 151 is configured to not permit the reading or writing of information by GATT communication in a state where the information processing apparatus 101 and the communication apparatus 151 are not paired. This can prevent the situation where the not-paired information processing apparatus 101 and communication apparatus 151 communicate with each other and information stored in, for example, the communication apparatus 151 is accidentally obtained by the not-paired information processing apparatus 101. In the present exemplary embodiment, there are two types of GATT communication: one permitted without pairing and one not permitted without pairing. Less confidential information can be communicated by GATT communication that is permitted without pairing, whereby convenience of communication can be improved. On the other hand, information of high confidentiality is permitted to be communicated only by GATT communication that is not permitted without pairing, whereby communication security can be improved.

Details of the pairing processing will be described with reference to FIGS. 4A and 4B. Initially, in a case where the foregoing print application is activated and an execution instruction for the pairing processing is accepted from the user via the print application, the information processing apparatus 101 starts to search for advertising information including specific apparatus information. Examples of the specific apparatus information include the UUID and MAC address of an apparatus (such as a printer) corresponding to the print application. In a case where the information processing apparatus 101 receives the advertising information including the specific apparatus information, the information processing apparatus 101 displays a list of apparatuses from which the advertising information including the specific apparatus information is transmitted on the display unit 108. The information processing apparatus 101 then accepts the user's selection of the apparatus to be paired. The following description is given on the assumption that the communication apparatus 151 is selected here.

Accepting the selection of the apparatus to be paired, the information processing apparatus 101 transmits a pairing request to the communication apparatus 151 by communication using the Security Manager Protocol. The communication between the apparatuses is performed by using the Security Manager Protocol until the end of the pairing.

Figure 4A:
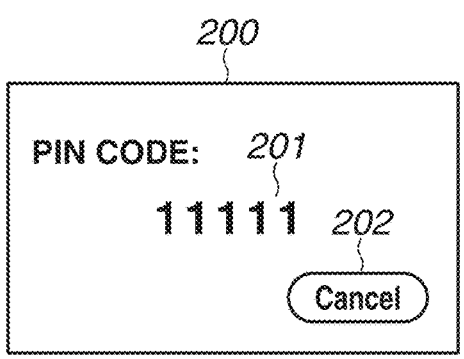
FIGS. 4A and 4B are schematic diagrams illustrating screens related to pairing processing.
Figure 4B:
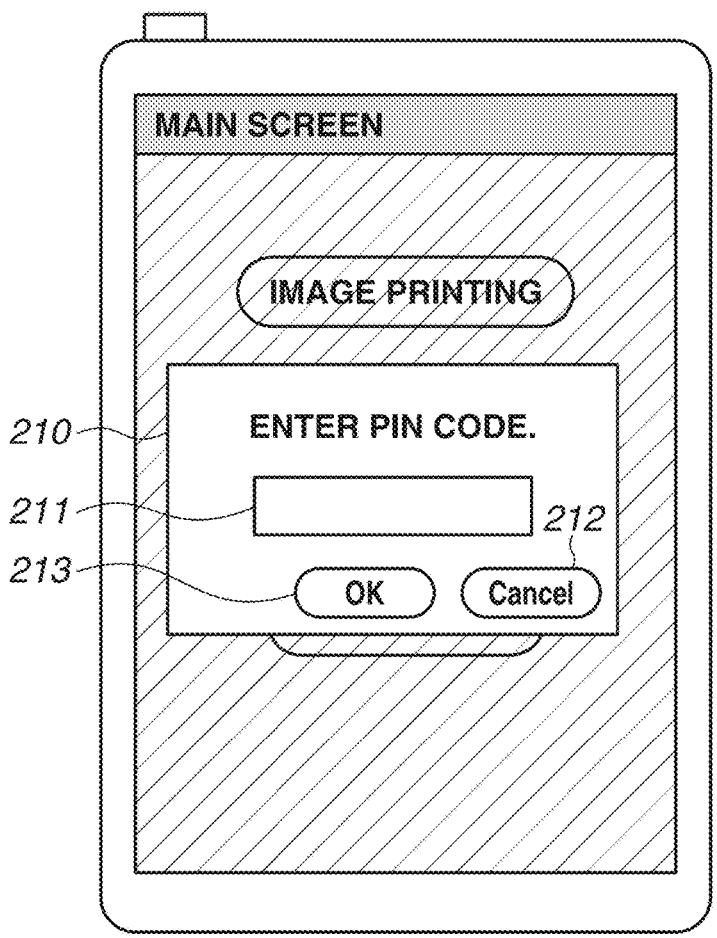

Receiving the pairing request, the communication apparatus 151 displays a personal identification number (PIN) code display screen 200 illustrated in FIG. 4A on the display unit 158. The PIN code display screen 200 displays a PIN code 201 and a cancel button 202 for cancelling the pairing processing. After transmission of the pairing request, the information processing apparatus 101 then displays a PIN code input screen 210 illustrated in FIG. 4B on the display unit 108. The PIN code input screen 210 displays a PIN code input area 211 for accepting input of the PIN code 201 by the user. The PIN code input screen 210 also displays an OK button 213 for transmitting the input PIN code 201 to the communication apparatus 151 and a cancel button 212 for cancelling the pairing processing. In a case where the OK button 213 is pressed with the PIN code 201 input to the PIN code input area 211, the information processing apparatus 101 transmits information including the input PIN code 201 to the communication apparatus 151. The communication apparatus 151 determines whether the PIN code 201 included in the information received coincides with that displayed on the PIN code display screen 200. In a case where the PIN codes 201 are determined to coincide, the communication apparatus 151 permits the information processing apparatus 101 pairing. Specifically, the communication apparatus 151 exchanges a link key (authentication information) generated from the PIN code 201 by a predetermined method with the information processing apparatus 101 by using the Security Manger Protocol (SMP) according to the Bluetooth® Low Energy standard. The exchanged link key is stored in both a storage area of the information processing apparatus 101 (such as the RAM 105) and a storage area of the communication apparatus 151 (such as the RAM 153). This completes the pairing, and the apparatuses are permitted to perform Bluetooth® Low Energy communication thereafter. In a case where the pairing is completed, the information processing apparatus 101 hides the PIN code display screen 200 and displays the original screen again.

After the completion of the pairing, the information processing apparatus 101, in transmitting a GATT communication request to the communication apparatus 151, notifies the communication apparatus 151 of the link key stored into its storage area during the pairing processing. Receiving the GATT communication request, the communication apparatus 151 compares the link key stored into its storage area during the pairing processing with the notified link key, and checks whether the apparatus issuing the GATT communication request is a paired one. In a case where the apparatus issuing the GATT communication request is confirmed to be a paired one, the communication apparatus 151 starts the reading or writing of information with the information processing apparatus 101 by GATT communication. In such a manner, once the pairing processing with the communication apparatus 151 is completed, the information processing apparatus 101 can perform GATT communication with the communication apparatus 151 thereafter without the user inputting a PIN code.

In the above described case, the PIN code 201 displayed on the PIN code input screen 210 is input to the PIN code input area 211 by the user. However, this is not restrictive. For example, the PIN code 201 may be fixed information (not freely modifiable by the user) and stored in the information processing apparatus 101 along with the installation of the print application so that the PIN code 201 is notified to the communication apparatus 151 without the user input. The timing to start the pairing processing is not limited to the foregoing, either. For example, the pairing processing may be started at timing when the user gives an instruction for printing via the print application or at timing before the Bluetooth® Low Energy connection is established in the connection setting processing.

The PIN code input screen 210 that is displayed on the information processing apparatus 101 may be displayed other than by the print application. For example, the information processing apparatus 101 may include a setting application. The setting application refers to an application program for performing settings related to functions performed by the OS. For example, the setting application is an application program installed together with the OS during a series of processes where the OS is installed on the information processing apparatus 101, or one preinstalled on the information processing apparatus 101 along with the OS when the information processing apparatus 101 is delivered. The information processing apparatus 101 may activate, in performing pairing with the communication apparatus 151, the setting application to shift the print application to the background, and accept the user's pairing input performed on a Bluetooth® setting screen displayed by the setting application.

In the foregoing description, a pairing method is a PIN code input type method. However, the pairing method is not limited to the foregoing description. A pairing method different from that of PIN code input type will be described. The information processing apparatus 101 obtains information called a key seed, which is information stored in the communication apparatus 151, from the communication apparatus 151 via a Bluetooth® Low Energy connection. The information processing apparatus 101 and the communication apparatus 151 then generate respective link keys from the key seed according to a rule known to both in advance. The generated link keys are stored in the storage area of the information processing apparatus 101 (such as the RAM 105) and the storage area of the communication apparatus 151 (such as the RAM 153), respectively. That is, the same link key is stored in both the information processing apparatus 101 and the communication apparatus 151. The communication apparatus 151 and the information processing apparatus 101 perform authentication therebetween by thus generating the link key and enabling GATT communication using the link key, whereby the pairing processing is completed. After the completion of the pairing processing, the information processing apparatus 101 and the communication apparatus 151 communicate information encrypted based on the link key therebetween. Receiving information encrypted based on the link key, the information processing apparatus 101 and the communication apparatus 151 can decrypt the encryption by using the link key stored in the own apparatus and recognize the unencrypted information.

(Advertising and Bluetooth® Low Energy Connection Sequence)

FIG. 12 is a sequence diagram for describing Bluetooth® Low Energy communication between the information processing apparatus 101 and the communication apparatus 151. The processing of the communication apparatus 151 illustrated by this processing sequence is implemented by the CPU 154 loading a control program stored in the ROM 152 or an HDD (not illustrated) included in the communication apparatus 151 into the RAM 153 and executing the control program. The processing of the information processing apparatus 101 illustrated by this processing sequence is implemented by the CPU 103 loading a control program stored in the ROM 104 or an HDD (not illustrated) included in the information processing apparatus 101 into the RAM 105 and executing the control program.

In the following description, the communication apparatus 151 is an advertiser that transmits advertising information at predetermined intervals. The information processing apparatus 101 is a scanner that waits for advertising information transmitted from an advertiser nearby. In steps S1301 to S1303, the short-range wireless communication unit 157 in the communication apparatus 151 initially transmits the advertising information. The information processing apparatus 101 can recognize the presence of the communication apparatus 151 by the short-range wireless communication unit 110 receiving the advertising information transmitted from the short-range wireless communication unit 157.

In a case where the information processing apparatus 101 recognizes the communication apparatus 151 and determines to connect to the communication apparatus 151, the information processing apparatus 101 transmits connection request information to the communication apparatus 151. Specifically, in step S1304, the short-range wireless communication unit 110 transmits CONNECT_REQ that is a connection request for entering a connection event where a Bluetooth® Low Energy-based network connection is established. As described above, the short-range wireless communication unit 157 may perform advertising by using the first advertising information and the second advertising information (scan response) separately. In other words, the short-range wireless communication unit 110 may transmit a scan request in response to the first advertising information, and transmit the connection request (CONNECT_REQ) in response to the second advertising information (scan response). In a case where the short-range wireless communication unit 157 receives CONNECT_REQ, the information processing apparatus 101 and the communication apparatus 151 perform preparations for entering the connection event. Specifically, the short-range wireless communication units 110 and 157 notify the CPUs 103 and 154 of the completion of the connection processing for GATT communication, respectively.

The information processing apparatus 101 and the communication apparatus 151 then transition from the scanner and the advertiser to a master and a slave, respectively. The information processing apparatus 101 serving as a master and the communication apparatus 151 serving as a slave establish a connection (Bluetooth® Low Energy connection) for GATT communication. According to the Bluetooth® Low Energy standard, a master can form a one-to-many (1:m) star topology with slaves. After the establishment of the Bluetooth® Low Energy connection, the information processing apparatus 101 and the communication apparatus 151 can communicate data by the GATT communication method.

Before accessing GATT data in the communication apparatus 151 by GATT communication, the information processing apparatus 101 obtains information indicating what configuration of GATT data the communication apparatus 151 has. Examples of the information indicating the configuration of GATT data include the number of services in the GATT data, the number of characteristics, the values of respective UUIDs, and attributes indicating readability. The procedure by which the information processing apparatus 101 obtains the information indicating the configuration of the GATT data will be referred to as discovery.

After the Bluetooth® Low Energy connection is established in step S1304, then in step S1305, the information processing apparatus 101 starts discovery. Specifically, the information processing apparatus 101 transmits a discovery request for requesting information indicating the configuration of the GATT data in the communication apparatus 151 to the communication apparatus 151. As a response to the discovery request, the communication apparatus 151 transmits information indicating the configuration of the GATT data to the information processing apparatus 101. Receiving the information indicating the configuration of the GATT data, the information processing apparatus 101 identifies an area where a hash value is stored in the GATT data of the communication apparatus 151, and reads the hash value. In FIG. 11, the hash value refers to the value stored in the characteristic Database Hash with a Characteristic UUID of 0x2B2A. The communication apparatus 151 stores a hash value that the communication apparatus 151 has calculated from the configuration of the GATT data in advance as the value of the characteristic Database Hash. In other words, the hash value is a value uniquely determined based on the configuration of the GATT data on the communication apparatus 151.

The information processing apparatus 101 stores hash values read from terminals to which the information processing apparatus 101 has connected by Bluetooth® Low Energy in the past in a memory (such as the RAM 105) of the information processing apparatus 101. In step S1306, the information processing apparatus 101 compares the hash value read in step S1305 with the hash values read in the past (hash values stored in the memory of the information processing apparatus 101) to find a match. In other words, the information processing apparatus 101 determines whether the communication apparatus 151 is a terminal to which the information processing apparatus 101 has connected by Bluetooth® Low Energy in the past. Here, the information processing apparatus 101 may use not only the hash value but also other information, for example, individual identification information, such as the MAC address of the communication apparatus 151, as determination criteria.

In a case where the determination of step S1306 is NO, the information processing apparatus 101 continues discovery to find out the rest of the configuration of the GATT data in the communication apparatus 151. In step S1307, the information processing apparatus 101 therefore transmits a discovery request for requesting information indicating the configuration of the GATT data of the communication apparatus 151 to the communication apparatus 151. In step S1308, the communication apparatus 151 accepting the discovery request transmits information indicating the configuration of the GATT data to the information processing apparatus 101. The transmission and reception of information indicating the configuration of the GATT data is repeated as many times as the number of services, characteristics, and descriptors in the GATT data. In step S1309, the information processing apparatus 101 and the communication apparatus 151 thus repeat the transmission and reception of a discovery request and the transmission and reception of information indicating the configuration of the GATT data until all the information indicating the configuration of the GATT data has been transmitted.

After the transmission of all the information indicating the configuration of the GATT data is completed, then in step S1310, the information processing apparatus 101 stores the configuration of the GATT data in the communication apparatus 151 as a cache into the memory included in the information processing apparatus 101. In this processing, the information processing apparatus 101 stores the cache of the configuration of the GATT data in the communication apparatus 151 and the hash value obtained from the communication apparatus 151 into the memory in association with each other. The information processing apparatus 101 may store the cache into the memory further in association with other information, such as the MAC address and other individual identification information about the communication apparatus 151.

In a case where the determination of step S1306 is YES, the processing of steps S1307 to S1310 may be omitted since the information processing apparatus 101 has already cached the configuration of the GATT data in the communication apparatus 151.

In step S1311, the information processing apparatus 101 and the communication apparatus 151 perform GATT communication. In step S1312, after the completion of the GATT communication, the information processing apparatus 101 transmits a release request. In step S1313, the communication apparatus 151 receiving the release request transmits a release response, and ends the Bluetooth® Low Energy connection between the apparatuses. In a case where the Bluetooth® Low Energy connection between the apparatuses is ended, the information processing apparatus 101 and the communication apparatus 151 return to a scanner and an advertiser, respectively. The communication apparatus 151 resumes transmitting the advertising information.

In the foregoing example, the communication apparatus 151 is described to serve as an advertiser, and the information processing apparatus 101 a scanner. However, the present exemplary embodiment is applicable if the relationship is reversed. Specifically, the information processing apparatus 101 may serve as an advertiser, and the communication apparatus 151 a scanner.

(Wi-Fi Communication Via Bluetooth® Low Energy Communication)

A sequence for establishing a connection for Wi-Fi communication that is faster than Bluetooth® Low Energy communication by using Bluetooth® Low Energy communication that is low-speed communication will be described. FIG. 13 is a sequence diagram for a case where the information processing apparatus 101 and the communication apparatus 151 establish a network connection by using the Bluetooth® Low Energy communication method. Here, a case where a job is transmitted and received by handover will be described as an example. The handover refers to a technique where the apparatuses to communicate initially exchange connection information for performing communication based on a high-speed communication method by using a short-range communication method (low-speed communication method), and then switch to the high-speed communication method and perform data transmission and reception.

In the present exemplary embodiment, Bluetooth® Low Energy is used as the short-range communication method, and Wi-Fi as the high-speed communication method. GATT communication (bidirectional communication enabled by a Bluetooth® Low Energy connection established between apparatuses) has a communication speed lower than that of Wi-Fi communication. Efficient data transfer can thus be achieved by communicating connection information to be used for authentication and Wi-Fi communication between the apparatuses by GATT communication, and transferring a large volume of data (here, job) by Wi-Fi communication having a high communication speed. The communication methods for handover are not limited to the foregoing, and various communication methods may be used as the short-range communication method and the high-speed communication method. For example, the connection information for Wi-Fi communication may be exchanged by near field communication (NFC) or Wi-Fi Aware communication, and then data may be exchanged by Wi-Fi communication.

The processing of the communication apparatus 151 illustrated by this processing sequence is implemented by the CPU 154 loading a control program stored in the ROM 152 or the HDD (not illustrated) included in the communication apparatus 151 into the RAM 153 and executing the control program. The processing of the information processing apparatus 101 illustrated by this processing sequence is implemented by the CPU 103 loading a control program stored in the ROM 104 or the HDD (not illustrated) included in the information processing apparatus 101 into the RAM 105 and executing the control program.

In the following description, the communication apparatus 151 serves as an advertiser that transmits advertising information at predetermined intervals. The information processing apparatus 101 serves as a scanner that waits for advertising information transmitted from an advertiser nearby.

In steps S1001 to S1003, the short-range wireless communication unit 157 initially transmits advertising information. The information processing apparatus 101 can recognize the presence of the communication apparatus 151 by the short-range wireless communication unit 110 receiving the advertising information transmitted from the short-range wireless communication unit 157.

In a case where the information processing apparatus 101 recognizes the communication apparatus 151 and determines to connect to the communication apparatus 151, the information processing apparatus 101 transmits connection request information to the communication apparatus 151. Specifically, in step S1004, the short-range wireless communication unit 110 transmits CONNECT_REQ that is a request for entering a connection event where a ® Low Energy-based network connection is established. In a case where the short-range wireless communication unit 157 receives CONNECT_REQ, the information processing apparatus 101 and the communication apparatus 151 perform preparations for entering the connection event. Specifically, the short-range wireless communication units 110 and 157 notify the CPUs 103 and 154, respectively, of the completion of the connection processing for GATT communication. The information processing apparatus 101 and the communication apparatus 151 then transition from the scanner and the advertiser to a master and a slave, respectively. The information processing apparatus 101 serving as a master and the communication apparatus 151 serving as a slave establish a connection (Bluetooth® Low Energy connection) for GATT communication. According to the Bluetooth® Low Energy standard, a master can form a "1:m" star topology with slaves. After the establishment of the Bluetooth® Low Energy connection, the information processing apparatus 101 and the communication apparatus 151 can communicate data by the GATT communication method. The processing of steps S1001 to S1004 is similar to that of steps S1301 to S1304 in FIG. 12. In a case where the Bluetooth® Low Energy connection is established, the communication apparatus 151 may stop advertising or change the contents of the advertising information to be transmitted. Specifically, the communication apparatus 151 may switch from advertising information (ADV_IND) that enables the receiving apparatus to transmit a connection request to advertising information (ADV_SCAN_IND or ADV_NONCONN_IND) that disables the receiving apparatus to transmit a connection request. While, in FIG. 12, the processing of steps S1307 to S1310 is executed after the execution of steps S1305 and S1306, and then GATT communication is performed in step S1311, such processing is omitted in FIG. 13.

In step S1005, the short-range wireless communication unit 110 requests information about communication protocols available for the communication apparatus 151 from the short-range wireless communication unit 157 by using GATT communication. This request includes information about communication protocols available for the information processing apparatus 101. Receiving the request, the short-range wireless communication unit 157 can recognize that the information processing apparatus 101 can use the Wi-Fi communication method.

In step S1006, the short-range wireless communication unit 157 responds to the request received in step S1005 with the information about the communication protocols available for the own apparatus by using GATT communication. In the above described way, the information processing apparatus 101 and the communication apparatus 151 can find out each other's communication protocols available other than Bluetooth® Low Energy.

Suppose here that the information processing apparatus 101 finds out each other's communication protocols available other than Bluetooth® Low Energy, and determines to switch the communication method between the apparatuses to Wi-Fi communication. Alternatively, whether to switch the communication method may be determined by the communication apparatus 151.

In a case where the communication method is determined to be switched, then in steps S1007 and S1008, the information processing apparatus 101 and the communication apparatus 151 exchange connection information for use in performing Wi-Fi communication. Examples of the connection information include address information and SSID information for identifying the communication partner. Then, in step S1009, the short-range wireless communication unit 110 transmits a request (communication switch request) to switch the communication method between the apparatuses from GATT communication to Wi-Fi communication. In step S1010, the short-range wireless communication unit 157 receiving the communication switch request returns a response (communication switch response).

In a case where the communication switch request and the communication switch response are properly performed, then in step S1011, the information processing apparatus 101 switches the communication unit to be used for communication with the communication apparatus 151 from the short-range wireless communication unit 110 to the communication unit 109.

In step S1012, the communication apparatus 151 switches the communication unit to be used for communication with the information processing apparatus 101 from the short-range wireless communication unit 157 to the communication unit 156. In step S1013, after the switching, the short-range wireless communication unit 110 transmits a release request. In step S1014, the short-range wireless communication unit 157 receiving the release request transmits a release response, and ends the Bluetooth® Low Energy connection between the apparatuses. In a case where the Bluetooth® Low Energy connection between the apparatuses is ended, the information processing apparatus 101 and the communication apparatus 151 return to a scanner and an advertiser, respectively. The short-range wireless communication unit 157 resumes transmitting the advertising information.

The information processing apparatus 101 and the communication apparatus 151 then perform Wi-Fi communication by using the information for use in performing Wi-Fi communication, exchanged in steps S1007 and S1008. In step S1015, the communication unit 109 initially inquires of the communication unit 156 whether the communication apparatus 151 is capable of job acquisition. For example, information about free space for temporarily storing image data to be transferred to the communication apparatus 151 is inquired here. In step S1016, the communication unit 156 receiving the inquiry request transmits a response to the inquiry.

In a case where a proper response is obtained and the communication apparatus 151 is determined to be capable of job acquisition, then in step S1017, the communication unit 156 requests a job. In step S1018, the communication unit 109 receiving the request for a job transmits a job including image data stored in the information processing apparatus 101 to the communication unit 156. The job to be transmitted here is selected, for example, at a timing before the Bluetooth® Low Energy connection is established, a timing after the Bluetooth® Low Energy connection is established, or a timing after the Wi-Fi connection is established. The job to be transmitted is not limited to a print job. For example, a scan job for instructing the communication apparatus 151 to perform a scan or a job for the information processing apparatus 101 to obtain information about the state of the communication apparatus 151 may be transmitted. Other examples may include commands to perform various operations on the communication apparatus 151, such as changing the settings of the communication apparatus 151. In a case where the communication apparatus 151 is an imaging apparatus, such as a camera, image data captured by the camera may be transmitted to the information processing apparatus 101, such as a smartphone, by Wi-Fi communication. In a case where the communication apparatus 151 is a music playback device, sound data may be transmitted from the information processing apparatus 101, such as a smartphone, to the music playback device by Wi-Fi communication.

In a case where the transmission of the job is completed, the information processing apparatus 101 disconnects the Wi-Fi connection with the communication apparatus 151, and returns to the network state immediately before the handover. Specifically, for example, in a case where the information processing apparatus 101 is connected to a mobile communication network, such as the third generation (3G) and Long-Term Evolution (LTE) networks, or an AP, such as a router, before the execution of the handover, the information processing apparatus 101 re-establishes the connection with the mobile communication network or the AP. For that purpose, the information processing apparatus 101, before performing the handover, stores information about the network state immediately before the handover and connection information to be used to establish the network state.

As described above, by using the handover technique, connection information for performing communication by a high-speed communication method can be exchanged by a communication method of high usability (short-range communication method) and then a large volume of data can be exchanged at high speed by the high-seed communication method. In a case where the communication method is switched from GATT communication to Wi-Fi communication by handover, the Bluetooth® Low Energy connection between the apparatuses is disconnected. The short-range wireless communication unit 157 thus resumes transmitting the advertising information.

In the foregoing example, the communication apparatus 151 is described to serve as an advertiser and the information processing apparatus 101 as a scanner. However, the present exemplary embodiment is also applicable if the relationship is reversed. More specifically, the information processing apparatus 101 may serve as an advertiser and the communication apparatus 151 as a scanner.

(Estimation of Relative Positions)

Next, a method for estimating relative position information by using the position detection function according to Bluetooth® 5.1 will be described. The method will be described in detail below with reference to FIGS. 28A and 28B.

A printer 1402 include the configuration of the communication apparatus 151 illustrated in FIG. 1. The printer 1402 is a stationary one. Examples of the installation location of the printer 1402 include a convenience store, an office, and a private home. Installation position information, installation altitude, and a usage type of the printer 1402 are registered in a memory of the printer 1402 in advance.

A smartphone 1403 includes the configuration of the information processing apparatus 101 illustrated in FIG. 1. At time T0, the smartphone 1403 is located at position P0 and moving in a direction of 120.8° in true bearing at a moving speed of 2.5 knots (=4.63 km/h). The smartphone 1403 includes the GPS reception unit 112 and can obtain its own current position information based on information received by the GPS reception unit 112. Since the smartphone 1403 is a portable terminal (mobile terminal), the position of the smartphone 1403 is variable.

A wearable device 1404 is a device that is worn on body in use. Examples include a wristwatch and goggles. The wearable device 1404 includes basically the same configuration as that of the information processing apparatus 101 illustrated in FIG. 1, but without the GPS reception unit 112. Since the wearable device 1404 is a portable terminal (mobile terminal), the position of the wearable device 1404 is variable.

An automatic teller machine (ATM) 2801 includes a similar configuration to that of the communication apparatus 151 illustrated in FIG. 1. The ATM 2801 is a stationary one. Examples of the installation location of the ATM 2801 include in a convenience store, in a shopping mall, indoor at a station or airport, and in an office. Installation position information, installation altitude information, and the usage type of the ATM 2801 are registered in a memory of the ATM 2801 in advance.

Figure 28A:
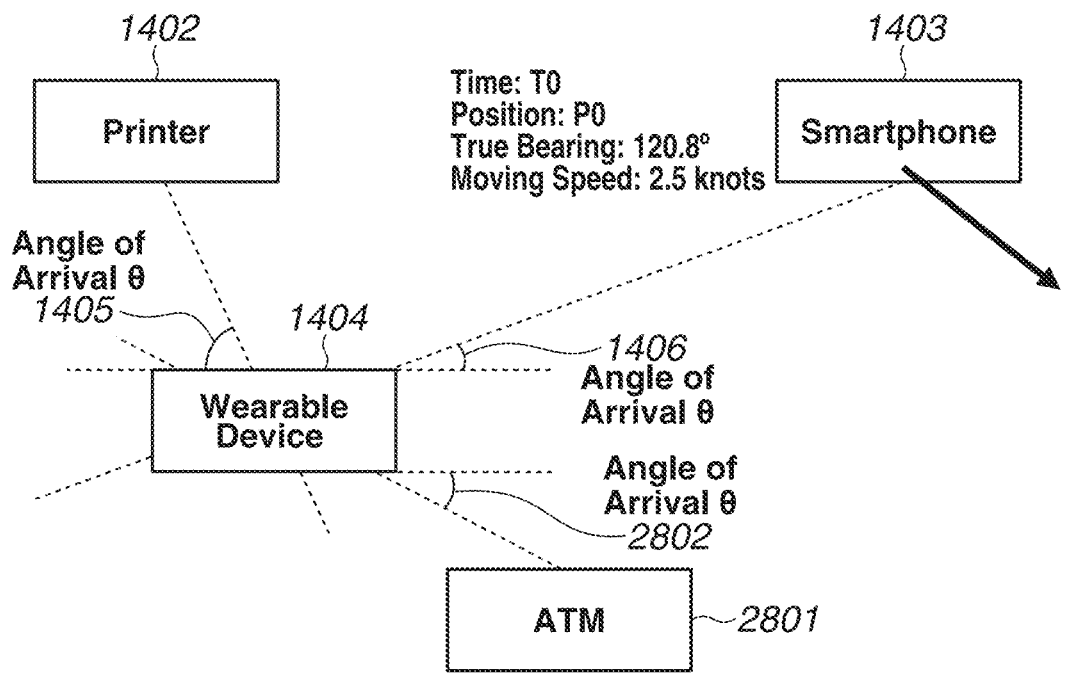
FIGS. 28A and 28B are diagrams illustrating an example of relative positions of a plurality of Bluetooth® Low Energy devices and an example of an area covered by the Angles of Arrival θ of the Bluetooth® Low Energy devices.
Figure 28B:
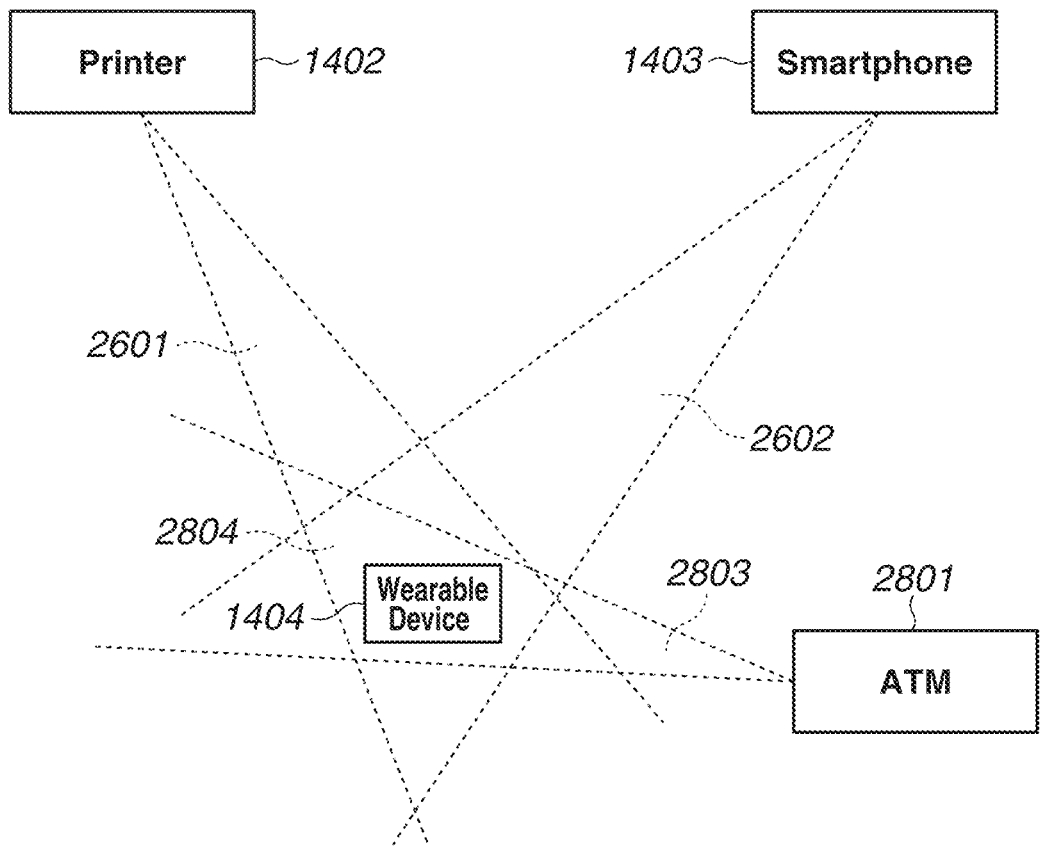

In FIGS. 28A and 28B, the printer 1402, the smartphone 1403, and the ATM 2801 function as Bluetooth® Low Energy advertisers (hereinafter, also referred to as advertiser devices). The wearable device 1404 functions as a Bluetooth® Low Energy scanner (hereinafter, also referred to as scanner device). An AoA θ 1405 is an AoA θ calculated from an AoA Radio Signal that the wearable device 1404 receives from the printer 1402. An AoA θ 1406 is an AoA θ calculated from an AoA Radio Signal that the wearable device 1404 receives from the smartphone 1403. An AoA θ 2802 is an AoA θ calculated from an AoA Radio Signal that the wearable device 1404 receives from the ATM 2801.

Suppose that at time T0 in FIG. 28A, there is only one Bluetooth® Low Energy advertiser device (for example, only the smartphone 1403) near the wearable device 1404. The wearable device 1404 here can estimate its own current relative position based on the AoA θ 1406 from the smartphone 1403 and the field intensity of an advertising packet (scan response). A detailed description is given below.

In FIG. 28A, the wearable device 1404 can determine the AoA θ 1406 from Eq. (1) based on the advertising information that the wearable device 1404 receives from the smartphone 1403. In other words, the wearable device 1404 can estimate the angle between the wearable device 1404 and the smartphone 1403. The wearable device 1404 can further estimate the distance between the wearable device 1404 and the smartphone 1403 based on the field intensity of the received advertising information. Specifically, the distance between the smartphone 1403 and the wearable device 1404 can be estimated based on the received field intensity by using a table (see FIG. 21 to be described below) indicating a relationship between the field intensity and the distance.

The position which is the estimated distance away from the smartphone 1403 in the direction of the estimated angle is thus the estimated position of the wearable device 1404. More specifically, in FIG. 28A, the position which is the estimated distance away from the smartphone 1403 on the broken line that starts at the smartphone 1403 and forms the AoA θ 1406 is the current estimated relative position of the wearable device 1404.

A case where there is assumed to be a plurality of Bluetooth® Low Energy advertiser devices (for example, the printer 1402, the smartphone 1403, and the ATM 2801) near the wearable device 1404 at time T0 in FIG. 28A will be described. The wearable device 1404 selects two of the Bluetooth® Low Energy advertiser devices. The wearable device 1404 can then calculate and estimate its own current relative position based on information obtained from the two Bluetooth® Low Energy advertiser devices.

An example of a case where the wearable device 1404 selects the printer 1402 and the smartphone 1403 as the two Bluetooth® Low Energy advertiser devices in FIG. 28A will be described. In such a case, the intersection of the broken line that starts at the printer 1402 and forms the AoA θ 1405 and the broken line that starts at the smartphone 1403 and forms the AoA θ 1406 (area 2603 in FIG. 26A) is the calculated current estimated relative position of the wearable device 1404. The wearable device 1404 can estimate the distances from the printer 1402 and the smartphone 1403 based on the field intensities of the advertising packets transmitted from the printer 1402 and the smartphone 1403, respectively, by using the table illustrated in FIG. 21. While, in the foregoing description, the printer 1402 and the smartphone 1403 are selected, the relative positions of the wearable device 1404 and the ATM 2801 can be similarly estimated in a case where the ATM 2801 is selected. Specifically, the wearable device 1404 can estimate the relative position with respect to the ATM 2801 based on the AoA θ 2802 and the field intensity of the advertising packet transmitted from the ATM 2801, using the table illustrated in FIG. 21.

(Table of Field Intensities and Distances)

The table that the wearable device 1404 uses to determine a distance from a Bluetooth® Low Energy advertiser device will now be described. FIG. 21 is a diagram illustrating an example of a table of field intensities, field intensity levels, and estimated distances. In FIG. 21, the "field intensity" (in units of dBm) indicates the intensity of radio waves of the advertising information that the wearable device 1404 receives from a Bluetooth® Low Energy advertiser device such as the printer 1402 and the smartphone 1403. The "field intensity level" is the field intensity defined in five grade levels depending on the range of intensity. In this example, the field intensity levels are defined in ascending order of the field intensity, i.e., 1 (weakest), 2, 3, 4, and 5 (strongest). The "estimated distance" indicates the estimated distance between the wearable device 1404 and the Bluetooth® Low Energy advertiser device issuing the radio waves at each field intensity level. In the description of FIGS. 28A and 28B, the distance is estimated from the field intensity by using the table of FIG. 21. However, the present exemplary embodiment is not limited thereto. For example, in a case where the payload 902 of the received advertising information includes transmission power (Tx Power 905), the wearable device 1404 may use the value of the Tx Power 905. More specifically, the wearable device 1404 can determine propagation loss based on the value of the Tx Power 905 and the field intensity of the received advertising information, and can estimate the distance from the Bluetooth® Low Energy advertiser device.

(Method for Selecting Bluetooth® Low Energy Advertiser Devices)

A method for selecting two of the plurality (three) of Bluetooth® Low Energy advertiser devices will be described. The wearable device 1404 converts the field intensities of the advertising packets (scan responses) from the respective Bluetooth® Low Energy advertiser devices into field intensity levels by using the table illustrated in FIG. 21.

In a case where there is a Bluetooth® Low Energy advertiser device having a field intensity level of 5, the wearable device 1404 selects the Bluetooth® Low Energy advertiser device.

In a case where all the three Bluetooth® Low Energy advertiser devices have a field intensity level of 5 (case 1), the wearable device 1404 preferentially selects one(s) of which the usage type is "stationary". In case 1, the wearable device 1404 selects the printer 1402 and the ATM 2801 that are Bluetooth® Low Energy advertiser devices of which the usage type is "stationary".

In a case where all the Bluetooth® Low Energy advertiser devices have a field intensity level of 4 or lower (case 2), the wearable device 1404 preferentially selects one(s) of which the usage type is "stationary". In case 2, suppose, for example, that the printer 1402 has a field intensity level of 2, the smartphone 1403 has a field intensity level of 4, and the ATM 2801 has a field intensity level of 3. In such a case, the wearable device 1404 selects the printer 1402 and the ATM 2801.

In a case where there is a plurality of Bluetooth® Low Energy advertiser devices of which the usage type is "stationary" (case 3), the wearable device 1404 preferentially selects a Bluetooth® Low Energy advertiser device having a higher field intensity level (greater value). For example, in a case where the smartphone 1403 has a field intensity level of 5, the printer 1402 has a field intensity level of 3, and the ATM 2801 has a field intensity level of 4, the wearable device 1404 selects the smartphone 1403 and the ATM 2801. For example, in a case where the smartphone 1403 has a field intensity level of 5, and both the printer 1402 and the ATM 2801 have a field intensity level of 4, the wearable device 1404 selects the smartphone 1403 and either the printer 1402 or the ATM 2801.

As described above, in the present exemplary embodiment, in a case where the wearable device 1404 calculates and estimates its own current relative position based on a plurality of Bluetooth® Low Energy advertiser devices nearby, the wearable device 1404 determines the Bluetooth® Low Energy advertiser devices to be used for the estimation of the relative position based on the field intensities and the usage types.

In particular, in the present exemplary embodiment, Bluetooth® Low Energy advertiser devices of which the usage type is "stationary" are preferentially used. The reason is that in a case where the Bluetooth® Low Energy advertiser devices include one assumed to be used in a mobile fashion, like the smartphone 1403, the estimation accuracy of the relative position drops as the Bluetooth® Low Energy advertiser device moves. More specifically, the accuracy of the calculated current relative position of the wearable device 1404 drops due to a calculation error resulting from the movement of the Bluetooth® Low Energy advertiser device. Using the advertising information from Bluetooth® Low Energy advertiser devices of which the usage type is "stationary" by priority thus enables accurate determination of the relative position of the wearable device 1404. The information about the usage type is included in the advertising information from the Bluetooth® Low Energy advertiser devices.

In the present exemplary embodiment, Bluetooth® Low Energy advertiser devices having a higher field intensity level are preferentially used. The reason is that in a case where the field intensity of an advertising packet (scan response), i.e., the field intensity level of a Bluetooth® Low Energy advertiser device is low, an error in the estimated distance between the wearable device 1404 and the Bluetooth® Low Energy advertiser device increases. In other words, the accuracy of the calculated current relative position of the wearable device 1404 drops.

In such cases, the wearable device 1404 therefore preferentially selects Bluetooth® Low Energy advertiser devices of which the usage type is "stationary" and ones having a high field intensity level (large value). This can improve the accuracy of the current relative position of the wearable device 1404. While, in the foregoing example, higher priority is given to "stationary" Bluetooth® Low Energy advertiser devices and ones having a high field intensity level, the present exemplary embodiment is not limited thereto. Higher priority may be given to being "stationary" than having a high field intensity. Bluetooth® Low Energy advertiser devices may be selected based only on being "stationary", without taking into account the field intensity.

As illustrated in FIG. 21, the accuracy of the distance estimated based on the field intensity drops as the distance from the Bluetooth® Low Energy advertiser device increases. Meanwhile, while an error in the AoA θ increases as the distance from the Bluetooth® Low Energy advertiser device increases, the error is considered to be less severe, and the accuracy of the AoA θ is higher, than those of the field intensity at the same distance. In such a case, the current relative position of the wearable device 1404 can thus be calculated and estimated with higher accuracy in the presence of a plurality Bluetooth® Low Energy advertiser devices than in the presence of only one ® Low Energy advertiser device nearby. The relative position is therefore desirably estimated by using advertising information from a plurality of Bluetooth® Low Energy advertiser devices.

FIG. 28B is a diagram illustrating an example of areas covered by the AoAs θ of the Bluetooth® Low Energy advertiser devices. In FIG. 28B, an AoA θ area 2601 is an area covered by the AoA θ calculated from the AoA Radio Signal that the wearable device 1404 receives from the printer 1402. An AoA θ area 2602 is an area covered by the AoA θ calculated from the AoA Radio Signal that the wearable device 1404 receives from the smartphone 1403. An AoA θ area 2803 is an area covered by the AoA θ calculated from the AoA Radio Signal that the wearable device 1404 receives from the ATM 2801.

The wearable device 1404 includes the short-range wireless communication unit 110 illustrated in FIG. 1. The short-range wireless communication unit 110 includes the three antennas 601, 602, and 603 illustrated in FIG. 6. Errors in the AoAs θ calculated from the AoA Radio Signals received at the antennas 601, 602, and 603 increase as the distances from the printer 1402, the smartphone 1403, and the ATM 2801 increase. In other words, the AoAs θ cover areas such as the AoA θ areas 2601, 2602, and 2803. An area 2804 is an area covered by the AoA θ areas 2601, 2602, and 2803. The wearable device 1404 can be calculated to be located within the area 2804.

Figure 26A:
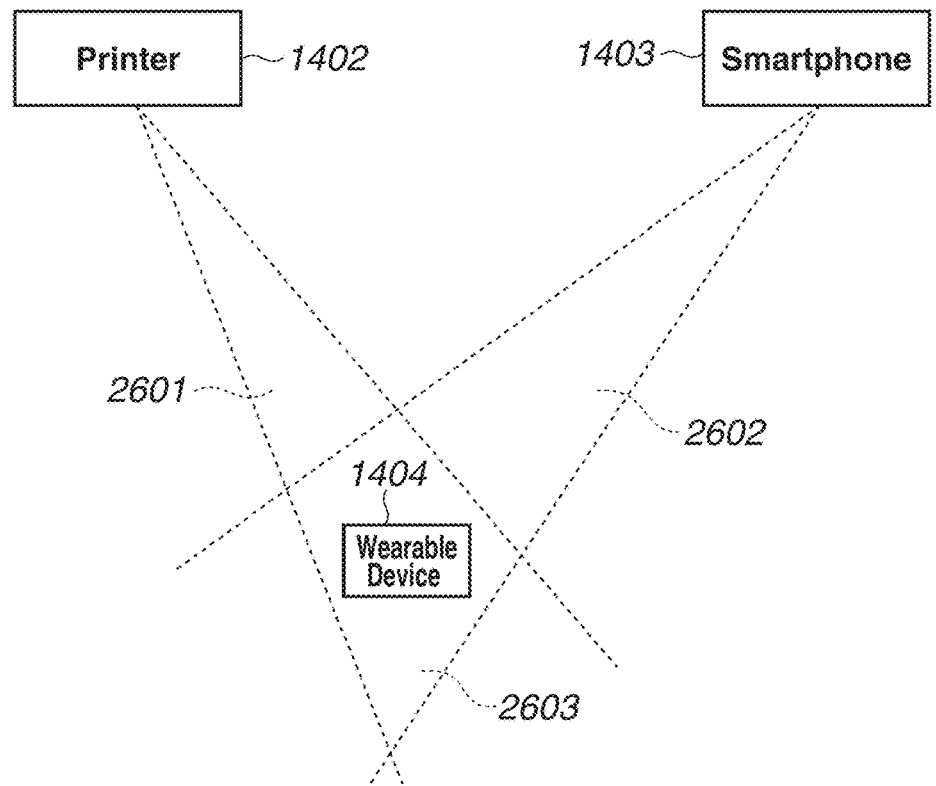
FIGS. 26A and 26B are diagrams each illustrating an example of an area covered by Angles of Arrival θ of Bluetooth® Low Energy devices.
Figure 26B:
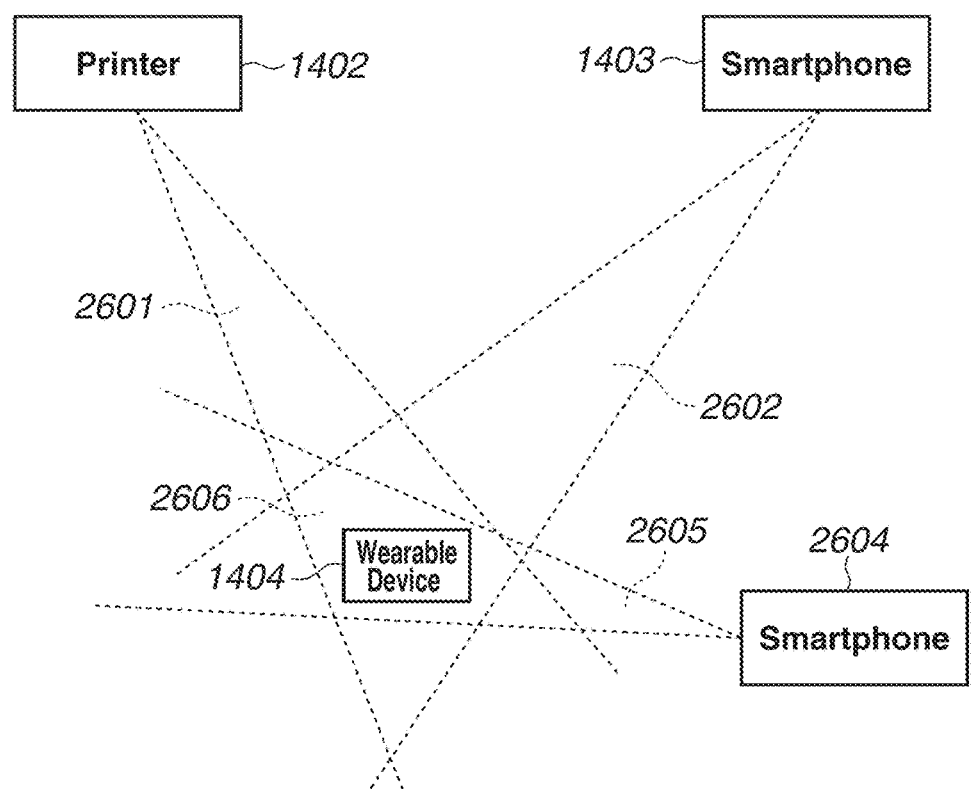

The reason why advertising information from a plurality of Bluetooth® Low Energy advertiser devices is desirably used will be described in more detail. FIGS. 26A and 26B are diagrams each illustrating an example of areas covered by the AoAs θ of advertising information transmitted from Bluetooth® Low Energy advertiser devices. In FIGS. 26A and 26B, the printer 1402, the smartphone 1403, and the wearable device 1404 are the same as those illustrated in FIGS. 28A and 28B. In FIG. 26A, the AoA θ area 2601 is the area covered by the AoA θ calculated from the AoA Radio Signal of the advertising information that the wearable device 1404 receives from the printer 1402. The AoA θ area 2602 is the area covered by the AoA θ calculated from the AoA Radio Signal of the advertising information that the wearable device 1404 receives from the smartphone 1403. The wearable device 1404 includes the short-range wireless communication unit 110 illustrated in FIG. 1. The short-range wireless communication unit 110 includes the three antennas 601, 602, and 603 illustrated in FIG. 6. Errors in the AoAs θ calculated from the AoA Radio Signals received at the antennas 601, 602, and 603 increase as the distances from the printer 1402 and the smartphone 1403 increase. In other words, the AoAs θ cover areas such as the AoA θ areas 2601 and 2602. An area 2603 is an area covered by both the AoA θ areas 2601 and 2602. The wearable device 1404 can be calculated to be located within the area 2603.

In FIG. 26B, an AoA θ area 2605 is an area covered by the AoA θ calculated from the AoA Radio Signal that the wearable device 1404 receives from a smartphone 2604. The wearable device 1404 includes the short-range wireless communication unit 110 illustrated in FIG. 1. The short-range wireless communication unit 110 includes the three antennas 601, 602, and 603 illustrated in FIG. 6. An error in the AoA θ calculated from the AoA Radio Signals received at the antennas 601, 602, and 603 increases as the distance from the smartphone 2604 increases. In other words, the AoA θ covers an area such as the AoA θ area 2605. An area 2606 is an area covered by all the AoA θ areas 2601, 2602, and 2605. The wearable device 1404 can be calculated to be located within the area 2606.

In the case of FIG. 26B, the AoA θ area 2605 calculated from the AoA Radio signal from the smartphone 2604 is used in addition to the AoA θ areas 2601 and 2602 calculated from the AoA Radio Signals from the printer 1402 and the smartphone 1403. The area 2606 covered by all the AoA θ areas 2601, 2602, and 2605 is then calculated. In the case of FIG. 26B, the current position of the wearable device 1404 can thus be calculated and estimated with higher accuracy than in the case of FIG. 26A. FIG. 26B illustrates an example where the communication system includes three Bluetooth® Low Energy advertiser devices, namely, the printer 1402 and the smartphones 1403 and 2604, and a Bluetooth® Low Energy scanner device that is the wearable device 1404. However, such an example is not restrictive. The greater the number of Bluetooth® Low Energy advertiser devices, the current position of the wearable device 1404 can be calculated and estimated with higher accuracy.

(Registration of Installation Information)

Registration processing for registering an installation location, an installation altitude, and a usage type in a Bluetooth® Low Energy advertiser device such as the printer 1402 in advance will now be described. FIG. 19 is a diagram illustrating an example of an installation information registration screen. In FIG. 19, an installation information registration screen 1901 is a screen for registering the installation location, the installation altitude, and the usage type of a communication apparatus 151 such as the printer 1402 and the ATM 2801. The installation information registration screen 1901 is displayed on the display unit 158 of the communication apparatus 151.

An installation location registration section 1902 has a function by which the user can register the installation location of the communication apparatus 151 in a degree (DEG) format. The installation location is registered in units of "degrees". An installation altitude registration section 1903 is where the user can register the installation altitude of the communication apparatus 151. The installation altitude is registered in units of "meters". A usage type registration section 1904 is where the user can select and register the usage type of the communication apparatus 151 from among "stationary", "mobile", and "automatic". "Stationary" is an option intended for a stationary Bluetooth® Low Energy device, such as a printer and an ATM. "Mobile" is an option for mobile use as a portable terminal like a smartphone and a wearable device. "Automatic" is an option for situations where the communication apparatus 151 is assumed to be used both as a stationary device installed in a certain position and as a portable device in a mobile fashion, like a notebook PC. For example, in a case where that "automatic" is selected and registered for a notebook PC in the usage type registration section 1904, the notebook PC controls its behavior as a stationary Bluetooth® Low Energy device in a case where no movement is detected for a certain time. In a case where portable use is detected, the notebook PC controls its behavior as a mobile Bluetooth® Low Energy device.

The user can register the installation location, the installation altitude, and the usage type of the communication apparatus 151 from the installation location registration section 1902, the installation altitude registration section 1903, and the usage type registration section 1904 by using the software keyboard function and the touch panel of the display unit 158. The installation position (installation position information), the installation altitude (installation altitude information), and the usage type (usage type information) are stored in the RAM 153. FIG. 19 illustrates a case where the printer 1402 that is an example of the communication apparatus 151 is installed at a position of 35.51° (lat. 35° 30.600' north) and an altitude of 633 m with a usage type "stationary".

The installation information registration screen 1901 has been described as an example of the screen for registering the installation location, the installation altitude, and the usage type of the communication apparatus 151, such as a printer and an ATM. However, such an example is not restrictive. For example, a similar screen may be applied as a screen for registering the installation location, the installation altitude, and the usage type of the information processing apparatus 101, such as a smartphone and a notebook PC.

(Display of Position Guide)

Figure 32:
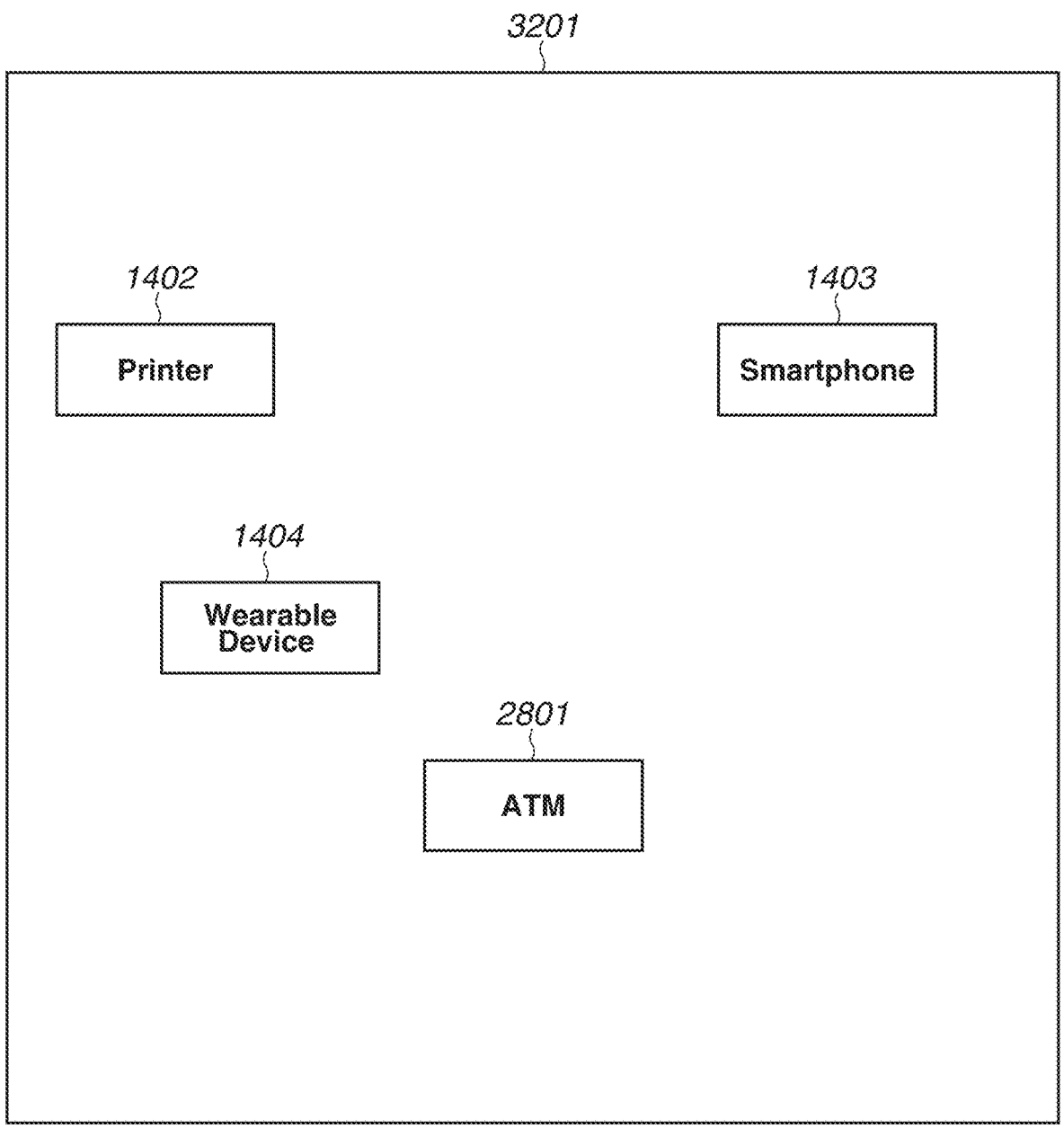
FIG. 32 is a diagram illustrating an example of an application displaying the relative positions of Bluetooth® Low Energy devices, using a wearable device.

A display example of the relative position of the wearable device 1404 will be described. FIG. 32 is a diagram illustrating an example of an application that displays the relative positions of Bluetooth® Low Energy devices by using the wearable device 1404. The printer 1402, the smartphone 1403, the wearable device 1404, and the ATM 2801 in FIG. 32 are the same as those illustrated in FIGS. 28A and 28B. FIG. 32 illustrates a display example where the wearable device 1404 is a wristwatch (smartwatch). An application 3201 is an application that displays the current relative positions of the wearable device (wristwatch) 1404 or the user wearing the wearable device 1404 and the Bluetooth® Low Energy advertiser devices nearby. As illustrated in FIG. 32, the current relative positional relationship of the wearable device 1404 with the printer 1402, the smartphone 1403, and the ATM 2801 that are the Bluetooth® Low Energy advertiser devices nearby is displayed by the application 3201.

(Information Included in Advertising Information)

The information included in the advertising information of a Bluetooth® Low Energy advertiser device will be described. FIG. 22 is a diagram illustrating an example of the information set in the advertising information (scan response). The information illustrated in FIG. 22 is stored in the payload 902 of the advertising information described with reference to FIG. 5. Aside from the information illustrated in FIG. 22, the payload 902 also stores identification information, supported profile information, and information about transmission power (Tx Power 905).

In FIG. 22, a column heading "name" lists the names of respective pieces of information, a column heading "symbol" lists the symbols representing the respective pieces of information set in the advertising information (scan response), a column heading "value" lists the values of the respective pieces of information, and a column heading "unit (description)" lists the units and descriptions of the respective pieces of information. "Position" refers to the current position obtained by the GPS or the installation location registered. "Altitude" refers to the current altitude obtained by the GPS or the installation altitude registered. "Moving speed" and "true bearing" refer to the current moving speed and true bearing, respectively. "Usage type" refers to information about the current usage type. In FIG. 22, 35.51° that is a decimal representation of lat. 35° 30.600' north in the DEG format is illustrated as an example of "position", 333 m as an example of "altitude", and 2.5 knots and 120.8° as an example of "moving speed" and "true bearing", respectively. As an example of "usage type", "fixed" is illustrated. "Usage type" has three possible values, namely, "fixed" representing "stationary", "mobile" representing "mobile", and "auto" representing "automatic". Using a decimal representation in the DEG format to express "position" can reduce the amount of information (number of letters). This can achieve power saving of the Bluetooth® Low Energy devices by reducing the amount of data of the advertising packet (scan response). An advertising packet (scan response) contains symbols and values as illustrated in FIGS. 23B, 23C, 25E to 25H, 29B, and 29C.

The column heading "symbol" illustrated in FIG. 22 is also used as an option in a scan request according to a third exemplary embodiment to be described below. A Bluetooth® Low Energy scanner device, such as the wearable device 1404, can obtain the information illustrated in FIG. 22 from the received advertising information (scan response). In the case of a mobile terminal, such as a smartphone and a notebook PC, "usage type" does not need to be stored. In other words, during determination of the usage type in FIG. 31 to be described below, a device may be determined to be "mobile" based on the absence of information about the usage type.

(Scan Request and Scan Response)

Next, the contents of a scan request and a scan response will be described. FIGS. 29A, 29B, and 29C are diagrams illustrating examples of a scan request and a scan response. In a case where a Bluetooth® Low Energy advertiser device transmits an advertising packet (for example, ADV_IND) and a Bluetooth® Low Energy scanner device receives the advertising packet, the Bluetooth® Low Energy scanner device transmits a scan request. Specifically, the Bluetooth® Low Energy scanner device transmits the scan request to the Bluetooth® Low Energy advertiser device in a case where the payload 902 of the received advertising packet does not contain sufficient information. In response to receipt of the scan request, the Bluetooth® Low Energy advertiser device transmits a scan response thereto to the Bluetooth® Low Energy scanner device. In the following description, such a scan response may also be referred to as an advertising packet (or advertising information).

FIG. 29A illustrates an example of the scan request. SCAN_REQ is a scan request defined in the Bluetooth® Low Energy standard of Bluetooth® 5.1. FIG. 29B illustrates an example of the scan response. FIG. 29B illustrates an example where "usage type" illustrated in FIG. 22 is returned to the wearable device 1404 as a scan response to the scan request. FIG. 29C illustrates an example of the scan response. FIG. 29C illustrates an example where "position", "altitude", "moving speed", "true bearing", and "usage type" illustrated in FIG. 22 are returned to the wearable device 1404 as a scan response to the scan request. In FIGS. 29B and 29C, SCAN_RSP is a scan response defined in the Bluetooth® Low Energy standard of Bluetooth® 5.1, and is followed by pieces of information. The pieces of information are defined to be delimited by a comma ",", and each symbol and its value by a colon ":".

The case where advertising information including "usage type" of FIG. 22 is transmitted to the wearable device 1404 as a scan response will be described below. The case of FIG. 29C will be described in a second exemplary embodiment.

In the foregoing examples, the Bluetooth® Low Energy advertiser device stores the information illustrated in FIG. 22 into the advertising information that is a scan response. However, the present exemplary embodiment is not limited thereto. For example, the information illustrated in FIG. 22 may be stored into advertising information that is transmitted by the Bluetooth® Low Energy advertiser device before the transmission of the scan request from the Bluetooth® Low Energy scanner device.

(Processing Procedure of Bluetooth® Low Energy Advertiser Device)

FIG. 30 is a flowchart illustrating an example of processing where a Bluetooth® Low Energy advertiser device transmits an advertising packet (scan response). For example, a program corresponding to the flowchart of FIG. 30 is stored in the ROM 104 or 152, read into the RAM 105 or 153, and executed by the CPU 103 or 154. FIG. 30 is a flowchart illustrating an example of processing where the printer 1402 serving as a Bluetooth® Low Energy advertiser device transmits an advertising packet (scan response).

In step S3001, in a case where the printer 1402 receives the scan request illustrated in FIG. 29A transmitted from the wearable device 1404 serving as a Bluetooth® Low Energy scanner device, the printer 1402 starts processing.

In step S3002, the printer 1402 obtains usage type information that is registered from the usage type registration section 1904 and stored in the RAM 153.

In step S3003, the printer 1402 sets (stores) the usage type information into an advertising packet (scan response).

In step S3004, the printer 1402 transmits the advertising packet (scan response) to the wearable device 1404 serving as the Bluetooth® Low Energy scanner device.

In step S3005, after the entire advertising packet (scan response) is transmitted, the printer 1402 ends the transmission processing of the advertising packet (scan response).

By the foregoing processing, the Bluetooth® Low Energy advertiser device transmits the usage type information about the Bluetooth® Low Energy advertiser device. The Bluetooth® Low Energy communication sequence related to the flowchart of FIG. 30 is similar to that described with reference to the sequence diagram of FIG. 13. The wearable device 1404 corresponds to the information processing apparatus 101 illustrated in FIG. 13, and the printer 1402 corresponds to the communication apparatus 151 illustrated in FIG. 13. In such a manner, the advertising packet (scan response) transmitted from the printer 1402 is received by the wearable device 1404. The flowchart of FIG. 30 had dealt with an example where only the usage type information among the piece of information illustrated in FIG. 22 is included in the advertising packet. However, the present exemplary embodiment is not limited thereto. The pieces of information in FIG. 22 other than the usage type may be included.

(Processing Procedure of Bluetooth® Low Energy Scanner Device)

Figure 31:
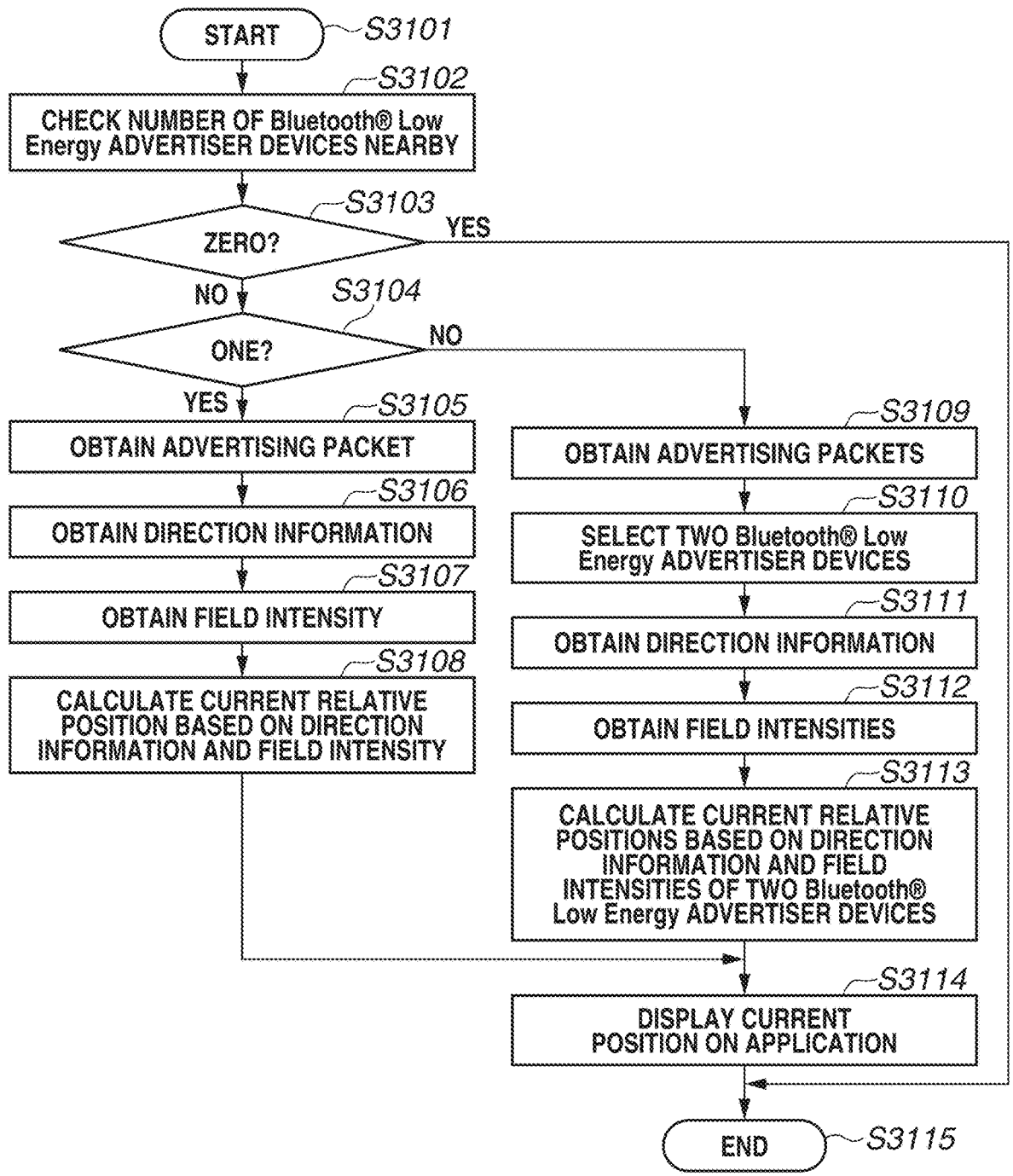
FIG. 31 is a flowchart illustrating an example of processing by a Bluetooth® Low Energy scanner device.

A processing procedure of a Bluetooth® Low Energy scanner device will be described. FIG. 31 is a flowchart illustrating an example of processing where the Bluetooth® Low Energy scanner device determines its own relative position and displays the current relative position on an application. For example, a program corresponding to the flowchart of FIG. 31 is stored in the ROM 104, read into the RAM 105, and executed by the CPU 103.

In step S3101, in a case where the wearable device 1404 serving as a Bluetooth® Low Energy scanner device receives an advertising packet (scan response) from a Bluetooth® Low Energy advertiser device, such as the smartphone 1403, the printer 1402, and the ATM 2801, the wearable device 1404 starts processing.

In step S3102, the wearable device 1404 checks the number of Bluetooth® Low Energy advertiser devices nearby from information included in the received advertising packet or packets (scan response or responses).

In step S3103, in a case where the number of Bluetooth® Low Energy advertiser devices nearby is determined to be zero (YES in step S3103), the processing proceeds to step S3115. In a case where the number is determined to not be zero (one or more) (NO in step S3103), the processing proceeds to step S3104.

In step S3104, in a case where the number of Bluetooth® Low Energy advertiser devices nearby is determined to be one (YES in step S3104), the processing proceeds to step S3105. In a case where the number is determined to be more than one (two or more) (NO in step S3104), the processing proceeds to step S3109.

In step S3105, the wearable device 1404 obtains the advertising packet (scan response).

In step S3106, the wearable device 1404 calculates the AoA θ 702 illustrated in FIG. 8 from the AoA Radio signal of the advertising packet (scan response) transmitted from the Bluetooth® Low Energy advertiser device. The wearable device 1404 then obtains direction information (information about the angle) about the Bluetooth® Low Energy advertiser device.

In step S3107, the wearable device 1404 obtains the field intensity of the advertising packet (scan response) received by the short-range wireless communication unit 110.

In step S3108, the wearable device 1404 calculates the current relative position of the wearable device 1404 as described in FIG. 28A based on the direction information and the field intensity. The processing proceeds to step S3114.

In step S3109, the wearable device 1404 obtains the advertising packets (scan responses) of the plurality of Bluetooth® Low Energy advertiser devices.

In step S3110, the wearable device 1404 compares the pieces of usage type information about the plurality of Bluetooth® Low Energy advertiser devices nearby and the field intensities of the advertising packets (scan responses). The wearable device 1404 then selects two Bluetooth® Low Energy advertiser devices. The wearable device 1404 selects two of the Bluetooth® Low Energy advertiser devices nearby by using the method illustrated as an example in FIG. 28A. Suppose here that all the three Bluetooth® Low Energy advertiser devices have a field intensity level of 5 (case 1). The wearable device 1404 thus selects the printer 1402 and the ATM 2801 that are Bluetooth® Low Energy advertiser devices of which the usage type is "stationary". In other words, among the Bluetooth® Low Energy advertiser devices from which advertising information of the same field intensity level is received, those of which the advertising information includes information indicating "stationary" as the usage type information are given higher priority.

In step S3111, the wearable device 1404 calculates the AoA θ 702 illustrated in FIG. 8 from each of the AoA Radio Signals of the advertising packets (scan responses) transmitted from the two selected Bluetooth® Low Energy advertiser devices. The wearable device 1404 then obtains pieces of direction information (information about angles) about the two respective Bluetooth® Low Energy advertiser devices.

In step S3112, the wearable device 1404 obtains the field intensities of the advertising packets (scan responses) from the two Bluetooth® Low Energy advertiser devices, received by the short-range wireless communication unit 110.

In step S3113, the wearable device 1404 calculates the current relative positions of the own device and the Bluetooth® Low Energy advertiser devices as described in FIGS. 28A and 26A based on the direction information and the field intensities of the two Bluetooth® Low Energy advertiser devices.

In step S3114, the wearable device 1404 displays the current relative positions of the own device and the Bluetooth® Low Energy advertiser devices on the screen of the application 3201. In step S3115, the processing ends.

In the foregoing example, in steps S3109 to S3113, the wearable device 1404 selects two Bluetooth® Low Energy advertiser devices based on the field intensities of the advertising packets and the usage types of the plurality of Bluetooth® Low Energy advertiser devices nearby. The wearable device 1404 then calculates its current position as described in FIGS. 28A and 26A based on the direction information and the field intensities of the two selected Bluetooth® Low Energy advertiser devices. However, the present exemplary embodiment is not limited thereto. For example, in a case where, as illustrated in FIG. 26B, there are three or more Bluetooth® Low Energy advertiser devices near the wearable device 1404, the three Bluetooth® Low Energy advertiser devices may be used to calculate the current position of the wearable device 1404 with higher accuracy. Since the processing load of the wearable device 1404 increases with the number of Bluetooth® Low Energy advertiser devices, an appropriate design tailored to the performance of the wearable device 1404 is important.

The foregoing processing flow enables the Bluetooth® Low Energy scanner device to obtain its relative position based on advertising information transmitted from a Bluetooth® Low Energy advertiser device or devices. The relative position is determined by preferentially using advertising information from "stationary" devices based on the usage type information included in the advertising information from the Bluetooth® Low Energy advertiser devices. Accordingly, the relative position of the Bluetooth® Low Energy scanner device can be determined with higher accuracy.

A second exemplary embodiment will be described. In the first exemplary embodiment, the relative positions of the devices, namely, the wearable device 1404, the printer 1402, the smartphone 1403, and the ATM 2801 are described to be determined. The relative positions are then displayed on the application 3201 so that the relative positional relationship can be recognized. In the second exemplary embodiment, a Bluetooth® Low Energy advertiser device transmits advertising information including information about the absolute position of the Bluetooth® Low Energy advertiser device itself. A Bluetooth® Low Energy scanner device then determines information about the absolute position of the Bluetooth® Low Energy scanner device based on the information about the absolute position of the Bluetooth® Low Energy advertiser device included in the received advertising information. This enables an application 3201 to implement a position guide function such as a map-based navigation function. The second exemplary embodiment describes a mechanism for taking in such absolute position information and an example of an application having a navigation function using such a mechanism.

Figure 14A:
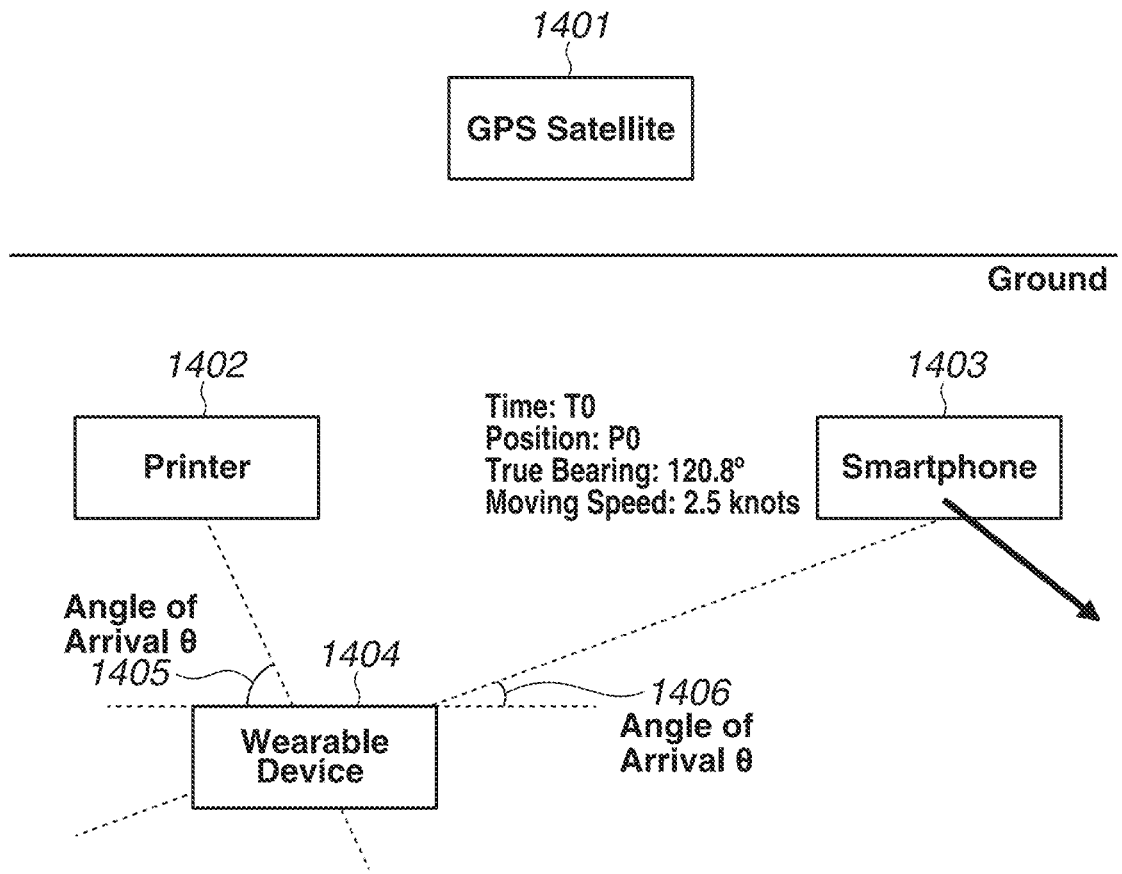
FIG. 14A is a schematic diagram illustrating examples of Bluetooth® Low Energy devices and a Global Positioning System (GPS) satellite.
Figure 14B:
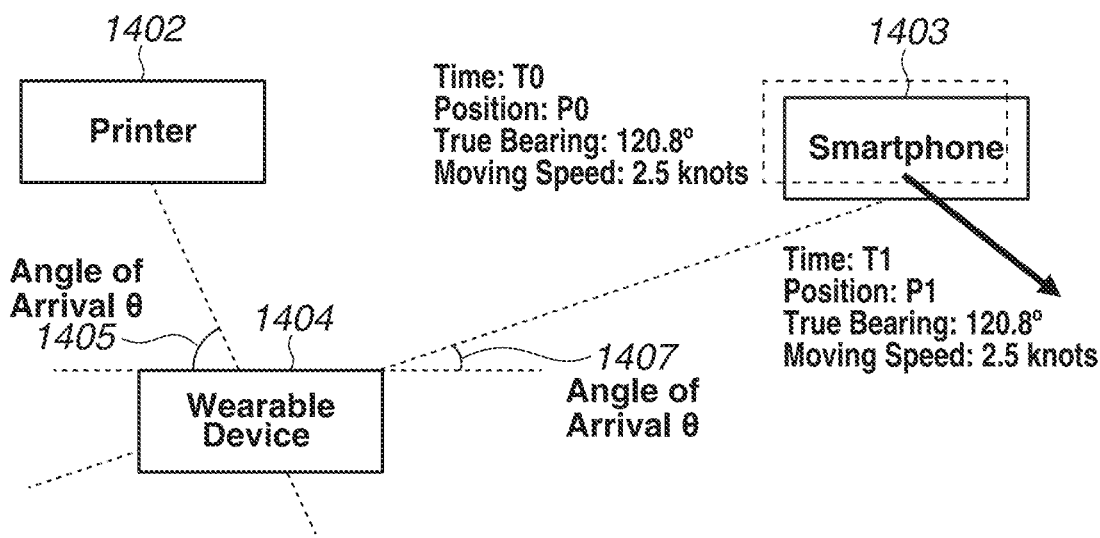
FIG. 14B is a schematic diagram illustrating a positional relationship between the devices.

FIGS. 14A and 14B are diagrams illustrating examples of apparatuses supporting the Bluetooth® Low Energy standard of Bluetooth® 5.1 and a GPS satellite. In FIG. 14A, a GPS satellite 1401 is a GPS satellite included in a part of the GPS. In fact, a plurality of GPS satellites is operating in the sky. FIG. 14A illustrates one of the GPS satellites.

A smartphone 1403 that is a processing apparatus including a GPS reception unit can receive signals from several GPS satellites in the sky and find out the current position of the smartphone 1403. The smartphone 1403 includes the configuration of the information processing apparatus 101 illustrated in FIG. 1.

A printer 1402 includes the configuration of the communication apparatus 151 illustrated in FIG. 1. The printer 1402 is a stationary device. Examples of the installation location include a convenience store, an office, and a private home. The printer 1402 does not include a GPS reception unit, whereas installation position information, installation altitude information, and a current usage type are registered in a memory of the printer 1402 in advance.

A wearable device 1404 is a device that is worn on body in use. Examples include a wristwatch and goggles. The wearable device 1404 includes basically the same configuration as that of the information processing apparatus 101 illustrated in FIG. 1, but without the GPS reception unit 112.

The present exemplary embodiment deals with an example where the printer 1402 and the smartphone 1403 function as Bluetooth® Low Energy advertisers (hereinafter, also referred to as advertiser devices) and the wearable device 1404 as a Bluetooth® Low Energy scanner (hereinafter, also referred to as scanner device).

In FIG. 14A, the smartphone 1403 is located at position P0 at time T0 and moving in the direction of 120.8° in true bearing at a moving speed of 2.5 knots (=4.63 km/h). The smartphone 1403 can receive signals from the GPS satellite 1401 with the built-in GPS reception unit 112 and find out the current position of the smartphone 1403. The smartphone 1403 and the wearable device 1404 are assumed to be used in a mobile fashion as portable terminals.

An AoA θ 1405 is an AoA θ calculated from an AoA Radio Signal that the wearable device 1404 receives from the printer 1402. An AoA θ 1406 is an AoA θ calculated from an AoA Radio Signal that the wearable device 1404 receives from the smartphone 1403.

A case where there is assumed to be only one Bluetooth® Low Energy advertiser device (for example, the smartphone 1403) near the wearable device 1404 at time T0 in FIG. 14A will be described. Here, the wearable device 1404 can estimate its own current position based on current position information, current altitude information, the AoA θ 1406, and the field intensity of advertising information (scan response) of the smartphone 1403. The current position information is position information about at least any one of the following: the current latitude, the current longitude, information about whether the latitude is north or south, and information about whether the longitude is east or west. The current altitude information is altitude information about the current altitude (above sea level).

In FIG. 14A, the wearable device 1404 can determine the AoA θ 1406 from Eq. (1) based on the advertising information that the wearable device 1404 receives from the smartphone 1403. In other words, the wearable device 1404 can estimate the angle between the wearable device 1404 and the smartphone 1403. The wearable device 1404 can further estimate the distance between the wearable device 1404 and the smartphone 1403 based on the field intensity of the received advertising information. Specifically, the distance between the smartphone 1403 and the wearable device 1404 can be estimated based on the receive field intensity by using the table (see FIG. 21) indicating the relationship between the field intensity and the distance.

The position which is the estimated distance away from the smartphone 1403 in the direction of the estimated angle is thus the estimated current position of the wearable device 1404. More specifically, in FIG. 14A, the position which is the estimated distance away from the position of the smartphone 1403 on the broken line that starts at the smartphone 1403 and forms the AoA θ 1406 is the estimated current position of the wearable device 1404.

The altitude can be estimated based on the current altitude information about the smartphone 1403. Typically, the altitude information about the wearable device 1404 may be the same as that about the smartphone 1403.

In such a manner, the wearable device 1404 can determine absolute position information about the wearable device 1404 based on the position information about an adjacent device (Bluetooth® Low Energy advertiser device), included in the advertising information from the device.

Next, a case where there is assumed to be a plurality of Bluetooth® Low Energy advertiser devices (for example, the printer 1402 and the smartphone 1403) near the wearable device 1404 at time T0 in FIG. 14A will be described. Here, the wearable device 1404 can estimate its own current position based on the installation position information, the installation altitude information, and the AoA θ 1405 of the printer 1402, and the current position information, the current altitude information, and the AoA θ 1406 of the smartphone 1403. The installation position information and the installation altitude information about the printer 1402 are registered in the printer 1402 in advance. Details of the registration processing are implemented by the processing described with reference to FIG. 19.

In FIG. 14A, the wearable device 1404 can determine the AoA θ 1405 from Eq. (1) based on the advertising information that the wearable device 1404 receives from the printer 1402. The wearable device 1404 can further determine the AoA θ 1406 from Eq. (1) based on the advertising information that the wearable device 1404 receives from the smartphone 1403. In other words, the wearable device 1404 can estimate the angle between the wearable device 1404 and the printer 1402 and the angle between the wearable device 1404 and the smartphone 1403.

In addition, the wearable device 1404 can estimate the distance between the wearable device 1404 and the printer 1402 based on the field intensity of the advertising information received from the printer 1402 and the table of FIG. 21. The wearable device 1404 can estimate the distance between the wearable device 1404 and the smartphone 1403 based on the field intensity of the advertising information received from the smartphone 1403 and the table of FIG. 21.

The intersection of the broken line that starts at the printer 1402 and forms the AoA θ 1405 and the broken line that starts at the smartphone 1403 and forms the AoA θ 1406 (area 2603 in FIG. 26A) is thus the estimated current position of the wearable device 1404. The altitude can be estimated based on the installation altitude information.

As described above, using the advertising information from a plurality of apparatuses (Bluetooth® Low Energy advertiser devices) nearby is desirable for the wearable device 1404 to determine the absolute position information with higher accuracy. Specifically, as the distance from a Bluetooth® Low Energy advertiser device to the Bluetooth® Low Energy scanner device increases, the accuracy of the distance estimated from the field intensity decreases. While an error in the AoA θ also increases as the distance from the Bluetooth® Low Energy advertiser device increases, the error in the AoA θ is considered to be less severe, and the accuracy of the AoA θ is considered to be higher, than those of the field intensity at the same distance. In such a case, the current position of the wearable device 1404 can be calculated and estimated with higher accuracy in the presence of a plurality of Bluetooth® Low Energy advertiser devices nearby than in the presence of only one Bluetooth® Low Energy advertiser device.

The basic concept of the position detection method according to the present exemplary embodiment has been described above. However, the relative positional relationship between the wearable device 1404 and the smartphone 1403 can change. A case where the smartphone 1402 is moving will be described with reference to FIG. 14B.

FIG. 14B illustrates a positional relationship between the devices at time T1. In FIG. 14B, a dotted-lined rectangle near the smartphone 1403 indicates the position of the smartphone 1403 at time T0 illustrated in FIG. 14A. A solid-lined rectangle around the smartphone 1403 indicates the position of the smartphone 1403 at time T1. At time T1, the smartphone 1403 is located at position P1 and moving in the direction of 120.8° in true bearing at a moving speed of 2.5 knots (=4.63 km/h). An AoA θ 1407 is an AoA θ calculated from the AoA Radio Signal that the wearable device 1404 receives from the smartphone 1403.

As a processing time, a time period from when the smartphone 1403 obtains the current position information about the smartphone 1403 from the GPS reception unit 112 and until when the smartphone 1403 transmits advertising information (scan response) to the wearable device 1404 can elapse. For example, suppose that the wearable device 1404 is at rest at time T0, and the smartphone 1403 obtains the current position information at time T0 and transmits the advertising information at time T1. If time T1 is one second after time T0, the processing time is one second.

While the wearable device 1404 receives the advertising information (scan response) from the smartphone 1403 at time T1, the information about the current position included in the advertising information is as of time T0. In order for the wearable device 1404 to calculate its own accurate position, the wearable device 1404 therefore desirably performs a correction as much as the movement of the smartphone 1403.

In a case where the advertising information (scan response) from the smartphone 1403 includes information about the moving speed and the true bearing information, the wearable device 1404 then calculates position P1 to which the smartphone 1403 has moved from the current position in the direction of the true bearing in one second. Specifically, the intersection of the broken line that starts at the printer 1402 and forms the AoA θ 1405 and the broken line that starts at the smartphone 1403 at the calculated position P1 and forms the AoA θ 1407 (area 2603 in FIG. 26A) is the calculated estimated current position of the wearable device 1404. Meanwhile, the altitude can be estimated from the current altitude information.

As described above, a case where the advertising information from a device nearby includes the moving speed and the true bearing information of the device, the wearable device 1404 is desirable to determine the absolute position information about the wearable device 1404 with higher accuracy.

(Display of Position Guide)

Figure 20A:
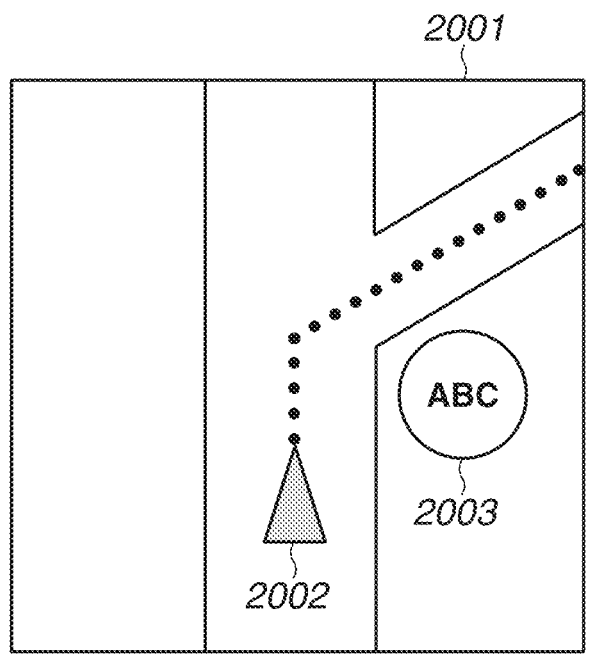
FIGS. 20A and 20B are schematic diagrams each illustrating an example of a navigation application using a wearable device (wristwatch or goggles).
Figure 20B:
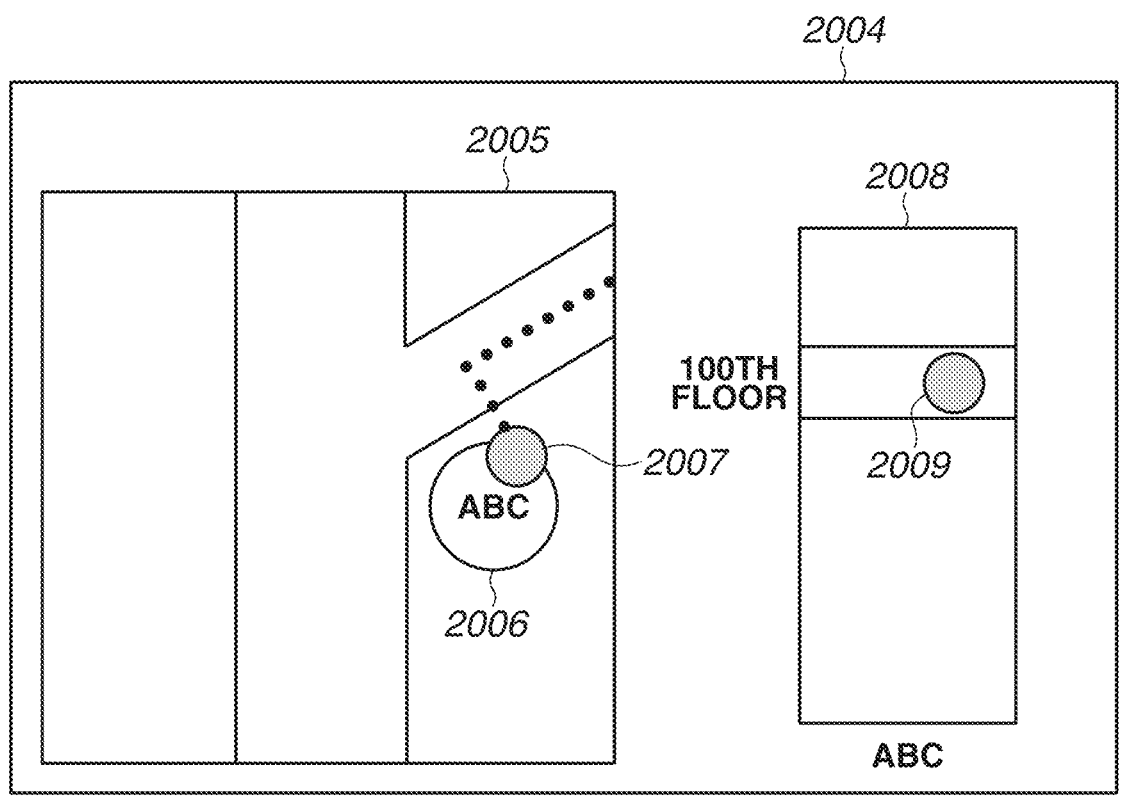

Display examples of the position of the wearable device 1404 on a map will be described. FIGS. 20A and 20B are schematic diagrams illustrating display examples of a navigation application using the wearable device 1404. FIG. 20A is a schematic diagram illustrating a display example in a case where the wearable device 1404 is a wristwatch (smartwatch). A navigation application 2001 is an application that displays the current position and traveling direction of the wearable device (wristwatch) 1404 or the user wearing the wearable device 1404, and a route and estimated time to a destination. The wearable device 1404 can display a position guide screen such as illustrated in FIG. 20A based on the current position information about the wearable device 1404 and map information stored by the navigation application 2001 in advance. By using the navigation application 2001, the user can find out his/her own current position, and the route, paths, and estimated time to and the time of arrival at the destination. A current position display 2002 indicates the current position of the wearable device (wristwatch) 1404 or the user wearing the wearable device 1404. The current position is displayed by an isosceles triangle during traveling, and by a circle when the wearable device (wristwatch) 1404 or the user wearing the wearable device 1404 is at rest. During traveling, the acute angle portion of the current position display 2002 indicates the traveling direction. FIG. 20A illustrates the state during traveling. A building display 2003 represents a building nearby. In FIG. 20A, the building display 2003 represents ABC Company's building, for example. The dotted line indicates the route.

FIG. 20B is a schematic diagram illustrating a display example in a case where the wearable device 1404 is goggles. A navigation application 2004 is an application that displays the current position and traveling direction of the wearable device (goggles) 1404 or the user wearing the wearable device 1404, and a route and estimated time to a destination. The wearable device 1404 can display a position guide screen such as illustrated in FIG. 20B based on the current position information and current altitude information about the wearable device 1404 and map information stored by the navigation application 2004 in advance. By using the navigation application 2004, the user can find out his/her own current position, and the route, paths, and estimated time to and the time of arrival at the destination. A route display section 2005 displays the current position and traveling direction of the wearable device (goggles) 1404 or the user wearing the wearable device 1404, and the route and estimated time to the destination. The route display section 2005 displays a state seen from the sky. A building display section 2008 displays the current position in a building where the wearable device (goggles) 1404 or the user wearing the wearable device 1404 is. A building display 2006 represents the building where the wearable device (goggles) 1404 or the user wearing the wearable device 1404 is. In FIG. 20B, the building display 2006 represents ABC Company's building, for example. FIG. 20B illustrates a state where the wearable device (goggles) 1404 or the user wearing the wearable device 1404 is on the 100th floor. Current position displays 2007 and 2009 indicate the current position of the wearable device (goggles) 1404 or the user wearing the wearable device 1404. The current position is displayed by isosceles triangles during traveling, and by circles when the wearable device (goggles) 1404 or the user wearing the wearable device 1404 is at rest. During traveling, the acute angle portions of the current position displays 2007 and 2009 indicate the traveling direction. FIG. 20B illustrates a state where the wearable device (goggles) 1404 or the user wearing the wearable device 1404 is at rest.

(Scan Request and Scan Response)

Details of a scan request and a scan response will be described. FIGS. 23A to 23C illustrate examples of a scan request and a scan response. In a case where a Bluetooth® Low Energy advertiser device transmits an advertising packet (for example, ADV_IND) and a Bluetooth® Low Energy scanner device receives the advertising packet, the Bluetooth® Low Energy scanner device transmits a scan request. Specifically, the Bluetooth® Low Energy scanner device transmits the scan request to the Bluetooth® Low Energy advertiser device in a case where the payload 902 of the received advertising packet does not include sufficient information. Receiving the scan request, the Bluetooth® Low Energy advertiser device transmits a scan response thereto to the Bluetooth® Low Energy scanner device. In the following description, such a scan response may also be referred to as an advertising packet (or advertising information).

FIG. 23A illustrates an example of the scan request. SCAN_REQ is a scan request defined in the Bluetooth® Low Energy standard of Bluetooth® 5.1. FIG. 23B illustrates an example of the scan response. FIG. 23B illustrates an example where "position" and "altitude" illustrated in FIG. 22 are returned to the wearable device 1404 as a scan response to the scan request. FIG. 23C illustrates an example of the scan response. FIG. 23C illustrates an example where "position", "altitude", "moving speed", and "true bearing" illustrated in FIG. 22 are returned to the wearable device 1404 as a scan response to the scan request. In FIGS. 23B and 23C, SCAN_RSP is a scan response defined in the Bluetooth® Low Energy standard of Bluetooth® 5.1. SCAN_RSP is followed by pieces of information. The pieces of information are defined to be delimited by a comma ",", and each symbol and its value by a colon ":".

FIGS. 29A, 29B, and 29C described above also illustrate examples of the scan request and the scan response. FIG. 29C illustrates an example where "position", "altitude", "moving speed", "true bearing", and "usage type" illustrated in FIG. 22 are returned to the wearable device 1404 as a scan response.

An example where the scan response illustrated in FIG. 29C is returned to the wearable device 1404 as a scan response is described below.

In the foregoing examples, the Bluetooth® Low Energy advertiser device includes the information illustrated in FIG. 22 into the advertising information serving as a scan response. However, the present exemplary embodiment is not limited thereto. For example, the information illustrated in FIG. 22 may be included in advertising information that the Bluetooth® Low Energy advertiser device transmits before the transmission of the scan request from the Bluetooth® Low Energy scanner device.

(Processing Procedure of Bluetooth® Low Energy Advertiser Device)

FIGS. 15A and 15B are flowcharts illustrating examples of processing where a Bluetooth® Low Energy advertiser device transmits an advertising packet (scan response). For example, a program related to the flowcharts of FIGS. 15A and 15B is stored in the ROM 104 or 152, read into the RAM 105 or 153, and executed by the CPU 103 or 154.

FIG. 15A is a flowchart illustrating an example of processing where the smartphone 1403 serving as a Bluetooth® Low Energy advertiser device transmits an advertising packet (scan response) to the wearable device 1404 serving as a Bluetooth® Low Energy scanner device.

In step S1501, in a case where the smartphone 1403 receives the scan request illustrated in FIG. 23A transmitted from the wearable device 1404, the smartphone 1403 starts processing.

In step S1502, the smartphone 1403 obtains the current position information indicated by "position" illustrated in FIG. 22 from the GPS reception unit 112.

In step S1503, the smartphone 1403 obtains the current altitude information indicated by "altitude" illustrated in FIG. 22 from the GPS reception unit 112.

In step S1504, the smartphone 1403 obtains the current moving speed and true bearing information indicated by "moving speed" and "true bearing" illustrated in FIG. 22 from the GPS reception unit 112.

In step S1514, in a case where the smartphone 1403 includes a usage type registration unit, the smartphone 1403 obtains usage type information that is registered by the usage type registration unit and stored in the RAM 105. In the case of a mobile terminal, such as a smartphone and a notebook PC, "usage type" does not need to be stored. In such a case, the smartphone 1403 obtains no usage type information.

In step S1505, the smartphone 1403 sets (stores) the current position information, the current altitude information, the current moving speed and true bearing information, and the usage type information into an advertising packet (scan response).

In step S1506, the smartphone 1403 transmits the advertising packet (scan response) to the wearable device 1404. Specifically, the smartphone 1403 transmits the scan response illustrated in FIG. 29C.

In step S1507, after the transmission of the entire advertising packet (scan response), the smartphone 1403 ends the processing for transmitting the advertising packet (scan response).

By the foregoing processing, the Bluetooth® Low Energy advertiser device transmits the position information about the Bluetooth® Low Energy advertiser device. In the example of FIG. 15A, the current position information, the current altitude information, the current moving speed and true bearing information, and the usage type information are all described to be included in the advertising packet (scan response). However, the present exemplary embodiment is not limited to such an example. For example, only the current position information and the usage type information may be included in the advertising packet (scan response). Only the current position information, the current altitude information, and the usage type information may be included in the advertising packet (scan response). Alternatively, only the current position information may be included in an advertising packet before the reception of the scan request, and the current altitude information and the usage type information may be included in the advertising packet that is the scan response.

FIG. 15B is a flowchart illustrating an example of processing where the printer 1402 serving as a Bluetooth® Low Energy advertiser device transmits an advertising packet (scan response) to the wearable device 1404 serving as a Bluetooth® Low Energy scanner device.

In step S1508, in a case where the printer 1402 serving as a Bluetooth® Low Energy advertiser device receives the scan request illustrated in FIG. 23A transmitted from the wearable device 1404, the printer 1402 starts processing.

In step S1509, the printer 1402 obtains the installation position information that is registered from the installation location registration section 1902 and stored in the RAM 153.

In step S1510, the printer 1402 obtains the installation altitude information that is registered from the installation altitude registration section 1903 and stored in the RAM 153.

In step S1515, the printer 1402 obtains the usage type information that is registered from the usage type registration section 1904 and stored in the RAM 153.

In step S1511, the printer 1402 sets the installation position information, the installation altitude information, and the usage type information into an advertising packet (scan response).

In step S1512, the printer 1402 transmits the advertising packet (scan response) to the wearable device 1404 that is the Bluetooth® Low Energy scanner device.

In step S1513, after the transmission of the entire advertising packet (scan response), the printer 1402 ends the processing for transmitting the advertising packet (scan response).

By the foregoing processing, the Bluetooth® Low Energy advertiser device transmits not only the usage type information about the Bluetooth® Low Energy advertiser device but position information as well. In the example of FIG. 15B, the installation position information, the installation altitude information, and the usage type information are described to be included into the advertising packet (scan response). However, such an example is not restrictive. For example, only the installation position information and the usage type information may be included in the advertising packet (scan response). Alternatively, only the installation position information may be included in an advertising packet before the reception of the scan request, and the installation altitude information and the usage type information may be included in the advertising packet that is the scan response.

The Bluetooth® Low Energy communication sequence related to the flowcharts of FIGS. 15A and 15B is illustrated in the sequence diagram of FIG. 12. The wearable device 1404 corresponds to the information processing apparatus 101 illustrated in FIG. 12, the smartphone 1403 corresponds to the communication apparatus 151 illustrated in FIG. 12, and the printer 1402 corresponds to the communication apparatus 151 illustrated in FIG. 12. In such a manner, the wearable device 1404 receives advertising packets (scan responses) transmitted from the smartphone 1403 and the printer 1402.

(Processing Procedure of Bluetooth® Low Energy Scanner Device)

Figure 16:
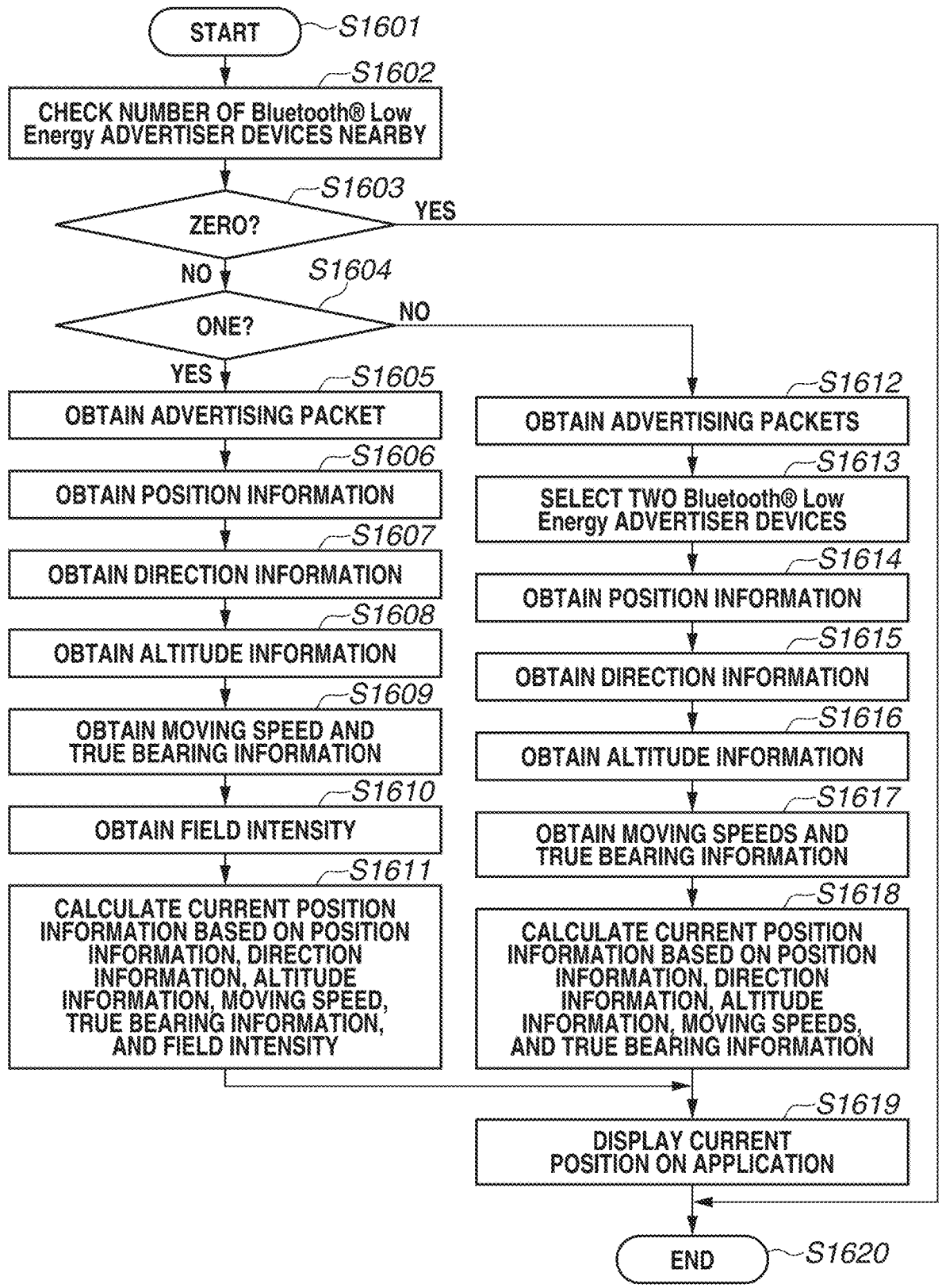
FIG. 16 is a flowchart illustrating an example of processing where a Bluetooth® Low Energy scanner device displays a current position on an application.

FIG. 16 is a flowchart illustrating an example of processing where a Bluetooth® Low Energy scanner device determines its own current position and displays the current position on an application. For example, a program related to the flowchart of FIG. 16 is stored in the ROM 104, read into the RAM 105, and executed by the CPU 103.

In step S1601, in a case where the wearable device 1404 serving as a Bluetooth® Low Energy scanner device receives an advertising packet (scan response) transmitted from a Bluetooth® Low Energy advertiser device, such as the smartphone 1403 and the printer 1402, the wearable device 1404 starts processing.

In step S1602, the wearable device 1404 determines the number of Bluetooth® Low Energy advertiser devices nearby based on information about the received advertising packet(s) (scan response(s)).

In step S1603, in a case where the number of Bluetooth® Low Energy advertiser devices nearby is determined to be zero (YES in step S1603), the processing proceeds to step S1620. In a case where the number is determined to not be zero (one or more) (NO in step S1603), the processing proceeds to step S1604.

In step S1604, in a case where the number of Bluetooth® Low Energy advertiser devices nearby is determined to be one (YES in step S1604), the processing proceeds to step S1605. In a case where the number is determined to be more than one (two or more) (NO in step S1604), the processing proceeds to step S1612.

In step S1605, the wearable device 1404 obtains the advertising packet (scan response).

In step S1606, the wearable device 1404 obtains position information indicating the current position or installation position from the advertising packet (scan response) illustrated in FIG. 23B or 23C.

In step S1607, the wearable device 1404 calculates the AoA θ 702 illustrated in FIG. 8 from the AoA Radio Signal of the advertising packet (scan response) transmitted from the Bluetooth® Low Energy advertiser device. The wearable device 1404 then obtains the direction information (information about the angle) about the Bluetooth® Low Energy advertiser device.

In step S1608, the wearable device 1404 obtains altitude information indicating the current altitude or installation altitude from the advertising packet (scan response) illustrated in FIG. 23B or 23C.

In step S1609, the wearable device 1404 obtains the moving speed and the true bearing information from the advertising packet (scan response) illustrated in FIG. 23C.

In step S1610, the wearable device 1404 obtains the field intensity of the advertising packet (scan response) received by the short-range wireless communication unit 110.

In step S1611, the wearable device 1404 calculates the current position information about the wearable device 1404 as described in FIG. 14A based on the position information, the direction information, the altitude information, the moving speed, the true bearing information, and the field intensity. While the position information, the direction information, the altitude information, the moving speed, the true bearing information, and the field intensity are described to be used in step S1611, the present exemplary embodiment is not limited to such an example. For example, in a case where none of the altitude information, the moving speed, and the true bearing information is obtainable, the current position information may be calculated based on the position information, the direction information, and the field intensity.

In step S1612, the wearable device 1404 obtains the advertising packets (scan responses) of the plurality of Bluetooth® Low Energy advertiser devices.

In step S1613, the wearable device 1404 compares the pieces of usage type information about the plurality of Bluetooth® Low Energy advertiser devices nearby and the field intensities of the advertising packets (scan responses). The wearable device 1404 then selects two Bluetooth® Low Energy advertiser devices. Here, the wearable device 1404 selects two of the Bluetooth® Low Energy advertiser devices nearby by using the method illustrated as an example in FIG. 28A. Suppose, as in the first exemplary embodiment, that all the three Bluetooth® Low Energy advertiser devices have a field intensity level of 5 (case 1). The wearable device 1404 thus selects the printer 1402 and the ATM 2801 that are Bluetooth® Low Energy advertiser devices of which the usage type is "stationary". In other words, among the Bluetooth® Low Energy advertiser devices from which advertising information of the same field intensity level is received, those of which the advertising information includes information indicating "stationary" as the usage type information are given higher priority.

In the case of a mobile terminal such as a smartphone, usage type information may be not registered in advance, since the mobile terminal is typically used in a mobile fashion. In such a case, no usage type information is obtained in step S1514 illustrated in FIG. 15A, and the transmitted advertising information does not include usage type information (the value for "usage type" is blank). In step S1613, in a case where no usage type information is included in advertising information, the wearable device 1404 can determine that the device transmitting the advertising information is a "mobile" one.

In step S1614, the wearable device 1404 obtains position information indicating the current or installation position of each of the two selected Bluetooth® Low Energy advertiser devices from the advertising packets (scan responses) illustrated in FIG. 23B or 23C.

In step S1615, the wearable device 1404 calculates the AoA θ 702 illustrated in FIG. 8 from each of the AoA Radio Signals of the advertising packets (scan responses) transmitted from the two Bluetooth® Low Energy advertiser devices. The wearable device 1404 then obtains direction information (information about the angle) about each of the two Bluetooth® Low Energy advertiser devices.

In step S1616, the wearable device 1404 obtains altitude information indicating the current or installation altitude of each of the two Bluetooth® Low Energy advertiser devices from the advertising packets (scan responses) illustrated in FIG. 23B or 23C.

In step S1617, the wearable device 1404 obtains the moving speed of and the true bearing information about each of the two Bluetooth® Low Energy advertiser devices from the advertising packets (scan responses) illustrated in FIG. 23C.

In step S1618, the wearable device 1404 calculates the current position information about the wearable device 1404 as described in FIGS. 14A and 26A based on the position information, the direction information, the altitude information, the moving speed, and the true bearing information about/of the two Bluetooth® Low Energy advertiser devices.

In step S1619, the wearable device 1404 displays the current position on the navigation application 2001 or 2004 illustrated in FIG. 20A or 20B. In step S1620, the processing ends.

By the foregoing processing procedure, the Bluetooth® Low Energy scanner device can obtain the absolute position (at least position information) of the Bluetooth® Low Energy scanner device itself based on advertising information from a Bluetooth® Low Energy advertiser device or devices even if the Bluetooth® Low Energy scanner device does not include a GPS receiver.

While the position information, the direction information, the altitude information, the moving speed, and the true bearing information are described to be used in step S1618, the present exemplary embodiment is not limited to such an example. For example, in a case where none of the altitude information, the moving speed, and the true bearing information is obtainable, the current position information may be calculated based on the position information and the direction information.

In steps S1612 to S1618, the wearable device 1404 selects two of the plurality of Bluetooth® Low Energy advertiser devices nearby. The wearable device 1404 is described to then calculate the current position as described in FIGS. 14A and 26A based on the position information, the direction information, the altitude information, the moving speed, and the true bearing information about/of the two Bluetooth® Low Energy advertiser devices. However, the present exemplary embodiment is not limited to such an example. For example, as illustrated in FIG. 26B, in a case where there are three or more Bluetooth® Low Energy advertiser devices near the wearable device 1404, the three or more Bluetooth® Low Energy advertiser devices can be used to calculate the current position of the wearable device 1404 with higher accuracy. Since the processing load of the wearable device 1404 increases with the number of Bluetooth® Low Energy advertiser devices, an appropriate design tailored to the performance of the wearable device 1404 is important.

The second exemplary embodiment is particularly effective in cities where there are a lot of people (smartphones).

As described above, according to the present exemplary embodiment, a Bluetooth® Low Energy scanner device can obtain its absolute position based on advertising information transmitted from a Bluetooth® Low Energy advertiser device or device. The absolute position is determined by preferentially using advertising information from "stationary" devices based on the usage type information included in the advertising information from the Bluetooth® Low Energy advertiser devices. Accordingly, the absolute position of the Bluetooth® Low Energy scanner device can be determined with higher accuracy. The second exemplary embodiment is particularly effective in cities since the absolute position can be obtained, and accordingly position information can be displayed on a map.

Next, a third exemplary embodiment will be described. In the first and second exemplary embodiments, a Bluetooth® Low Energy advertiser device includes the information illustrated in FIG. 22 (at least position information) into the payload 902 of a scan response whenever transmitting a scan response. In the third exemplary embodiment, the Bluetooth® Low Energy advertiser device transmits the advertising packet containing the information only when the information is requested. Since requested information is transmitted only when requested, the power consumption of the Bluetooth® Low Energy devices can be reduced. A description common to the first or second exemplary embodiment will be omitted, and the following description deals mainly with differences.

(Scan Request and Scan Response)

FIGS. 25A, 25B, 25C, and 25D are diagrams illustrating examples of a scan request. In a case where a Bluetooth® Low Energy advertiser device receives a scan request from a Bluetooth® Low Energy scanner device, the Bluetooth® Low Energy advertiser device transmits a scan response to the scan request to the Bluetooth® Low Energy scanner device. FIGS. 25E, 25F, 25G, and 25H illustrate examples of such a scan response.

FIGS. 25A, 25B, 25C, and 25D illustrate examples of a scan request, or examples of options extending the Bluetooth® Low Energy standard of Bluetooth® 5.1. In FIGS. 25A, 25B, 25C, and 25D, SCAN_REQ is a scan request defined in the Bluetooth® Low Energy standard of Bluetooth® 5.1. Information accompanied by a symbol "opt" representing an option or options for requesting additional information is transmitted after SCAN_REQ. In FIG. 25A, options requesting "position" and "altitude" are set after SCAN_REQ. "place" is the symbol for an option requesting "position" illustrated in FIG. 22, and "elevation" is the symbol for an option requesting "altitude" illustrated in FIG. 22. In FIG. 25B, options requesting "position", "altitude", "moving speed", and "true bearing" is set after SCAN_REQ. "speed" is the symbol for an option requesting "moving speed" illustrated in FIG. 22, and "direction" is the symbol for an option requesting "true bearing" illustrated in FIG. 22.

In FIG. 25C, an option requesting "usage type" is set after SCAN_REQ. "type" is the symbol for the option requesting "usage type" illustrated in FIG. 22. In FIG. 25D, options requesting "position", "altitude", and "usage type" are set after SCAN_REQ. "place" is the symbol for the option requesting "position" illustrated in FIG. 22, "elevation" is the symbol for the option requesting "altitude" illustrated in FIG. 22, and "type" is the symbol for the option requesting "usage type" illustrated in FIG. 22. The symbol "opt" representing an option or options and the pieces of information are defined to be delimited by a colon ":". The symbols for the respective pieces of information requested as options are defined to be delimited by a comma ",". The options set after SCAN_REQ illustrated in FIGS. 25A to 25D are request information for requesting the information illustrated in FIG. 22 from a Bluetooth® Low Energy advertiser device.

FIGS. 25E, 25F, 25G, and 25H illustrate examples of a scan response, or examples of options extending the Bluetooth® Low Energy standard of Bluetooth® 5.1. FIG. 25E illustrates an example of a scan response to the scan request illustrated in FIG. 25A. FIG. 25F illustrates an example of a scan response to the scan request illustrated in FIG. 25B. FIG. 25G illustrates an example of a scan response to the scan request illustrated in FIG. 25C. FIG. 25H illustrates an example of a scan response to the scan request illustrated in FIG. 25D. In FIGS. 25E, 25F, 25G, and 25H, SCAN_RSP is a scan response defined in the Bluetooth® Low Energy standard of Bluetooth® 5.1. Additional information is set after SCAN_RSP. The pieces of information are defined to be delimited by a comma "," and each symbol and its value by a colon ":".

(Communication Sequence Related to Transmission of Option Information)

FIG. 17 is a flowchart illustrating an example where a Bluetooth® Low Energy advertiser device adds an option or options in transmitting an advertising packet (scan response). For example, programs related to the flowchart of FIG. 17 are stored in the ROMs 104 and 152, read into the RAMs 105 and 153, and executed by the CPUs 103 and 154.

In step S1701, the printer 1402 or the smartphone 1403 that is a Bluetooth® Low Energy advertiser device starts processing for transmitting an advertising packet.

In step S1702, the printer 1402 or the smartphone 1403 transmits an advertising packet (for example, ADV_IND) to a Bluetooth® Low Energy scanner device such as the wearable device 1404.

In step S1703, the wearable device 1404 receiving the advertising packet transmits SCAN_REQ illustrated in any one of FIGS. 25A to 25D to the printer 1402 or the smartphone 1403. Specifically, the wearable device 1404 determines that the payload 902 of the advertising packet does not include sufficient information, and transmits SCAN_REQ to the printer 1402 or the smartphone 1403.

In step S1704, the wearable device 1404 transmits the option(s) (opt: . . . ) illustrated in any one of FIGS. 25A to 25D to the printer 1402 or the smartphone 1403. In step S1704, in transmitting the option(s) requesting additional information (opt: . . . ) to the printer 1402 or the smartphone 1403, the wearable device 1404 may transmit the options illustrated in FIG. 25A and those illustrated in FIG. 25D alternately upon each transmission, for example. This can further reduce the power consumption of the wearable device 1404 and the printer 1402 or the smartphone 1403.

In step S1705, the printer 1402 or the smartphone 1403 receives SCAN_REQ transmitted in step S1703 and the option(s) transmitted in step S1704. The printer 1402 or the smartphone 1403 then obtains the information requested by the option(s) illustrated in any one of FIGS. 25A to 25D from the table illustrated in FIG. 22. The obtained information is included into the payload 902 of a scan response. In step S1705, the printer 1402 or the smartphone 1403 receives the option(s) transmitted in step S1704 after the reception of the SCAN_REQ transmitted in step S1703.

In step S1706, the printer 1402 or the smartphone 1403 transmits the scan response illustrated in any one of FIGS. 25E to 25H.

In step S1707, the wearable device 1404 receives the scan response illustrated in any one of FIGS. 25E to 25H and stores the scan response in the RAM 105. In step S1708, the processing ends.

In the foregoing example, the option(s) (opt: . . . ) is/are transmitted separately from the scan request (SCAN_REQ). However, the present exemplary embodiment is not limited thereto. In a case where options can be included in a scan request, SCAN_REQ and the option(s) (opt: . . . ) may be transmitted together. In other words, the Bluetooth® Low Energy scanner device may transmit a scan request including the option(s) as request information.

(Processing Procedure of Bluetooth® Low Energy Advertiser Device)

Figure 18A:
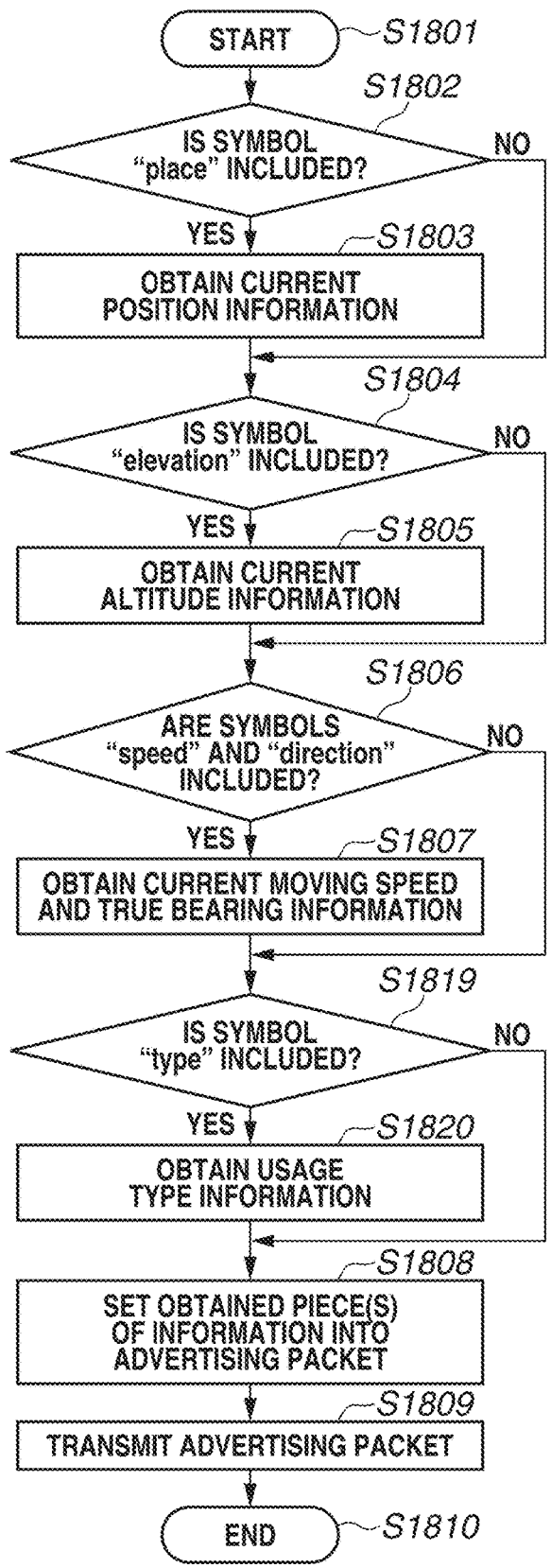
FIGS. 18A and 18B are flowcharts each illustrating an example of processing where a Bluetooth® Low Energy advertiser device transmits an advertising packet (scan response).
Figure 18B:
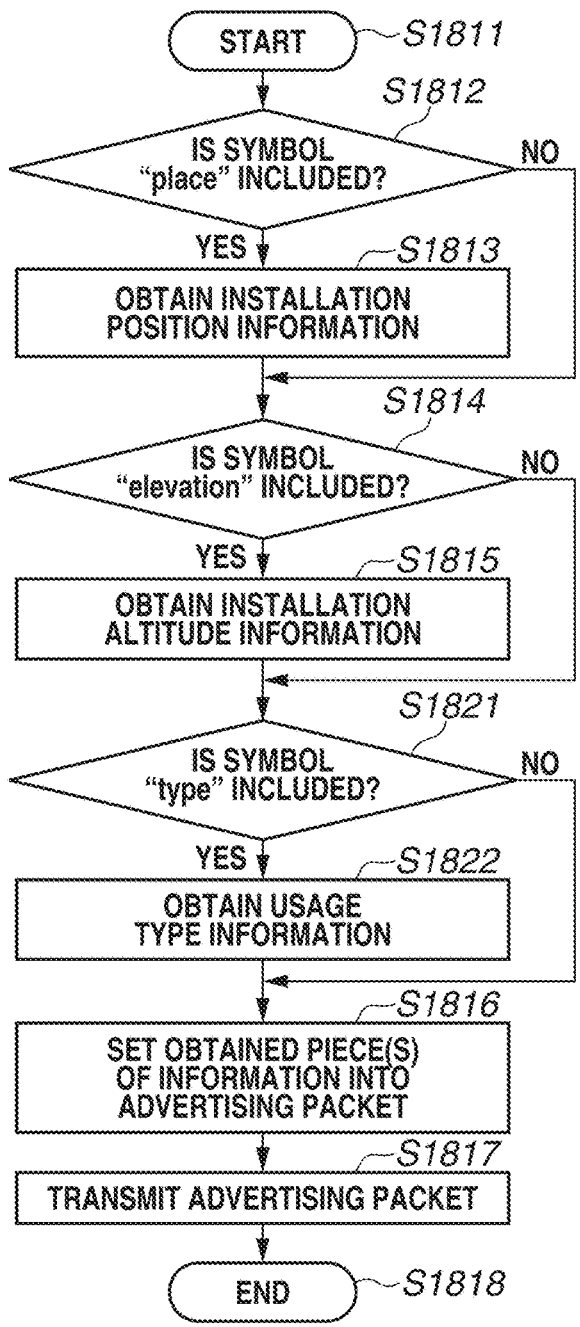

A processing procedure of the Bluetooth® Low Energy advertiser device in steps S1705 and S1706 of FIG. 17 will be described with reference to FIGS. 18A and 18B. FIGS. 18A and 18B are flowcharts illustrating examples of processing where the Bluetooth® Low Energy advertiser device transmits an advertising packet (scan response). For example, a program related to the flowcharts of FIGS. 18A and 18B is stored in the ROM 104 or 152, read into the RAM 105 or 153, and executed by the CPU 103 or 154.

FIG. 18A is a flowchart illustrating an example of processing where the smartphone 1403 serving as a Bluetooth® Low Energy advertiser device transmits an advertising packet (scan response).

In step S1801, in a case where the smartphone 1403 receives the scan request illustrated in FIG. 25A, 25B, 25C, or 25D transmitted from the wearable device 1404, the smartphone 1403 starts processing.

In step S1802, the smartphone 1403 checks whether the symbol "place" for the option requesting "position" is included in the received option(s). In a case where the symbol is included (YES in step S1802), the processing proceeds to step S1803. In a case where the symbol is not included (NO in step S1802), the processing proceeds to step S1804.

In step S1803, the smartphone 1403 obtains the current position information that is obtained by the GPS reception unit 112 and indicated by "position" illustrated in FIG. 22 from the memory.

In step S1804, the smartphone 1403 checks whether the symbol "elevation" for the option requesting "altitude" is included in the received option(s). In a case where the symbol is included (YES in step S1804), the processing proceeds to step S1805. In a case where the symbol is not included (NO in step S1804), the processing proceeds to step S1806.

In step S1805, the smartphone 1403 obtains the current altitude information that is obtained by the GPS reception unit 112 and indicated by "altitude" illustrated in FIG. 22 from the memory.

In step S1806, the smartphone 1403 checks whether the symbol "speed" for the option requesting "moving speed" and the symbol "direction" for the option requesting "true bearing" are included in the received option(s). In a case where the symbols are included (YES in step S1806), the processing proceeds to step S1807. In a case where the symbols are not included (NO in step S1806), the processing proceeds to step S1819.

In step S1807, the smartphone 1403 obtains the current moving speed and the true bearing information that are obtained by the GPS reception unit 112 and indicated by "moving speed" and "true bearing" illustrated in FIG. 22 from the memory.

In step S1819, the smartphone 1403 checks whether the symbol "type" for the option requesting "usage type" is included in the received option(s). In a case where the symbol is included (YES in step S1819), the processing proceeds to step S1820. In a case where the symbol is not included (NO in step S1819), the processing proceeds to step S1808.

In step S1820, the smartphone 1403 obtains the usage type information that is registered by the usage type registration unit (not illustrated) and stored in the RAM 105.

In step S1808, the smartphone 1403 sets the obtained piece(s) of information among the current position information, the current altitude information, the current moving speed, the true bearing information, and the usage type information into an advertising packet (scan response).

In step S1809, the smartphone 1403 transmits the advertising packet (scan response) to the wearable device 1404 serving as the Bluetooth® Low Energy scanner device.

In step S1810, after the transmission of the entire advertising packet (scan response), the smartphone 1403 ends the processing for transmitting the advertising packet (scan response).

In the foregoing processing procedure, the smartphone 1403 checks whether the symbols for the respective options requesting the position information, the altitude information, the moving speed, the true bearing information, and the usage type information are included in the scan request. However, the present exemplary embodiment is not limited thereto. The smartphone 1403 may check only whether the symbols for the options requesting the position information and the usage type information are included. The smartphone 1403 may check only whether the symbols for the options requesting the position information, the altitude information, and the usage type information are included. In the following description, a processing procedure for checking whether the symbols for the options requesting the position information, the altitude information, and the usage type information are included will be described.

FIG. 18B is a flowchart illustrating an example of processing where the printer 1402 serving as a Bluetooth (registered trademark) Low Energy advertiser device transmits an advertising packet (scan response).

In step S1811, in a case where the printer 1402 serving as a Bluetooth® Low Energy advertiser device receives the scan request illustrated in FIG. 25A or 25B transmitted from the wearable device 1404, the printer 1402 starts processing.

In step S1812, the printer 1402 checks whether the symbol "place" for the option requesting "position" is included in the received option(s). In a case where the symbol is included (YES in step S1812), the processing proceeds to step S1813. In a case where the symbol is not included (NO in step S1812), the processing proceeds to step S1814.

In step S1813, the printer 1402 obtains the installation position information that is registered from the installation location registration section 1902 and stored in the RAM 153.

In step S1814, the printer 1402 checks whether the symbol "elevation" for the option requesting "altitude" is included in the received option(s). In a case where the symbol is included (YES in step S1814), the processing proceeds to step S1815. In a case where the symbol is not included (NO in step S1814), the processing proceeds to step S1821.

In step S1815, the printer 1402 obtains the installation altitude information that is registered from the installation altitude registration section 1903 and stored in the RAM 153.

In step S1821, the printer 1402 checks whether the symbol "type" for the option requesting "usage type" is included in the received option(s). In a case where the symbol is included (YES in step S1821), the processing proceeds to step S1822. In a case where the symbol is not included (NO in step S1821), the processing proceeds to step S1816.

In step S1822, the printer 1402 obtains the usage type information that is registered from the usage type registration section 1904 and stored in the RAM 153.

In step S1816, the printer 1402 sets the obtained piece(s) of information among the installation position information, the installation altitude information, and the usage type information into an advertising packet (scan response).

In step S1817, the printer 1402 transmits the advertising packet (scan response) to the wearable device 1404 serving as the Bluetooth® Low Energy scanner device.

In step S1818, after the transmission of the entire advertising packet (scan response), the printer 1402 ends the processing for transmitting the advertising packet (scan response).

By the foregoing processing procedure illustrated in FIGS. 18A and 18B, the Bluetooth® Low Energy advertiser device can transmit requested pieces of information, such as the position information and the usage type information, about the Bluetooth® Low Energy advertiser device only when requested. Transmitting requested information only when requested can reduce the power consumption of the Bluetooth® Low Energy devices.

(Setting Information for Specifying Options)

In the present exemplary embodiment, the Bluetooth® Low Energy scanner device specifies information about the options in advance. Specifically, the Bluetooth® Low Energy scanner device transmits setting information in advance so that the Bluetooth® Low Energy advertiser device stores position information, usage type information, and the like into a scan response.

FIGS. 27A, 27B, 27C, and 27D are diagrams illustrating examples of setting information for specifying options. The setting information is transmitted by the Bluetooth® Low Energy scanner device. FIG. 27A illustrates an example where the option "position" and the expiration time of the option are set. FIG. 27B illustrates an example where the option "altitude" and the expiration time of the option are set. FIG. 27C illustrates an example where the options "moving speed" and "true bearing" and the expiration time of the options are set. FIG. 27D illustrates an example where the option "usage type" and the expiration time of the option are set. The symbol for the option "position" is "place". The symbol for the option "altitude" is "elevation". The symbol for the option "moving speed" is "speed". The symbol for the option "true bearing" is "direction". The symbol for the option "usage type" is "type". The symbol for an expiration time is "time", and the value of the expiration time is set after a colon ":". The value of the expiration time is in units of seconds. An expiration time of 0 indicates that the option is disabled. An expiration time of 9999 indicates that the expiration time is infinite.

(Sequence Related to Transmission of Setting Information)

Figure 24:
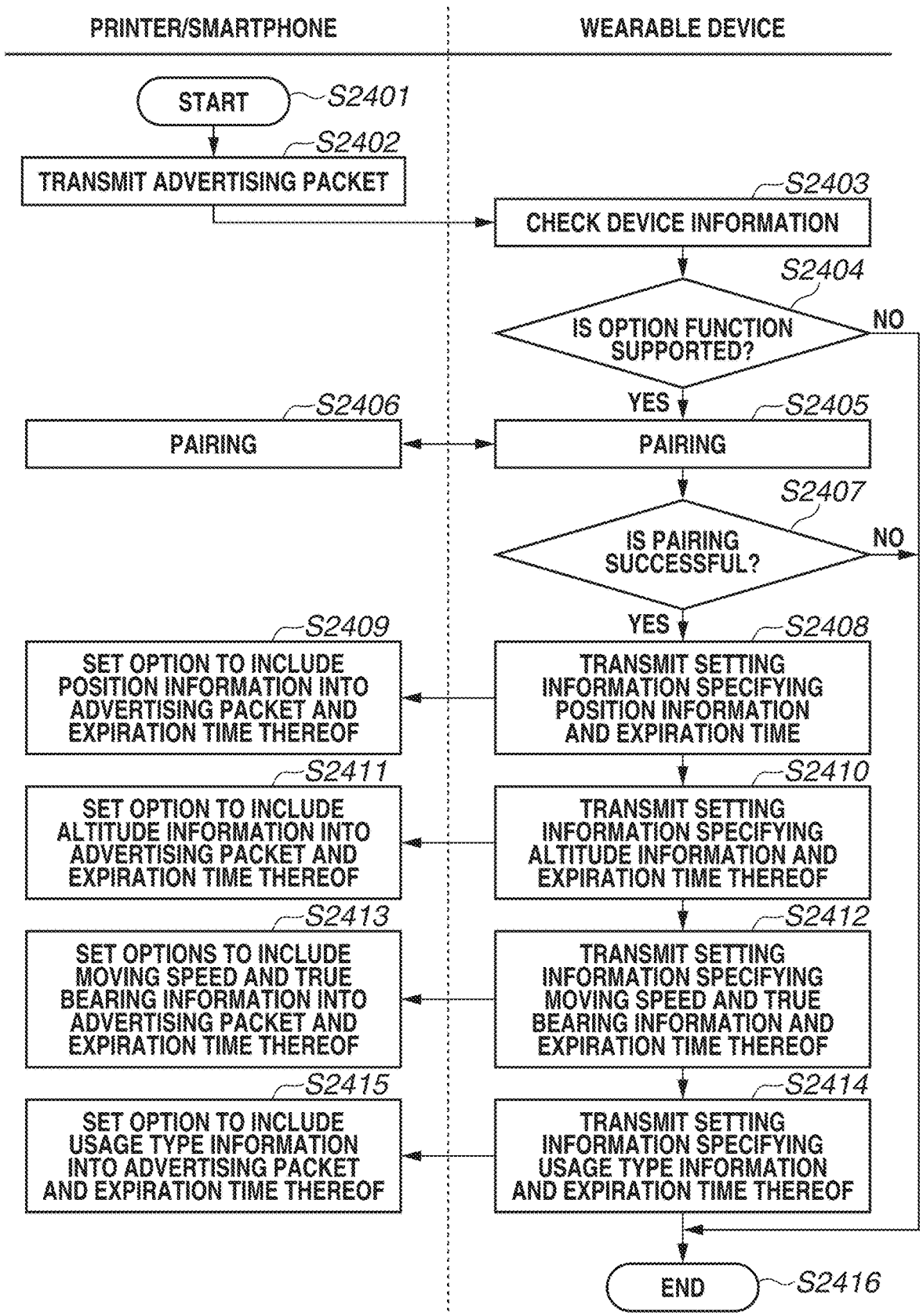
FIG. 24 is a flowchart illustrating an example where a Bluetooth® Low Energy advertiser device sets options to be included in transmitting an advertising packet (scan response).

A sequence related to the transmission of the setting information will be described. FIG. 24 is a flowchart illustrating an example where a Bluetooth® Low Energy scanner device transmits setting information to specify options by GATT communication so that a Bluetooth® Low Energy advertiser device sets the options. For example, programs related to the flowchart of FIG. 24 are stored in the ROMs 104 and 152, read into the RAMs 105 and 153, and executed by the CPUs 103 and 154.

In step S2401, the printer 1402 or the smartphone 1403 serving as a Bluetooth® Low Energy advertiser device starts processing for transmitting an advertising packet.

In step S2402, the Bluetooth® Low Energy advertiser device transmits an advertising packet (for example, ADV_IND) to a Bluetooth® Low Energy scanner device, such as the wearable device 1404.

In step S2403, the Bluetooth® Low Energy scanner device obtains device information (for example, the device name 903 in FIG. 5) from the information included in the advertising packet, and checks the device information.

In step S2404, the Bluetooth® Low Energy scanner device checks whether the Bluetooth® Low Energy advertiser device supports an option function for including additional information into an advertising packet (scan response). In a case where the option function is supported (YES in step S2404), the processing proceeds to step S2405. In a case where the option function is not supported (NO in step S2404), the processing proceeds to step S2416.

In steps S2405 and S2406, the Bluetooth® Low Energy scanner device and the Bluetooth® Low Energy advertiser device perform pairing. In a case where the Bluetooth® Low Energy scanner and advertiser devices are already paired, steps S2405 and S2406 may be skipped.

In step S2407, the Bluetooth® Low Energy scanner device checks whether the pairing is successful. In a case where the pairing is successful (YES in step S2407), the processing proceeds to step S2408. In a case where the pairing is failed (NO in step S2407), the processing proceeds to step S2416.

In step S2408, the Bluetooth® Low Energy scanner device transmits the setting information illustrated in FIG. 27A to the Bluetooth® Low Energy advertiser device by GATT communication. As described above, setting information is information for specifying the additional information according which the Bluetooth® Low Energy advertiser device includes the specified additional information into the scan response to be transmitted. Here, the Bluetooth® Low Energy scanner device transmits the setting information illustrated in FIG. 27A, where the position information is specified as an option and 600 seconds is specified as the expiration time thereof.

In step S2409, the Bluetooth® Low Energy advertiser device receives the setting information, and sets the option to include the position information into the advertising packet (scan response) and the expiration time of the option.

In step S2410, the Bluetooth® Low Energy scanner device transmits the setting information illustrated in FIG.

27B to the Bluetooth® Low Energy advertiser device by GATT communication. Here, the Bluetooth® Low Energy scanner device transmits the setting information illustrated in FIG. 27B, where the altitude information is specified as an option and 360 seconds is specified as the expiration time thereof, by the GATT communication.

In step S2411, the Bluetooth® Low Energy advertiser device receives the setting information, and sets the option to include the altitude information into the advertising packet (scan response) and the expiration time of the option.

In step S2412, the Bluetooth® Low Energy scanner device transmits the setting information illustrated in FIG. 27C to the Bluetooth® Low Energy advertiser device by GATT communication. Here, the Bluetooth® Low Energy scanner device transmits the setting information illustrated in FIG. 27C, where the moving speed and the true bearing information are specified as options and 300 seconds is specified as the expiration time thereof, by the GATT communication.

In step S2413, the Bluetooth® Low Energy advertiser device receives the setting information, and sets the options to include the moving speed and the true bearing information into the advertising packet (scan response) and the expiration time of the options.

In step S2414, the Bluetooth® Low Energy scanner device transmits the setting information illustrated in FIG. 27D to the Bluetooth® Low Energy advertiser device by GATT communication. Here, the Bluetooth® Low Energy scanner device transmits the setting information illustrated in FIG. 27D, where the usage type information is specified as an option and infinite is specified as the expiration time thereof, to the Bluetooth® Low Energy advertiser device by the GATT communication.

In step S2415, the Bluetooth® Low Energy advertiser device receives the setting information, and sets the option to include the usage type information into the advertising packet (scan response) and the expiration time of the option.

In step S2416, the Bluetooth® Low Energy scanner device ends the processing for transmitting the setting information for specifying options.

By the foregoing processing procedure illustrated in FIG. 24, the Bluetooth® Low Energy scanner device can specify in advance, to the Bluetooth® Low Energy advertiser device, which pieces of information to be obtained.

In a fourth exemplary embodiment, information such as position information may be included into advertising packets (scan responses) or skipped. For example, such information can be transmitted in every other transmission. A speed sensor may be used in a cooperative manner to take into account the moving speed of a Bluetooth® Low Energy advertiser device so that the information is transmitted when the Bluetooth® Low Energy advertiser device performs a large movement. This can provide the effect of suppressing the power consumption of the Bluetooth® Low Energy devices, such as the printer 1402, the smartphone 1403, the wearable device 1404, and the ATM 2801.

An exemplary embodiment of the present invention can also be implemented by processing for supplying a program for implementing one or more of the functions of the foregoing exemplary embodiments to a system or an apparatus via a network or a storage medium, and reading and executing the program by one or more processors in a computer of the system or apparatus. A circuit that implements one or more functions (for example, application specific integrated circuit (ASIC)) can also be used for implementation.

While the exemplary embodiments have been described in detail above, the present invention is not limited to such specific exemplary embodiments, and various modifications may be made without departing from the gist of the present invention.

In the foregoing first exemplary embodiment, an application that controls display of the current relative positions of the wearable device (wristwatch) or the user wearing the wearable device and the Bluetooth® Low Energy devices nearby is described as an example of the application 3201. However, such an example is not restrictive. The application 3201 can be implemented by any application having a similar function, which is also effective.

In the second and third exemplary embodiments, navigation applications are described as examples of the navigation applications 2001 and 2004. However, such examples are not restrictive. The navigation applications 2001 and 2004 can be implemented by any applications having a similar function, which is also effective.

In the first, second, and third exemplary embodiments, Bluetooth® 5.1 is used as a communication method. However, such a communication method is not restrictive. Any communication method having a similar function may be used for implementation, which is also effective.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-102857, filed May 31, 2019, which is hereby incorporated by reference herein in its entirety.

What is claimed is:

1. An apparatus configured to perform communication, comprising:

a communication unit configured to receive advertising information transmitted from an external apparatus;

a first obtaining unit configured to obtain information about an angle between the external apparatus and the apparatus, based on the obtained advertising information; and a second obtaining unit configured to obtain position information about the apparatus, based on the information about the angle obtained by the first obtaining unit, wherein the second obtaining unit is configured to select, in a case where the communication unit receives advertising information from a plurality of external apparatuses, at least one of the plurality of external apparatuses based on information about usage types of the external apparatuses, the information about the usage types being included in the received advertising information, and to obtain the information about the angle based on the advertising information transmitted from the selected at least one of the plurality of external apparatuses, and wherein the information about the usage types is information that contains at least one of information corresponding to stationary use of the external apparatus or information corresponding to mobile use of the external apparatus.

2. The apparatus according to claim 1, wherein the second obtaining unit is configured to select, in a case where the plurality of external apparatuses includes a first external apparatus of which the usage type is stationary and a second external apparatus of which the usage type is not stationary, the first external apparatus and to not select the second external apparatus.

3. The apparatus according to claim 1, wherein the second obtaining unit is configured to select the at least one of the plurality of external apparatuses by further using information about a field intensity of the received advertising information.

4. The apparatus according to claim 1, wherein the second obtaining unit is configured to obtain the position information about the apparatus by further using position information about the external apparatus included in the received advertising information.

5. The apparatus according to claim 1, wherein the communication unit is configured to transmit request information requesting information about the usage type of the external apparatus.

6. The apparatus according to claim 1, wherein the communication unit is configured to transmit request information requesting position information about the external apparatus.

7. The apparatus according to claim 1, further comprising a display control unit configured to display a guide screen indicating a position of the apparatus on a display unit by using the position information about the apparatus obtained by the second obtaining unit.

8. The apparatus according to claim 1, wherein the communication unit includes a plurality of antennas configured to receive the advertising information.

9. The apparatus according to claim 1, wherein the communication unit is configured to perform communication based on a Bluetooth® 5.1 standard.

10. The apparatus according to claim 1, wherein, in a case where the information about the usage type received from a first external apparatus among the plurality of external apparatuses is information corresponding to stationary use of the first external apparatus and where information about the usage type received from a second external apparatus among the plurality of external apparatuses is not information corresponding to stationary use of the second external apparatus, the second obtaining unit is configured to select the first external apparatus and not to select the second external apparatus.

11. The apparatus according to claim 1, wherein, in a case where the external apparatus is a printer or an automated teller machine (ATM), the information about the usage type received from the external apparatus is information corresponding to stationary use of the external apparatus.

12. The apparatus according to claim 1, wherein, in a case where the external apparatus is a smartphone or a wearable device, the information about the usage type received from the external apparatus is information corresponding to mobile use of the external apparatus.

13. The apparatus according to claim 1, wherein the information about the usage types is information that contains at least one of information corresponding to stationary use of the external apparatus, information corresponding to mobile use of the external apparatus, or information corresponding to both stationary use and mobile use of the external apparatus.

14. The apparatus according to claim 13, wherein, in a case where the external apparatus is a notebook personal computer (PC), the information about the usage type received from the external apparatus is information corresponding to both stationary use and mobile use of the external apparatus.

15. A method for controlling an apparatus configured to perform communication, the method comprising:

receiving advertising information transmitted from an external apparatus;

obtaining information about an angle between the external apparatus and the apparatus based on the obtained advertising information; and obtaining position information about the apparatus based on the obtained information about the angle, wherein in a case where advertising information is received from a plurality of external apparatuses, some of the plurality of external apparatuses is selected based on information about usage types of the external apparatuses, the information about the usage types being included in the received advertising information, and the information about the angle is obtained based on the advertising information transmitted from the selected some of the plurality of external apparatuses selected, and wherein the information about the usage types is information that contains at least one of information corresponding to stationary use of the external apparatus or information corresponding to mobile use of the external apparatus.

* * * * *